United States Patent
Tsuda

(10) Patent No.: US 9,516,527 B2
(45) Date of Patent: Dec. 6, 2016

(54) INFORMATION PROCESSING APPARATUS, COMMUNICATION SYSTEM AND COMMUNICATION STATE DETECTION METHOD OF INFORMATION PROCESSING APPARATUS

(75) Inventor: Shinichiro Tsuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 131 days.

(21) Appl. No.: 14/237,926

(22) PCT Filed: Jun. 28, 2012

(86) PCT No.: PCT/JP2012/066523
§ 371 (c)(1),
(2), (4) Date: Feb. 10, 2014

(87) PCT Pub. No.: WO2013/038777
PCT Pub. Date: Mar. 21, 2013

(65) Prior Publication Data
US 2014/0187238 A1    Jul. 3, 2014

(30) Foreign Application Priority Data

Sep. 15, 2011  (JP) .................................. 2011-201885

(51) Int. Cl.
*H04W 24/00*   (2009.01)
*H04W 24/08*   (2009.01)
(Continued)

(52) U.S. Cl.
CPC ............ *H04W 24/08* (2013.01); *H04B 17/23* (2015.01); *H04B 17/27* (2015.01); *H04B 17/345* (2015.01); *H04W 24/10* (2013.01);
(Continued)

(58) Field of Classification Search
CPC ..................................................... H04W 24/08
See application file for complete search history.

(56) References Cited

U.S. PATENT DOCUMENTS

2004/0229570 A1* 11/2004 Matsumura ......... H04L 25/0262
455/67.11
2007/0264949 A1    11/2007 Matsumura
(Continued)

FOREIGN PATENT DOCUMENTS

CN          1523786 A      8/2004
CN        101449606 A      6/2009
(Continued)

OTHER PUBLICATIONS

Office Action received for Chinese Patent Application No. 201280043596.2, mailed on Mar. 23, 2016, 15 pages of office action including 8 pages of English translation.
(Continued)

*Primary Examiner* — Justin Lee
(74) *Attorney, Agent, or Firm* — Chip Law Group

(57) ABSTRACT

There is provided an information processing apparatus including an acquisition unit configured to acquire an interference index indicating a degree of interference in wireless communication between a wireless communication apparatus and a base station that is a connection target of the wireless communication apparatus, and position information related to a position concerning the interference index, and a generation unit configured to specify an interference index concerning a target area to detect a communication state of the wireless communication apparatus, based on the acquired position information, and generate communication state information to notify the communication state based on the specified interference index.

19 Claims, 28 Drawing Sheets

(51) Int. Cl.
*H04W 24/10* (2009.01)
*H04W 64/00* (2009.01)
*H04B 17/27* (2015.01)
*H04B 17/345* (2015.01)
*H04B 17/23* (2015.01)
*H04M 1/725* (2006.01)
*H04W 4/02* (2009.01)
*H04B 17/26* (2015.01)
*H04B 17/373* (2015.01)

(52) U.S. Cl.
CPC ........... *H04W 64/006* (2013.01); *H04B 17/26* (2015.01); *H04B 17/373* (2015.01); *H04M 1/72522* (2013.01); *H04W 4/02* (2013.01)

(56) References Cited

U.S. PATENT DOCUMENTS

| | | | | |
|---|---|---|---|---|
| 2007/0270151 | A1* | 11/2007 | Claussen | H04W 16/32 455/444 |
| 2010/0085904 | A1 | 4/2010 | Hamaue et al. | |
| 2010/0157941 | A1* | 6/2010 | Raghothaman | H04W 36/30 370/331 |
| 2011/0275378 | A1* | 11/2011 | Kwon | H04W 36/30 455/437 |

FOREIGN PATENT DOCUMENTS

| | | |
|---|---|---|
| JP | 2002-374575 A | 12/2002 |
| JP | 2004-253831 A | 9/2004 |
| JP | 2005-236818 A | 2/2005 |
| JP | 2005-236818 A | 9/2005 |
| JP | 2008-011077 A | 1/2008 |
| JP | 2008-113455 A | 5/2008 |
| JP | 2008-177634 A | 7/2008 |
| JP | 2008-288777 A | 11/2008 |
| JP | 2010-268482 A | 11/2010 |
| JP | 2011-010267 A | 1/2011 |
| WO | WO 2009/001400 A1 | 12/2008 |

OTHER PUBLICATIONS

Office Action received for Japanese Patent Application No. 2011-201885, mailed on Dec. 1, 2015, 18 pages of office action including 9 pages of English translation.

* cited by examiner

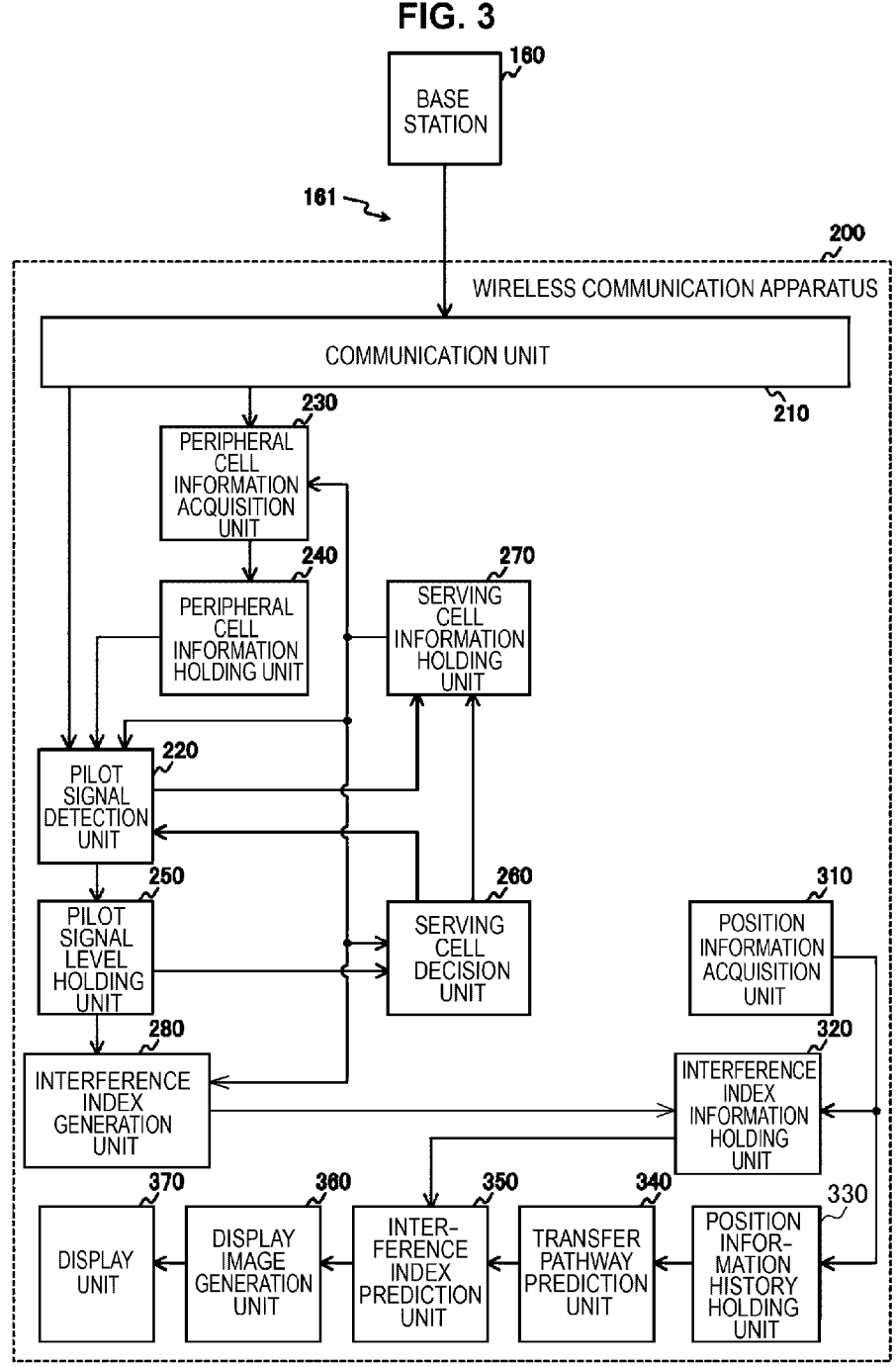

FIG. 6

| CELL | SCRAMBLE CODE | PILOT SIGNAL LEVEL |
|---|---|---|
| SERVING CELL | 128 | −78 |
| PERIPHERAL CELL 1 | 23 | −88 |
| PERIPHERAL CELL 2 | 266 | −90 |
| PERIPHERAL CELL 3 | 262 | −94 |
| PERIPHERAL CELL 4 | 178 | −88 |
| PERIPHERAL CELL 5 | 10 | −98 |
| PERIPHERAL CELL 6 | 194 | −98 |

FIG. 7

| LATITUDE | LONGITUDE | INTERFERENCE INDEX |
|---|---|---|
| 34.6250 | 135.0400 | 0.122 |
| 34.6250 | 135.0405 | 0.231 |
| ⋮ | ⋮ | ⋮ |
| 34.6255 | 135.0400 | 0.333 |
| 3406255 | 135.0405 | 0.254 |
| ⋮ | ⋮ | ⋮ |

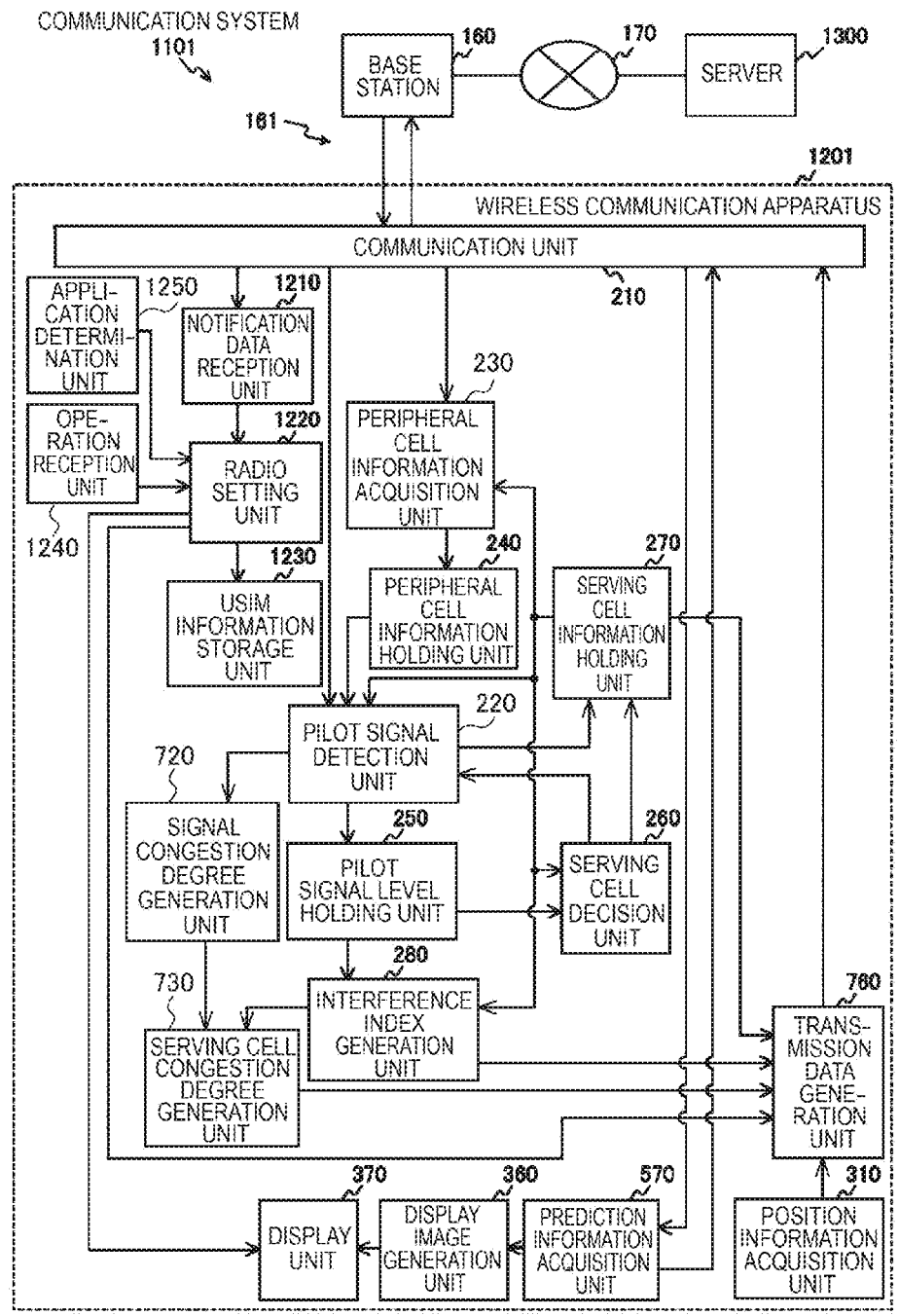

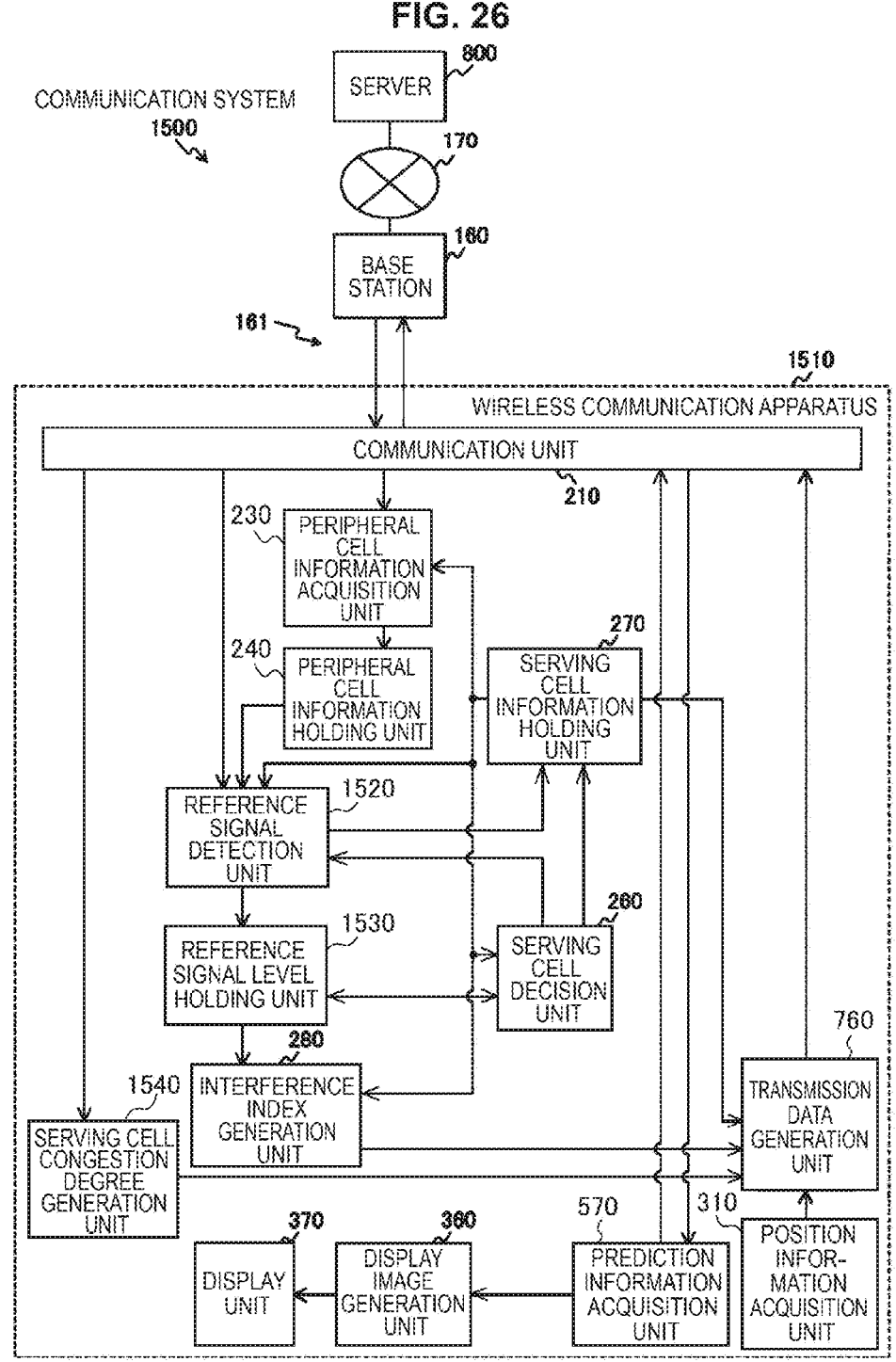

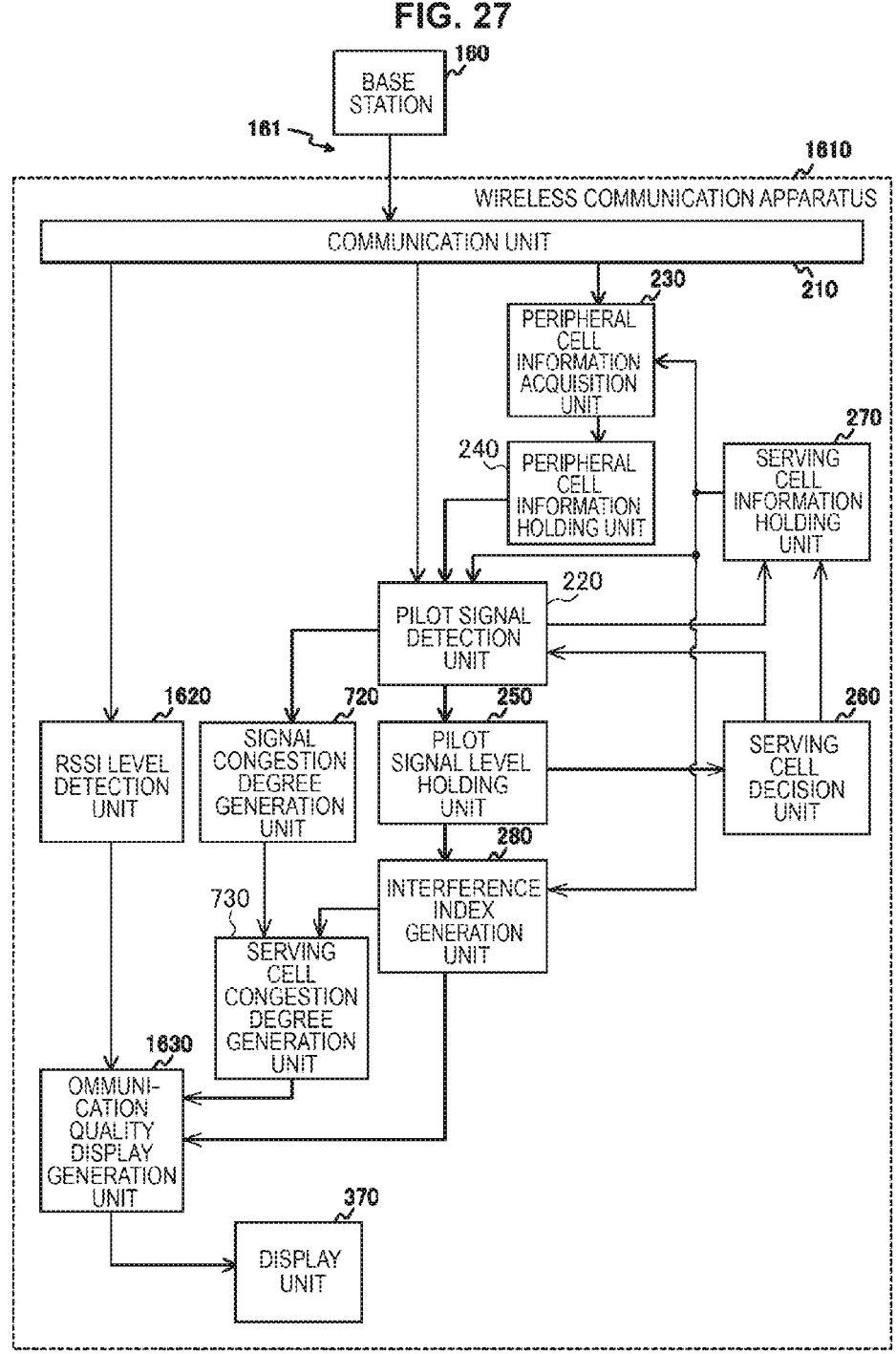

FIG. 28

| LATITUDE | LONGITUDE | INTERFERENCE INDEX | | |
|---|---|---|---|---|
| | | 1:00~9:00 | 9:00~17:00 | 17:00~1:00 |
| 34.6250 | 135.0400 | 0.122 | 0.155 | 0.099 |
| 34.6250 | 135.0405 | 0.231 | 0.198 | 0.177 |
| ⋮ | ⋮ | ⋮ | ⋮ | ⋮ |
| 34.6255 | 135.0400 | 0.333 | 0.212 | 0.175 |
| 3406255 | 135.0405 | 0.254 | 0.333 | 0.275 |
| ⋮ | ⋮ | ⋮ | ⋮ | ⋮ |

INFORMATION PROCESSING APPARATUS, COMMUNICATION SYSTEM AND COMMUNICATION STATE DETECTION METHOD OF INFORMATION PROCESSING APPARATUS

TECHNICAL FIELD

The present technology relates to an information processing apparatus. To be more specific, it relates to an information processing apparatus connected to a network, a communication system including this, and a communication state detection method of the information processing apparatus.

BACKGROUND ART

In the past, a wireless communication apparatus that is connected to a network such as a public wireless network has spread widely. A mobile phone service of a 3G (3rd Generation) method (in Japan, referred to as the third-generation mobile phone service) has started in 2002. As the mobile phone service, initially, applications mainly uses packets having a small capacity size such as a sound and an e-mail are mainly used. However, use aspects of users change to downloading of packets having a relatively large capacity size such as download of a music file or viewing of a moving image, by introducing HSDPA (High Speed Downlink Packet Access) or the like.

Moreover, when the users concentrate in a specific area (base station) and download large packets, it is assumed that the traffic locally concentrates. In this case, there occurs a problem that it is not possible to acquire an enough communication rate though the communication quality is good.

Therefore, for example, a wireless communication apparatus is suggested which understands the communication state that varies over time by detecting the free space (congestion degree) of a base station on the basis of a radio signal received by the wireless communication apparatus (for example, see Patent Literature 1).

CITATION LIST

Patent Literature

Patent Literature 1: JP 2011-10267A

SUMMARY OF INVENTION

Technical Problem

In the above-mentioned related art, it is possible to understand the communication state from the free space (congestion degree) of a base station. However, since there are many cases where even other factors than the congestion degree influences the communication speed, it is important to understand an appropriate communication state in consideration of these.

The present technology is invented considering such a situation, and it is an object to understand an appropriate communication state in wireless communication.

Solution to Problem

The present technology has been provided in order to solve the above-mentioned issues. According to a first embodiment of the present disclosure, there are provided an information processing apparatus, a communication state detection method, and a program for causing a computer to execute the method, the information processing apparatus including an acquisition unit configured to acquire an interference index indicating a degree of interference in wireless communication between a wireless communication apparatus and a base station that is a connection target of the wireless communication apparatus, and position information related to a position concerning the interference index, and a generation unit configured to specify an interference index concerning a target area to detect a communication state of the wireless communication apparatus, based on the acquired position information, and generate communication state information to notify the communication state based on the specified interference index. This causes operation of generating communication state information on the basis of an interference index that shows the degree of interference in wireless communication between a wireless communication apparatus and a base station.

According to the first embodiment of the present disclosure, the acquisition unit may acquire an interference index associated with position information concerning a position of the target area or a position close to the target area. The generation unit may specify the interference index concerning the target area based on the acquired interference index.

According to the first embodiment of the present disclosure, the information processing apparatus is a wireless communication apparatus. The information processing apparatus further includes an interference index generation unit configured to generate the interference index based on a ratio between a level of a pilot signal sent by the base station of the connection target and a sum of levels of pilot signals sent by other base stations whose signal can be received by the wireless communication apparatus, and a holding unit configured to hold the generated interference index in association with position information that shows a detection position of the pilot signal used to generate the interference index. The acquisition unit acquires, from the holding unit, an interference index associated with position information concerning the position of the target area or the position close to the target area. This causes operation of generating an interference index on the basis of the ratio between the level of a pilot signal sent by a base station of the connection target and the sum of the levels of pilot signals sent by other base stations whose signal can be received by a wireless communication apparatus, and generating communication state information using this generated interference index.

According to the first embodiment of the present disclosure, the acquisition unit may acquire, from a server that holds the interference index, an interference index associated with position information concerning a position of the target area or a position close to the target area. This causes operation of acquiring an interference index associated with position information concerning to the position of the target area or a position close to the target area.

According to the first embodiment of the present disclosure, the information processing apparatus may further include a transfer pathway prediction unit configured to predict a transfer pathway of the wireless communication apparatus based on a history of a position in which the wireless communication apparatus exists. The generation unit may generate the communication state information using the predicted transfer pathway as the target area. This causes operation of generating communication state information of a predicted transfer pathway.

According to the first embodiment of the present disclosure, the information processing apparatus may further include a signal congestion degree generation unit configured to generate a signal congestion degree indicating a degree of signals related to an increase and decrease of a communication speed of the wireless communication apparatus among reception signals received by the wireless communication apparatus, and a base station congestion degree generation unit configured to generate a base station congestion degree indicating a congestion degree of the base station of the connection target based on the generated signal congestion degree and an interference index in a position in which the signal congestion degree is generated. The generation unit may generate a signal congestion degree in the target area based on the generated base station congestion degree and the interference index concerning the specified target area, predicts the communication speed in the target area from the generated signal congestion degree in the target area and generates the predicted communication speed as the communication state information. This causes operation of predicting the communication speed in the target area on the basis of the signal congestion degree in the target area generated on the basis of the generated base station congestion degree and an interference index concerning the target area.

According to the first embodiment of the present disclosure, the signal congestion degree generation unit may generate the signal congestion degree based on a ratio of a correlation output between the reception signal and a code assigned to the base station of the connection target, to a correlation output concerning a base station with a smallest correlation among correlation outputs between the reception signal and codes assigned to other base stations whose signal can be received by the wireless communication apparatus. The base station congestion degree generation unit may generate the base station congestion degree based on a relationship between the generated signal congestion degree and an interference index in a position in which the signal congestion degree is generated. This causes operation of generating the signal congestion degree on the basis of the ratio of a correlation output between a reception signal and a code (scramble code) assigned to a base station of the connection target and a correlation output concerning a base station with the smallest correlation among correlation outputs between the reception signal and codes assigned to other base stations whose signal can be received by a wireless communication apparatus.

According to the first embodiment of the present disclosure, the information processing apparatus may be a server that holds the interference index. The acquisition unit may acquire the interference index associated with position information concerning a position of the target area detected based on a position supplied from the wireless communication apparatus or a position close to the target area. The generation unit may specify the interference index of the target area based on the acquired interference index. This causes operation of specifying an interference index of the target area by a server.

According to the first embodiment of the present disclosure, the information processing apparatus may further include a position information holding unit configured to hold the position supplied from the wireless communication apparatus in chronological order, and a transfer pathway prediction unit configured to predict a transfer pathway of the wireless communication apparatus based on the held position. The generation unit may generate the communication state information using the predicted transfer pathway as the target area. This causes operation of generating communication state information of a predicted transfer pathway by a server.

According to the first embodiment of the present disclosure, the information processing apparatus may further include a base station congestion degree holding unit configured to hold a base station congestion degree indicating a congestion degree of a base station. The generation unit may acquire a base station congestion degree of the base station of the connection target in the predicted transfer pathway from the base station congestion degree holding unit, predict a communication speed based on the acquired base station congestion degree and the interference index of the target area, and generate the predicted communication speed as the communication state information. This causes operation of acquiring the base station congestion degree of a base station that is the connection target in the target area from a base station congestion degree holding unit and predicting the communication speed on the basis of this acquired base station congestion degree and the interference index of the target area.

According to the first embodiment of the present disclosure, the acquisition unit may acquire the interference index associated with the position information concerning the position of the detected target area or the position close to the target area, for each of a plurality of communication networks. The generation unit may detect a communication state of each of the plurality of communication networks in the target area based on the acquired interference index, and generates, as the communication state information, information showing a communication network that satisfies a specific condition among the plurality of communication networks. This causes operation of detecting communication state of each of a plurality of communication networks and notifying a communication network that satisfies a specific condition among the plurality of communication networks.

According to the first embodiment of the present disclosure, the generation unit may generate the communication state information using a communication network whose predicted communication speed is fastest among the plurality of communication networks, as the communication network that satisfies the specific condition. This causes operation of detecting the communication state of each of a plurality of communication networks and notifying the fastest communication network among the plurality of communication networks.

According to a second embodiment of the present disclosure, there is provided a wireless communication apparatus including a detection unit configured to detect communication quality based on an interference index indicting a degree of interference in wireless communication with a base station of a connection target and a reception signal strength indicating a strength of a signal received by the wireless communication apparatus, and a display image generation unit configured to generate a display image to notify a user of the detected communication quality. This causes operation of detecting communication quality on the basis of the interference index and the reception signal strength.

According to the second embodiment of the present disclosure, the display image generation unit may generate the display image that shows the communication quality according to an increase and decrease of a specific sign. This causes operation of showing communication quality according to the increase and decrease of a specific sign.

According to the second embodiment of the present disclosure, the wireless communication apparatus may further include a signal congestion degree generation unit configured to generate a signal congestion degree indicating a degree of signals related to an increase and decrease of a communication speed of the wireless communication apparatus among received signals, and a base station congestion degree generation unit configured to generate a base station congestion degree indicating a congestion degree of the base station of the connection target based on the generated signal congestion degree and the interference index in a position in which the signal congestion degree is generated. The detection unit may detect the communication quality based on the generated base station congestion degree, the interference index and the reception signal strength. This causes operation of detecting communication quality on the basis of the base station congestion degree, the interference index and the reception signal strength.

According to a third embodiment of the present disclosure, there is provided a wireless communication apparatus including an acquisition unit configured to acquire communication state information transmitted from an information processing apparatus that acquires an interference index indicating a degree of interference in wireless communication with a base station of a connection target of the wireless communication apparatus and position information related to a position concerning the interference index for each of a plurality of communication networks, detects a communication state of each of the plurality of communication networks in a target area to detect a communication state of the wireless communication apparatus, based on the acquired interference index and the acquired position information, and generates, as the communication state information, information indicating a communication network that satisfies a specific condition among the plurality of communication networks, and a control unit configured to perform control to connect to the communication network that satisfies the specific condition based on the acquired communication state information. This causes operation of performing control to connect to a communication network that satisfies a specific condition on the basis of communication state information supplied from an information processing apparatus that detects the communication network that satisfies the specific condition in the target area on the basis of the interference index of each of a plurality of communication networks.

According to a fourth embodiment of the present disclosure, there is provided a communication system including an information processing apparatus including a supply unit configured to supply an interference index indicating a degree of interference in wireless communication between a wireless communication apparatus and a base station that is a connection target of the wireless communication apparatus, and position information related to a position concerning the interference index, and a wireless communication apparatus including a generation unit configured to specify an interference index concerning a target area to detect a communication state of the wireless communication apparatus, based on the supplied position information, and generate communication state information to notify the communication state based on the specified interference index. This causes operation of specifying the interference index of the target area on the basis of position information supplied by an information processing apparatus and generating communication state information on the basis of this specified interference index.

Advantageous Effects of Invention

According to the present technology, it is possible to provide an excellent effect of understanding an appropriate communication state in wireless communication.

BRIEF DESCRIPTION OF DRAWINGS

FIG. 3 is a block diagram illustrating a configuration example of a wireless communication apparatus in the first embodiment of the present technology.

FIG. 6 is a view simply illustrating one example of pilot signal level information held by a pilot signal level holding unit in the first embodiment of the present technology.

FIG. 7 is a view simply illustrating one example of interference index information held by an interference index information holding unit in the first embodiment of the present technology.

FIG. 25 is a block diagram illustrating a configuration example of a communication system in the seventh embodiment of the present technology.

FIG. 26 is a block diagram illustrating a configuration example of a wireless communication apparatus of a communication system in the eighth embodiment of the present technology.

FIG. 27 is a block diagram illustrating a configuration example of a wireless communication apparatus in the ninth embodiment of the present technology.

FIG. 28 is a view simply illustrating one example of the interference index of each position held by an interference index information holding unit in the tenth embodiment of the present technology.

DESCRIPTION OF EMBODIMENTS

In the following, modes to implement the present technology (hereafter referred to as "embodiments") are described. The explanation is given in the following order.
1. Details to embodiments of the present technology
2. First Embodiment (interference index prediction control: example of predicting interference index on prediction path)
3. Second Embodiment (interference index prediction control: example of acquiring interference index from server)
4. Third Embodiment (interference index prediction control: example of predicting interference index by server)
5. Fourth Embodiment (communication speed prediction control: example of predicting communication speed on prediction path)
6. Fifth embodiment (communication speed prediction control: example of predicting communication speed by server)
7. Sixth Embodiment (radio setting control: example of selecting appropriate communication network based on prediction of communication speed on prediction path)
8. Seventh Embodiment (radio setting control: example of determining whether to change radio setting according to type of application to perform wireless communication)
9. Eighth Embodiment (communication speed prediction control: example of OFDMA scheme)
10. Ninth Embodiment (antenna bar display control: example of generating antenna bar display based on interference index, cell congestion degree and RSSI)
11. Tenth Embodiment (interference index prediction control: example of base station in which directivity changes)

1. Details to Embodiment of the Present Technology

First, details to the embodiments of the present technology are described with reference to FIGS. 1 and 2.

Outline of Interference Caused by Radio Signals from Peripheral Cells

Figure 1A:
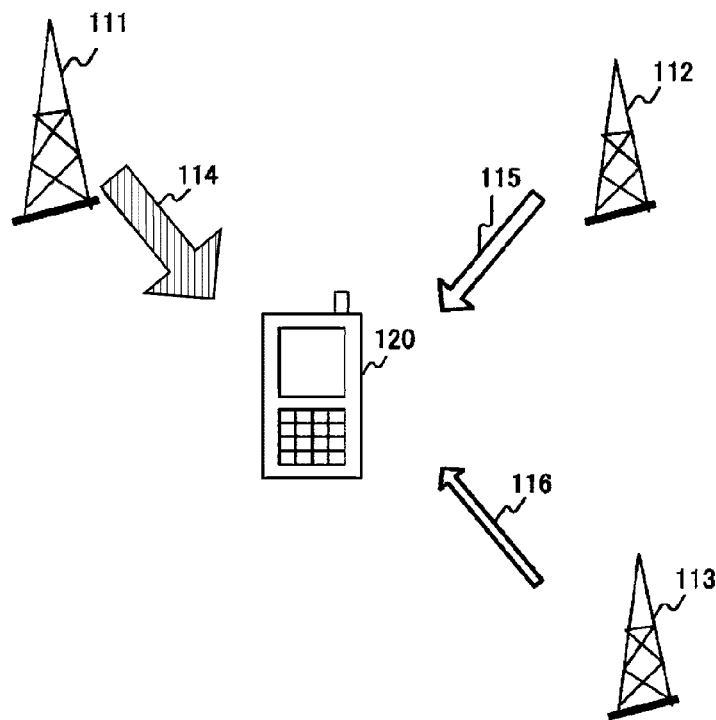
FIG. 1A is a view conceptually illustrating the interference by radio signals from peripheral cells generated while a wireless communication apparatus in an embodiment of this present technology performs wireless communication.
Figure 1B:
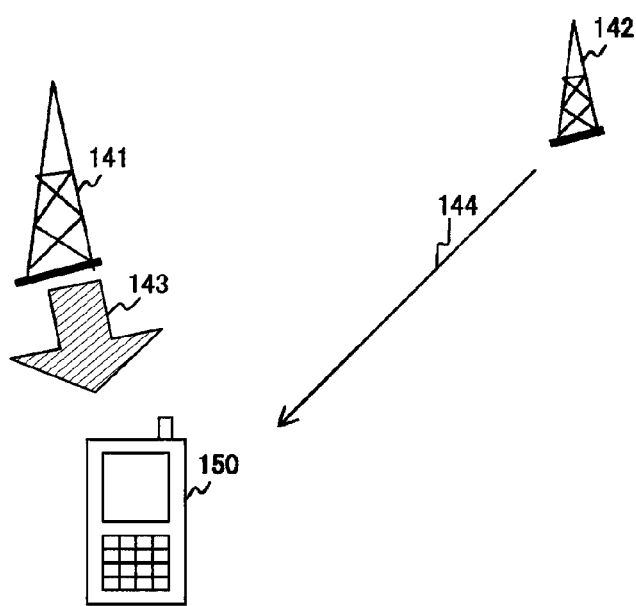
FIG. 1B is a view conceptually illustrating the interference by radio signals from peripheral cells generated while a wireless communication apparatus in an embodiment of this present technology performs wireless communication.

FIG. 1 is a view conceptually illustrating the interference by radio signals from peripheral cells generated while a wireless communication apparatus in an embodiment of this present technology performs wireless communication. FIG. 1A schematically illustrates a case where the interference from the peripheral cells is large, and FIG. 1B schematically illustrates a case where the interference from the peripheral cells is small. Also, in FIG. 1, an explanation is given assuming a wireless communication apparatus (mobile phone) that performs wireless communication in the HSDPA (High Speed Downlink Packet Access) scheme as a wireless communication apparatus.

FIG. 1A illustrates a serving cell 111 a wireless base station (cell) with which a mobile phone (wireless communication apparatus 120) performs data transmission and reception. Further, FIG. 1A illustrates peripheral cells 112 and 113 are as wireless base stations whose radio waves (radio signals) are received by the wireless communication apparatus 120 among other wireless base stations than the serving cell 111.

Since the serving cell 111 is a wireless base station that is the closest to the wireless communication apparatus 120, it performs wireless communication (arrow 114) with the wireless communication apparatus 120. Moreover, since the peripheral cells 112 and 113 are farther as compared with the serving cell 111 though they are close to the extent that sent radio signals are received by the wireless communication apparatus 120, they do not perform wireless communication. However, the radio signals sent by the peripheral cells 112 and 113 reach the wireless communication apparatus 120 (arrows 115 and 116). The radio waves (radio signals) from these peripheral cells 112 and 113 become an interference source that disturbs the wireless communication, for the wireless communication apparatus 120 that performs the wireless communication with the serving cell 111.

FIG. 1B illustrates a serving cell 141 as a wireless base station (cell) with which a mobile phone (wireless communication apparatus 150) performs data transmission and reception. Further, FIG. 1B illustrates a peripheral cell 142 as a wireless base station whose radio signal is received by the wireless communication apparatus 120 among other wireless base stations than the serving cell 111.

The serving cell 141 illustrated in FIG. 1B is located closer to the mobile phone than the serving cell 111 of FIG. 1A. Moreover, the peripheral cell 142 illustrated in FIG. 1B is in a position farther from the mobile phone as compared with the peripheral cells 112 and 113 illustrated in FIG. 1A.

That is, as for a radio signal received by the wireless communication apparatus 150 of FIG. 1B from the wireless base station, the strength (level) of a radio signal from the serving cell is stronger than in the case of FIG. 1A. Meanwhile, the level of a radio signal from the peripheral cell is weaker than in the case of FIG. 1A. By this means, the influence of interference that disturbs wireless communication is weaker in the wireless communication apparatus 150 of FIG. 1B than the wireless communication apparatus 120 of FIG. 1A.

Next, a problem that occurs because of the strength of interference is described with reference to FIG. 2.

Relationship Example Between Strength of Interference and Communication Quality Display FIG. 2 is a view schematically illustrates the relationship between the strength of interference and the communication quality display in the mobile phones (the wireless communication apparatuses 120 and 150) illustrated in FIGS. 1A and 1B.

Figure 2A:
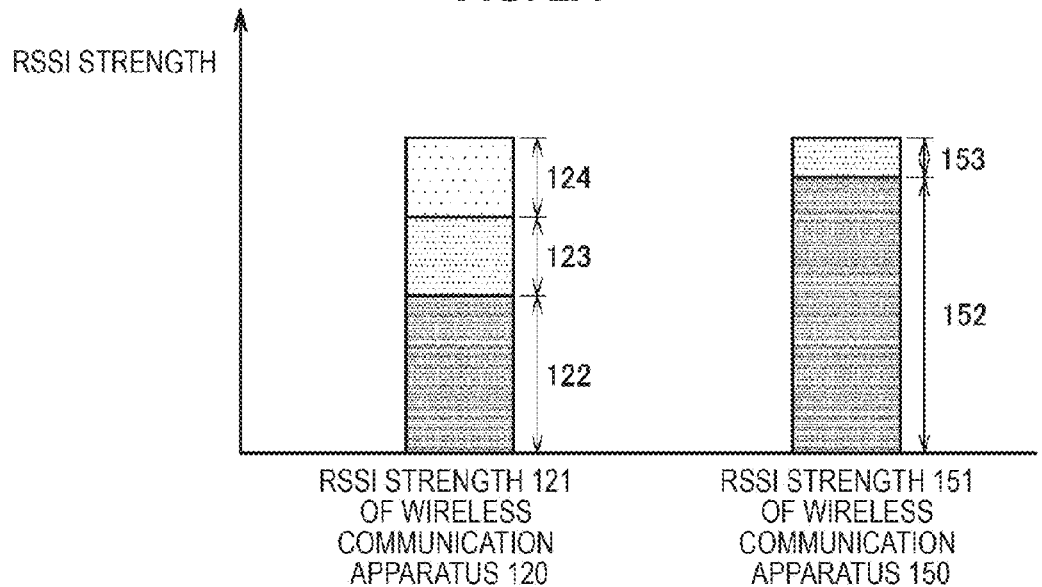
FIG. 2A is a view schematically illustrates the relationship between the strength of interference and the communication quality display in the mobile phones (wireless communication apparatuses) illustrated in FIGS. 1A and 1B.

FIG. 2A illustrates a bar chart showing the level (strength) of a reception signal strength (RSSI: Received Signal Strength Indicator) in radio signals received by the mobile phones (the wireless communication apparatuses 120 and 150) illustrated in FIGS. 1A and 1B. This chart illustrates the RSSI strength (RSSI strength 121) of the wireless communication apparatus 120 and the RSSI strength (RSSI strength 151) of the wireless communication apparatus 150, using the vertical axis as an axis showing the strength of RSSI. Here, in FIG. 2, it is assumed that the RSSI strength 151 and the RSSI strength 121 are the same strength (level).

The RSSI strength 121 shows an RSSI proportion amount 122 indicating the proportion of a radio signal from the serving cell 111 to the RSSI strength 121, and an RSSI proportion amount 123 indicating the proportion of a radio signal from the peripheral cell 112 to the RSSI strength 121. Moreover, the RSSI strength 121 shows an RSSI proportion amount 124 indicating the proportion of a radio signal from the peripheral cell 113 to the RSSI strength 121.

The RSSI strength 151 shows an RSSI proportion amount 152 indicating the proportion of a radio signal from the serving cell 141 to the RSSI strength 151, and an RSSI proportion amount 153 indicating the proportion of a radio signal from the peripheral cell 142 to the RSSI strength 151.

The RSSI strength (the RSSI strength 121 and the RSSI strength 151) illustrated in FIG. 2A is generally used by a wireless communication apparatus (especially, mobile phone) to detect the communication quality. That is, the wireless communication apparatuses 120 and 150 detect the strength of received radio signals (RSSI strength) and measure the communication quality on the basis of the detected RSSI strength. As illustrated in FIG. 2A, the RSSI strength includes the strength of radio signals from peripheral cells in addition to the strength of a radio signal from a serving cell. Depending on the environment, there is a case where the strength of the radio signals from these peripheral cells becomes too large to ignore.

Figure 2B:
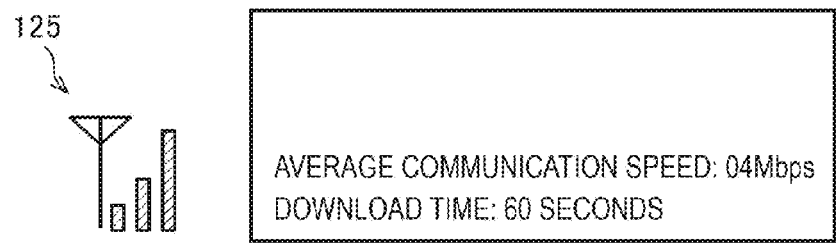
FIG. 2B is a view schematically illustrates the relationship between the strength of interference and the communication quality display in the mobile phones (wireless communication apparatuses) illustrated in FIGS. 1A and 1B.
Figure 2C:
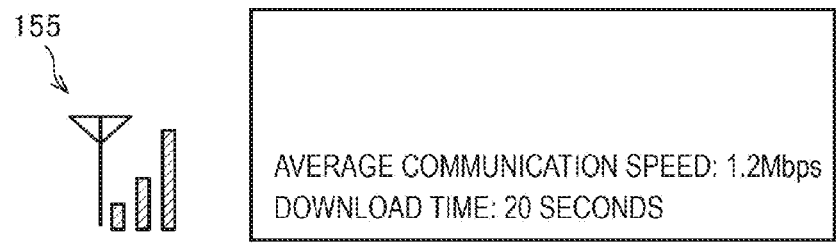
FIG. 2C is a view schematically illustrates the relationship between the strength of interference and the communication quality display in the mobile phones (wireless communication apparatuses) illustrated in FIGS. 1A and 1B.

FIG. 2B illustrates a communication quality display (antenna bar 125) displayed on the wireless communication apparatus 120 on the basis of the RSSI strength 121 illustrated in FIG. 2A, and a display screen (screen 126) schematically illustrating a download result (communication speed) in this state. Moreover, FIG. 2C illustrates a communication quality display (antenna bar 155) displayed on the wireless communication apparatus 150 on the basis of the RSSI strength 151 illustrated in FIG. 2A, and a display screen (screen 156) schematically illustrating a download result (communication speed) in this state.

In both the antenna bar 125 and the antenna bar 155, three antenna bars are shown. However, since the proportion of radio signals from the peripheral cells in the RSSI strength is higher (i.e., the interference is stronger) in FIG. 2B, for example, average communication speed of 0.4 Mbps is displayed on the screen 126 and average communication speed of 1.2 Mbps is displayed on the screen 156. That is, there is a large difference in the average communication speed though three antenna bars are shown to indicate excellent display of the communication quality.

Thus, it is not possible to rely on the antenna bars displayed on the basis of the RSSI strength to appropriately know the communication quality (communication state). However, it is an important content for the user to know appropriate communication quality. For example, in the case of conducting an important conversation, it is assumed that the user thinks that he or she wants to perform transmission in a place in which the communication quality is excellent even a little. Moreover, in the case of using wireless communication while moving, it is assumed that the communication quality on a transfer pathway is anxious.

Therefore, it is requested to appropriately detect the communication quality (communication state). In the embodiments of the present technology, a portable terminal (wireless communication apparatus) including such a function is described.

2. Second Embodiment

Configuration Example of Wireless Communication Apparatus

FIG. 3 is a block diagram illustrating a configuration example of a wireless communication apparatus 200 in the first embodiment of the present technology.

Here, in addition to the wireless communication apparatus 200, a wireless base station (base station 160) with which the wireless communication apparatus 200 performs wireless communication is illustrated in FIG. 3.

The wireless communication apparatus 200 is a portable communication apparatus (such as a mobile phone and a smart phone), and includes a communication unit 210, a pilot signal detection unit 220, a peripheral cell information acquisition unit 230, and a peripheral cell information holding unit 240 and a pilot signal level holding unit 250. Moreover, the wireless communication apparatus 200 includes a serving cell decision unit 260, a serving cell information holding unit 270, an interference index generation unit 280, a position information acquisition unit 310, an interference index information holding unit 320, a position information history holding unit 330, a transfer pathway prediction unit 340, an interference index prediction unit 350, a display image generation unit 360 and the display unit 370.

The communication unit 210 performs communication by transmitting and receiving radio waves (radio signals). This communication unit 210 receives at least report information on pilot signals and peripheral cells from a radio signal (wireless link 161) from the base station 160.

The pilot signal detection unit 220 detects a pilot signal from a radio signal received by the communication unit 210. With respect to the radio signal received by the communication unit 210, this pilot signal detection unit 220 detects the pilot signal included in this radio signal by the use of a scramble code that is the unique code assigned to each base station. By this means, even in a case where radio signals received by the communication unit 210 include radio signals from a plurality of base stations, the wireless communication apparatus 200 can detect respective pilot signals of the plurality of base stations. The pilot signal detection unit 220 generates information (pilot signal level information) associating the strength of the detected pilot signal (pilot signal level) and information to specify a base station that sent the pilot signal (for example, scramble code). Subsequently, the pilot signal detection unit 220 supplies the generated pilot signal level information to the pilot signal level holding unit 250 to hold the pilot signal level information in the pilot signal level holding unit 250.

Moreover, in a case where it is not possible to specify the scramble code of a serving cell or peripheral cell, the pilot signal detection unit 220 performs correlation detection by three-step cell search and specifies a scramble code in which the highest correlation is detected. Subsequently, the pilot signal detection unit 220 decides a base station (cell) to which the specified scramble code is assigned, as a serving cell. Here, the serving cell is a cell (base station) with which the wireless communication apparatus is performing wireless communication and connecting, or a cell to be connected and specified by the cell search. That is, the serving cell indicates a cell (base station) of the connection target.

Here, the pilot signal detection unit 220 regularly or irregularly updates the pilot signal level information held by the pilot signal level holding unit 250. In the case of updating the pilot signal level information, the pilot signal detection unit 220 acquires information to specify a peripheral cell (peripheral cell information) and information to specify a serving cell (serving cell information) from the peripheral cell information holding unit 240 and the serving cell information holding unit 270. Subsequently, the pilot signal detection unit 220 detects the pilot signal strength (pilot signal levels) of the serving cell and the peripheral cell respectively, supplies them to the pilot signal level holding unit 250 and updates the pilot signal level information.

The pilot signal level holding unit 250 holds pilot signal level information of the serving cell and the peripheral cell respectively. Since the pilot signal detection unit 220 regularly or irregularly detects the pilot signal levels, the pilot signal level information held by this pilot signal level holding unit 250 is regularly or irregularly updated. Here, the pilot signal level information held by the pilot signal level holding unit 250 is described with reference to FIG. 6 and therefore its explanation is omitted herein.

The peripheral cell information acquisition unit 230 acquires information (peripheral cell information) on peripheral cells included in the report information sent by the serving cell. This peripheral cell information acquisition unit 230 receives the report information of the cell (serving cell) indicated by serving cell information supplied from the serving cell information holding unit 270, and acquires the peripheral cell information from the received report information.

The peripheral cell information acquisition unit 230 acquires at least scramble codes assigned to the peripheral cells and the timing difference information with respect to respective pilot signals of the peripheral cells. Here, the timing difference information denotes information that shows the difference between the reception timing of the pilot signal of the serving cell and the reception timing of the pilot signal of a peripheral cell every peripheral cell. Also, in a case where the base station is a synchronization system that uses a GPS (Global Positioning System) signal and reports the timing difference with respect to the GPS signal instead of the timing difference information, the timing difference with reference to this GPS signal is acquired. The peripheral cell information acquisition unit 230 supplies the acquired peripheral cell information to the peripheral cell information holding unit 240 and holds the peripheral cell information in the peripheral cell information holding unit 240.

The peripheral cell information holding unit 240 holds the peripheral cell information supplied from the peripheral cell information acquisition unit 230. That is, the peripheral cell information holding unit 240 holds at least the scramble code of a peripheral cell and the timing difference information every peripheral cell. The peripheral cell information held by this peripheral cell information holding unit 240 is used when the pilot signal detection unit 220 acquires the pilot signal level.

The serving cell decision unit 260 decides a serving cell on the basis of the pilot signal level information held by the pilot signal level holding unit 250. This serving cell decision unit 260 detects pilot signal level information of the highest pilot signal level and decides a cell (base station) indicated by the scramble code of this pilot signal level information as a serving cell.

Moreover, the serving cell decision unit 260 performs serving cell switching (reselection) processing. First, the serving cell decision unit 260 acquires pilot signal level information on a cell designated by serving cell information supplied from the serving cell information holding unit 270, from the pilot signal level holding unit 250, and specifies the pilot signal level of the current serving cell. Subsequently, the serving cell decision unit 260 analyzes whether there is a peripheral cell that sends a pilot signal of a higher level that is higher than this specified pilot signal level. In the case of detecting the peripheral cell of a higher pilot signal level than the current serving cell, the serving cell decision unit 260 performs serving cell switching processing to set the cell that sent this pilot signal as a serving cell.

The serving cell decision unit 260 supplies information on the cell decided as a serving cell (serving cell information) to the serving cell information holding unit 270 and causes the serving cell information holding unit 270 to hold it. Here, the serving cell information includes at least the scramble code of the cell decided as the serving cell and information on the reception level of the pilot signal of this decided cell.

The serving cell information holding unit 270 holds the serving cell information supplied from the serving cell decision unit 260. The serving cell information held by this serving cell information holding unit 270 is supplied to the peripheral cell information acquisition unit 230, the pilot signal detection unit 220, the serving cell decision unit 260 and the interference index generation unit 280.

The interference index generation unit 280 generates an interference index on the basis of the pilot signal level information held by the pilot signal level holding unit 250. Here, the interference index denotes an index indicating the degree of communication interception (interference) caused due to a radio signal from a peripheral cell. That is, the interference index is a value indicating strong interference in the communication state like the RSSI strength 121 in FIG. 2A, and is a value indicating weak interference in the communication state like the RSSI strength 151 in FIG. 2B. Also, a calculation method of the interference index is described with reference to FIG. 6 and therefore its explanation is omitted herein. The interference index generation unit 280 supplies the generated interference index to the interference index information holding unit 320.

The position information acquisition unit 310 regularly or irregularly acquires position information (longitude and latitude) that shows the current position of the wireless communication apparatus 200. This position information acquisition unit 310 acquires at least position information at the timing at which the interference index generation unit 280 generated the interference index (i.e., the detection timing of a pilot signal that is the basis of the generation of the interference index). Here, regarding the current position detection by this position information acquisition unit 310, various detection methods are possible. For example, there are a method of using GPS (Global Positioning System), a method of using base station position information reported from the base station or a method of downloading base station position information from a network by the use of the identifier (cell ID) unique to each base station. The position information acquisition unit 310 supplies the acquired position information to the interference index information holding unit 320 and the position information history holding unit 330.

The interference index information holding unit 320 holds information (interference index information) linking the interference index generated by the interference index generation unit 280 and the position information generated by the position information acquisition unit 310. That is, the interference index information holding unit 320 links and holds the interference index and the position of the wireless communication apparatus 200 at the timing at which the interference index is detected. Here, the interference index information holding unit 320 may hold the interference index every frequency channel to hold the interference index difference due to the difference in base station arrangement every frequency channel. Further, the interference index information holding unit 320 may hold reception signal strength (RSSI), the reception strength (RSCP) of the pilot signal of the serving cell or the reception strength (RSRP) of a reference signal. Thus, by linking and holding an interference index and the position of the wireless communication apparatus 200 at the timing at which the interference index is detected, the interference index information holding unit 320 can accumulate an interference index of an area in which the user has been present once. Also, one example of the interference index information is described with reference to FIG. 7 and therefore its explanation is omitted herein. The interference index information held by the interference index information holding unit 320 is supplied to the interference index prediction unit 350. Here, the interference index information holding unit 320 is one example of the holding unit described in the claims.

The position information history holding unit 330 holds the position information supplied from the position information acquisition unit 310 in chronological order and holds the history of the position of the wireless communication apparatus 200. That is, the position information history holding unit 330 holds the history of the transfer pathway up to the current position (i.e., movement history). Here, the position information held by this position information history holding unit 330 is held for at least the quantity requested to predict the future transfer pathway of the wireless communication apparatus 200 in the transfer pathway prediction unit 340. The position information history holding unit 330 supplies the held movement history to the transfer pathway prediction unit 340.

The transfer pathway prediction unit 340 predicts the future transfer pathway on the basis of the position information (movement history) held by the position information history holding unit 330 in chronological order. The transfer pathway prediction unit 340 supplies the predicted future transfer pathway (prediction path) to the interference index prediction unit 350.

The interference index prediction unit 350 calculates (predicts) the interference index of each position on the prediction path supplied from the transfer pathway prediction unit 340, on the basis of the interference index supplied from the interference index information holding unit 320. That is, the interference index prediction unit 350 assumes each position on the prediction path as a target area for interference index detection and predicts the communication state (interference index) in this target area. This interference index prediction unit 350 acquires the interference index linked with a position on the prediction path or a position close thereto from the interference index information holding unit 320, and, based on this acquired interference index, calculates (specifies) an interference index on the prediction path. In a case where an interference index linked with the same position as the position on the prediction path is held by the interference index information holding unit 320, the interference index prediction unit 350 assumes this interference index as an interference index of that position. Moreover, in a case where only the interference index linked with the close position is held by the interference index information holding unit 320, an interference index on the prediction path is predicted from that interference index. The interference index prediction unit 350 supplies the prediction path in which the interference index of each position on the prediction path is assigned to the position information (i.e., interference-indexed prediction path) to the display image generation unit 360. Here, the interference index prediction unit 350 is one example of the acquisition unit and the generation unit described in the claims.

Figure 4A:
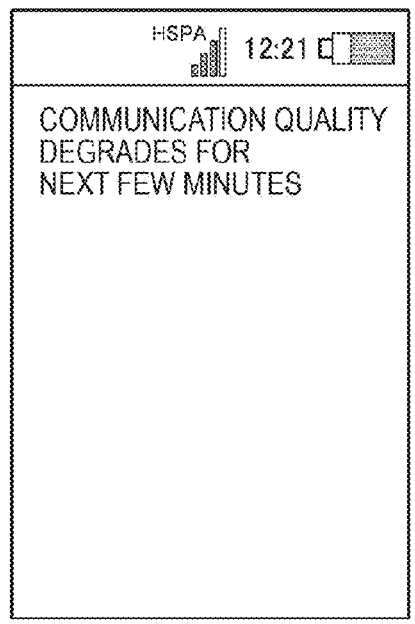
FIG. 4A is a view illustrating one example of the display of communication quality in the first embodiment of the present technology.
Figure 4B:
FIG. 4B is a view illustrating one example of the display of communication quality in the first embodiment of the present technology.

Moreover, the interference index prediction unit 350 may acquire the interference index of each position on the prediction path supplied from the transfer pathway prediction unit 340, from the interference index information holding unit 320 through information on the above-mentioned position. Further, it may be possible to acquire the reception signal strength (RSSI) of each position on the prediction path, the reception strength (RSCP) of the pilot signal of the serving cell or the reception strength (RSRP) of a reference signal. Moreover, the interference index prediction unit 350 may calculate the SIR (Signal to Interference Ratio) or communication quality such as the prediction communication speed, by the use of the above-mentioned interference index and the reception signal strength (RSSI) of each position on the prediction path, the reception strength (RSCP) of the pilot signal of the serving cell or the reception strength (RSRP) of the reference signal. Further, this communication quality may be an average value on the prediction path. FIGS. 4A and 4B are one example of display of the communication quality.

Figure 5:
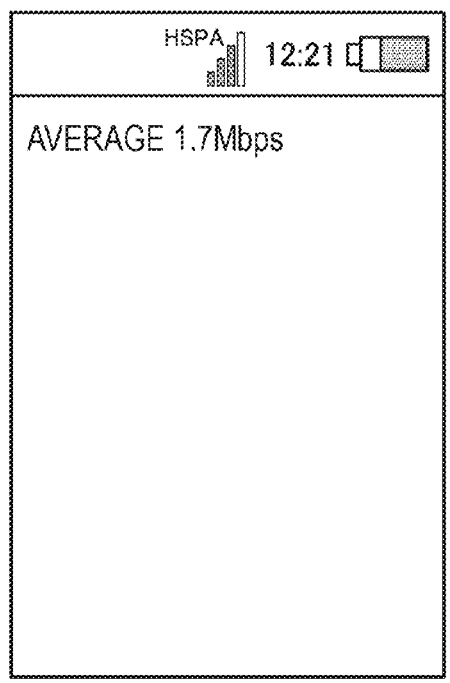
FIG. 5 is a view illustrating an example of displaying a calculation result of the prediction communication speed in the first embodiment of the present technology.

FIG. 4A is a display example in a text format in a case where the calculation result of the communication quality in the interference index prediction unit 350 is a more deteriorated result than the current communication quality. For example, the display like "communication quality degrades for next few minutes" is performed. Moreover, FIG. 4B is a display example in a text format in a case where the calculation result of the communication quality in the interference index prediction unit 350 is a more improved result than the current communication quality. The display like "communication quality has been improved" is performed. Also, the display in the text format is not limited to these examples, and various expressions that can notify the user of the similar content are possible. Moreover, a display method is possible in which these kinds of display are performed only when the communication quality varies, and deleted after a predetermined time from the display. Further, the calculation result of the prediction communication speed in the interference index prediction unit 350 may be displayed as illustrated in FIG. 5. Here, the display method is not limited to the display by text, and the communication quality such as SIR and the prediction communication speed may be displayed in a format such as a chart, a meter and an icon.

The display image generation unit 360 generates an image (display image) to be displayed on the display unit 370, on the basis of the interference-indexed prediction path supplied from the interference index prediction unit 350. For example, the display image generation unit 360 generates an image in which the prediction path indicated by the interference-indexed prediction path and the interference index on this prediction path are described in a map image of the vicinity of the current position of the wireless communication apparatus 200, and causes the display unit 370 to display this generated image. By this display, the interference index (communication state) on the prediction path is notified to the user. Here, a display example of the interference-indexed prediction path is described with reference to FIGS. 8 and 9.

The display unit 370 displays various kinds of information (such as character information and time information) to the user. For example, the display unit 370 displays the interference-indexed prediction path (for example, see FIGS. 8 and 9) supplied from the interference index prediction unit 350. Here, as the display unit 370, for example, it is possible to use display panels such as an organic EL (Electro Luminescence) panel and an LCD (Liquid Crystal Display) panel.

Example of Pilot Signal Level Information Held by Pilot Signal Level Holding Unit FIG. 6 is a view simply illustrating one example of pilot signal level information held by the pilot signal level holding unit 250 in the first embodiment of the present technology.

Also, in FIG. 6, an explanation is given with an assumption that the pilot signal levels are preserved in the pilot signal level holding unit 250 in descending order (upper side in FIG. 6).

FIG. 6 illustrates a table (table 251) that simply shows the pilot signal level information held by the pilot signal level holding unit 250. As shown in the table 251, a scramble code (column 253) and a pilot signal level (column 254) are associated and held in the pilot signal level holding unit 250. Moreover, a column 252 that shows the base station (cell) of each pilot signal level is shown in the table 251 to identify a serving cell and peripheral cells in the example of the pilot signal level (column 254) shown herein.

Here, the table 251 is used to describe the decision of the serving cell by the serving cell decision unit 260.

As shown in the table 251, the serving cell decision unit 260 detects pilot signal level information with the highest pilot signal level in a state where pilot signals of seven cells have been detected. Subsequently, the serving cell decision unit 260 decides a cell indicated by the scramble code ("128") of this detected pilot signal level information ("−78" dBm), as the serving cell, and causes the serving cell information holding unit 270 to hold it. Moreover, in a case where the serving cell has already been decided and there is a cell of a pilot signal level higher than the serving cell, the serving cell decision unit 260 updates the serving cell (cell reselection). Here, in this cell reselection processing, the hysteresis property is given so as to avoid that the serving cell is frequently switched in an area in which the pilot signal levels of the serving cell and peripheral cell 1 are equivalent. To be more specific, processing of switching the serving cell may be performed on the condition that the pilot signal level of the peripheral cell 1 (which is a peripheral cell with the highest pilot signal level) with respect to the pilot signal level of the current serving cell is equal to or greater than an arbitrary threshold.

Next, the table 251 is used to describe interference index calculation by the interference index generation unit 280.

In a case where the pilot signal levels of the serving cell and peripheral cells are detected as shown in the table 251, interference index ($k_{if}$) is calculated using, for example, following equation 1.

[Math. 1]

$$k_{if} = \frac{\sum_{n=1}^{6} P_{CPICHneighb\#n}}{P_{CPICHserv}} \quad \text{(Equation 1)}$$

where, "$P_{CPICHserv}$" denotes a value converting the pilot signal level of the serving cell into the anti-logarithm. The value calculated by "Σ" in the numerator of the right side denotes a value summing up values converting the pilot signal levels of the peripheral cells into the antilogarithms. That is, "$P_{CPICHneighb\#1}$" to "$P_{CPICHneighb\#6}$" indicate values converting the pilot signal levels of peripheral cells #1 to #6 into the antilogarithms.

The interference index (Kif) calculated by above-mentioned equation 1 is a value that becomes "0" in an environment where interference does not exist at all. It becomes "1" when the interference increases and the degree (level) of interference and the pilot signal level of the serving cell become equal, and becomes a larger value when the degree of interference further increases.

Also, the interference index calculated from seven pilot signal levels of the pilot signal level information shown in the table 251 by the use of equation 1 becomes "0.218."

Example of Interference Index Every Position Held by Interference Index Information Holding Unit FIG. 7 is a view simply illustrating one example of interference index information held by the interference index information holding unit 320 in the first embodiment of the present technology.

FIG. 7 illustrates a table (table 321) that simply shows interference index information (information linking an interference index and a position in which the interference index is detected) held together with a detected position. As shown in the table 321, position information (a column 322 that shows the longitude and a column 323 that shows the latitude) that shows a position in which an interference index is detected, and the interference index (a column 324) are associated (linked) and held in the interference index information holding unit 320. Here, this table may be held every frequency channel as described in FIG. 3.

As shown in the table 321, an interference index can be linked with a position in which the interference index is detected, and held by providing the interference index information holding unit 320. Here, although it is desirable that the interference index information held by the interference index information holding unit 320 is as much as possible, in a case where the storage capacity is restricted, it is considered that the use frequency in the interference index prediction unit 350 is recorded and the one with less use frequency is deleted in order.

Display Example of Interference-Indexed Prediction Path

Figure 8:
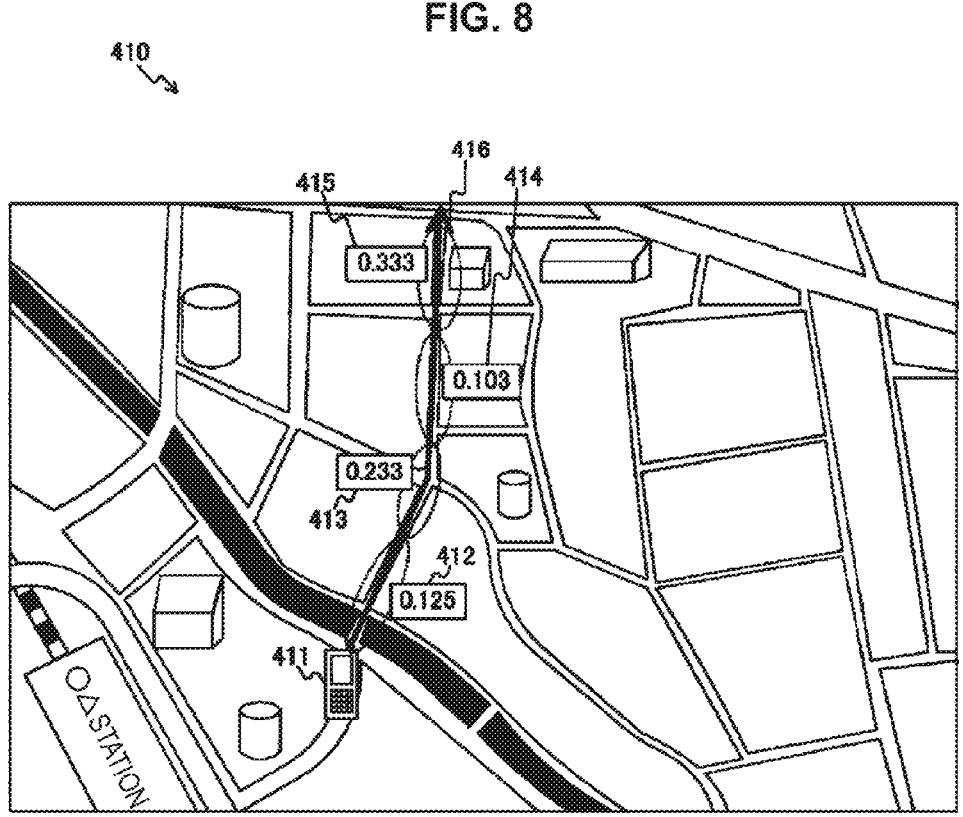
FIG. 8 is a schematic diagram illustrating one example of a display screen that shows an interference-indexed prediction path displayed on a display unit in the first embodiment of the present technology.
Figure 9:
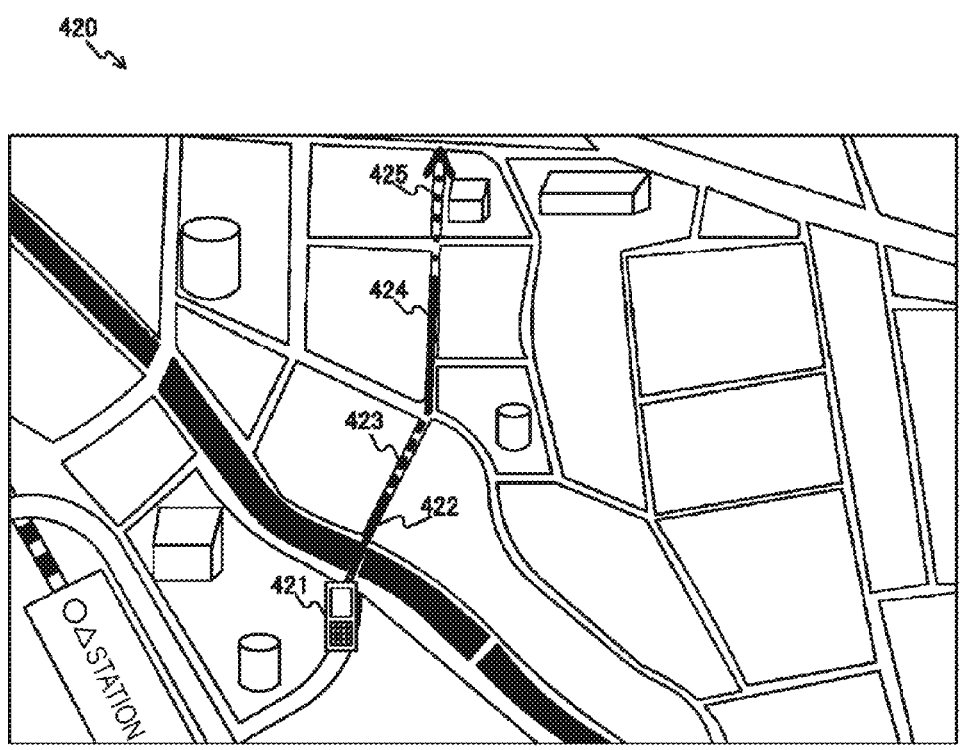
FIG. 9 is a schematic diagram illustrating one example of a display screen that shows an interference-indexed prediction path displayed on a display unit in the first embodiment of the present technology.

FIGS. 8 and 9 are schematic diagrams illustrating one example of a display screen that shows an interference-indexed prediction path displayed on the display unit 370 in the first embodiment of the present technology.

In FIG. 8, an explanation is given to an example of showing interference indices on the prediction path by numerical values. Also, in FIG. 9, an explanation is given to an example of showing interference indices on the prediction path by the difference in a display color that shows the prediction path and in the line thickness. Here, in FIGS. 8 and 9, an explanation is given with an assumption that the interference indices are calculated using above-mentioned equation 1. Moreover, it is assumed that the prediction path and the interference indices on the prediction path in FIG. 9 are similar to those illustrated in FIG. 8.

A sign (mobile phone 411) that shows the current position of the wireless communication apparatus 200 and a thick-line arrow (arrow 416) that shows the prediction path are displayed on a display screen (screen 410) of the interference-indexed prediction path illustrated in FIG. 8. Moreover, numerical values (interference index values 412 to 415) that show respective interference indices on the prediction path are shown on the screen 410.

From the values indicated in the interference index values 412 to 415, the user can recognize that interference is relatively low (0.125 and 0.103) in the paths indicated by the interference index values 412 and 414. Moreover, the user can recognize that interference is relatively high (0.233 and 0.333) in the path indicated by the interference index value 415 and recognize that interference is close to an average value on the prediction path in the path indicated by the interference index value 413.

A sign (mobile phone 421) that shows the current position and lines (lines 422 to 425) that show both interference indices on prediction paths and the prediction paths are shown on a display screen (screen 420) of the interference-indexed prediction path illustrated in FIG. 9. Here, the lines 422 and 424 are shown by straight lines, the line 423 is shown by a broken line and the line 425 is shown by a dotted line.

In the line types of the lines 422 to 425, the straight line shows a prediction path in which interference is relatively low, the dotted line shows a prediction path in which interference is relatively high, and the broken line shows a prediction path in which interference is close to an average value on the prediction path. Here, in FIG. 9, although both the interference indices and the prediction paths are shown by the line type difference, in the case of the display unit 370 that can perform color display, it is possible to perform display more clearly by changing the color of a line that shows a prediction path. For example, it is possible to perform display more clearly by setting the blue to a position with low interference, the red to a position with high interference and the yellow to a position in which interference is close to an average value on the prediction path.

As shown in the screen 410 and the screen 420, the wireless communication apparatus 200 can predict interference indices on the transfer pathway predicted by the transfer pathway prediction unit 340, on the basis of the interference indices held by the interference index information holding unit 320. By displaying the value of the interference index of the current position or the interference indices on the transfer pathway to the user as a display image (the screen 410), the user can easily recognize the future wireless communication quality (communication state). By this means, the user can easily determine whether to perform activation of an application with the download of large-volume data by radio now or perform it at an arbitrary point on the transfer pathway.

Here, although an example of displaying interference indices by numerical values and line types in the screens 410 and 420 has been described, it is not limited to this, and, for example, it is possible to perform display by icons that evoke the size of interference. Moreover, the display of interference indices to the user is not limited to the method of displaying them on map information. Besides, it is considered that whether the future interference increases according to the movement on a prediction path or the future interference decreases according to the movement on the prediction path is shown for the user by the use of a text that shows the increase and decrease of interference or an icon that evokes the increase and decrease of interference.

Moreover, although the display timing of the screens 410 and 420 is not described in FIGS. 8 and 9, for example, the case of performing the display all the time or the case of starting the display in synchronization with the timing of activating an application (for example, browser) is possible. Moreover, when the synchronized application is terminated, the display of the screens 410 and 420 may be stopped or the display of part of the display screens may be continued.

Operation Example of Wireless Communication Apparatus

Next, the operation of the wireless communication apparatus 200 in the first embodiment of the present technology is described with reference to the drawings.

Figure 10:
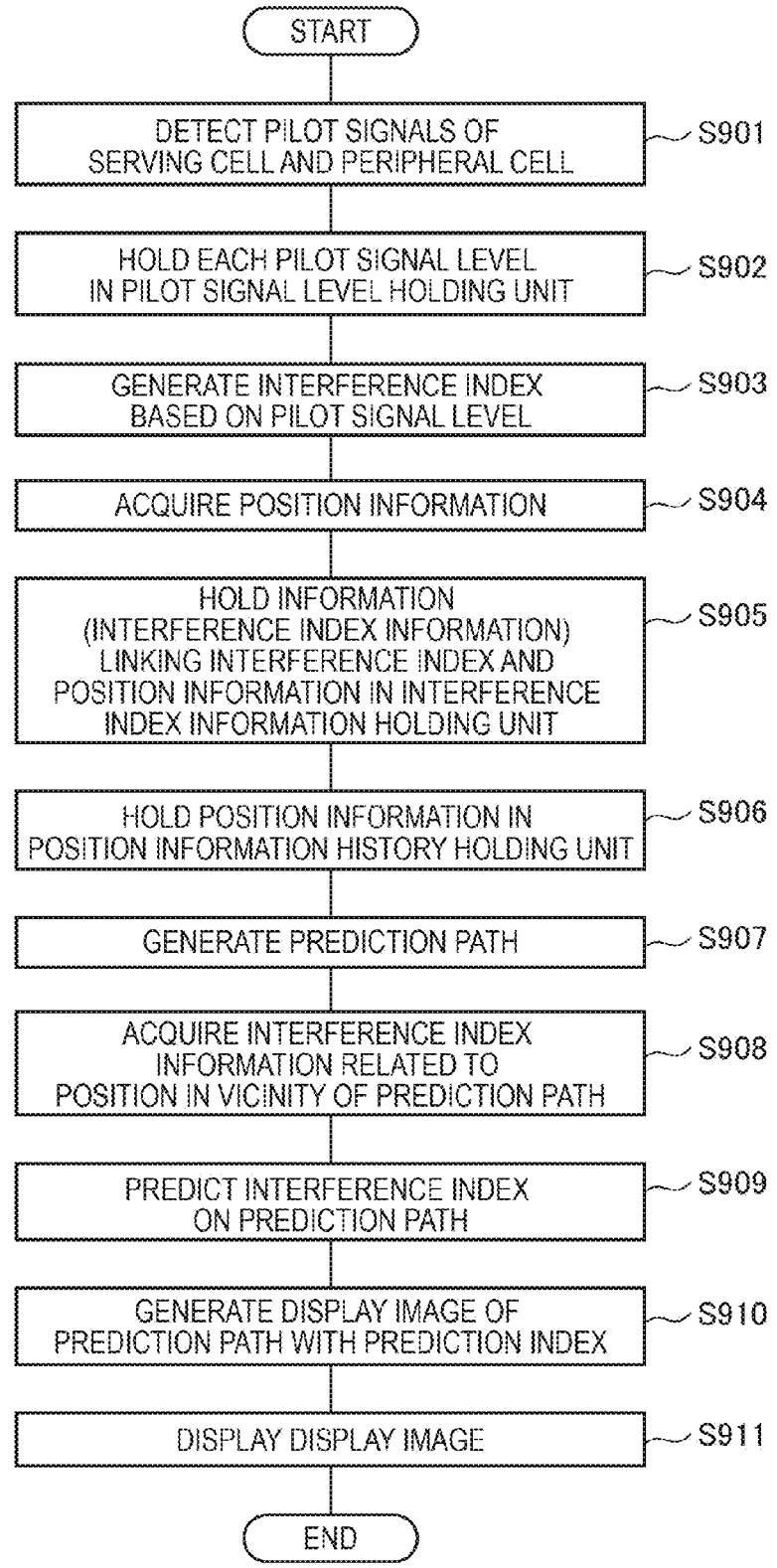
FIG. 10 is a flowchart that shows an interference-indexed prediction path generation processing procedure example when an interference-indexed prediction path is generated by a wireless communication apparatus in the first embodiment of the present technology.

FIG. 10 is a flowchart showing an interference-indexed prediction path generation processing procedure example when an interference-indexed prediction path is generated by the wireless communication apparatus 200 in the first embodiment of the present technology. Also, in FIG. 10, one operation in the generation of the interference-indexed prediction path from the detection of a new pilot signal level to the display of the interference-indexed prediction path on the display unit 370 is described.

First, pilot signals of a serving cell and peripheral cells are detected by the pilot signal detection unit 220 (step S901). Moreover, in this step S901, the pilot signal levels of the serving cell and the peripheral cells are detected respectively.

Subsequently, the detected pilot signal levels are associated (linked) with scramble codes and held in the pilot signal level holding unit 250 as pilot signal level information (step S902). Next, interference indices are generated by the interference index generation unit 280 on the basis of the pilot signal levels held by the pilot signal level holding unit 250 (step S903). For example, this interference index generation is performed using equation 1 illustrated in the explanation of FIG. 6.

Next, positions in which the interference indices are detected (i.e., positions in which the pilot signals that are the basis of the interference indices are detected) are acquired by the position information acquisition unit 310 (step S904). Subsequently, the interference indices generated by the interference index generation unit 280 and the positions (position information) acquired by the position information acquisition unit 310 are associated and held in the interference index information holding unit 320 as interference index information (step S905).

Moreover, the position information acquired by the position information acquisition unit 310 is held in the position information history holding unit 330 as a history of position information up to the present time (i.e., movement history) in chronological order (step S906). Afterwards, the future prediction path is generated by the transfer pathway prediction unit 340 on the basis of the transfer pathway held by the position information history holding unit 330 (step S907). Subsequently, an interference index linked with the position of this prediction path or a position in the vicinity of the prediction path is acquired from the interference index information holding unit 320 on the basis of the prediction path generated by the transfer pathway prediction unit 340 (step S908). Afterwards, the interference index of each position on the prediction path is predicted by the interference index prediction unit 350 (step S909). Here, step S908 is one example of the acquisition step described in the claims. Moreover, step S909 is one example of the generation step described in the claims.

Subsequently, after a display image to display the interference indices on the prediction path together with the prediction path is generated (step S910), this display image is displayed on the display unit 370 (step S911), and the interference-indexed prediction path generation processing procedure is terminated.

Thus, according to the first embodiment of the present technology, it is possible to predict an interference index on a prediction path and display this predicted interference index together with the prediction path. That is, it is possible to acquire the communication state in wireless communication and notify the use of this communication state.

Also, since a pilot signal is always sent from a base station, the wireless communication apparatus 200 can generate an interference index in wireless communication with the base station detected as a connection candidate in a communication standby state or the like. That is, since it is possible to generate interference index information from a pilot signal that is detected at the time of a usual standby state, it is possible to reduce the load of the wireless communication apparatus at the time of generating the interference index information.

3. Second Embodiment of the Present Technology

In the first embodiment of the present technology, an explanation has been given to an example where interference index information linking position information acquired by the position information acquisition unit 310 with an interference index generated by the interference index generation unit 280 is held in the interference index information holding unit 320. In this example, as for the interference index information holding unit 320, only an interference index of a position in which the wireless communication apparatus 200 has been present is held in the interference index information holding unit 320. That is, in a case where a transfer pathway predicted by the transfer pathway prediction unit 340 is a path through which the wireless communication apparatus 200 has not passed (or gone), since data of an interference index in the vicinity of this path does not exist in the interference index information holding unit 320, the interference index prediction unit 350 cannot appropriately predict an interference index in a prediction path.

Figure 11:
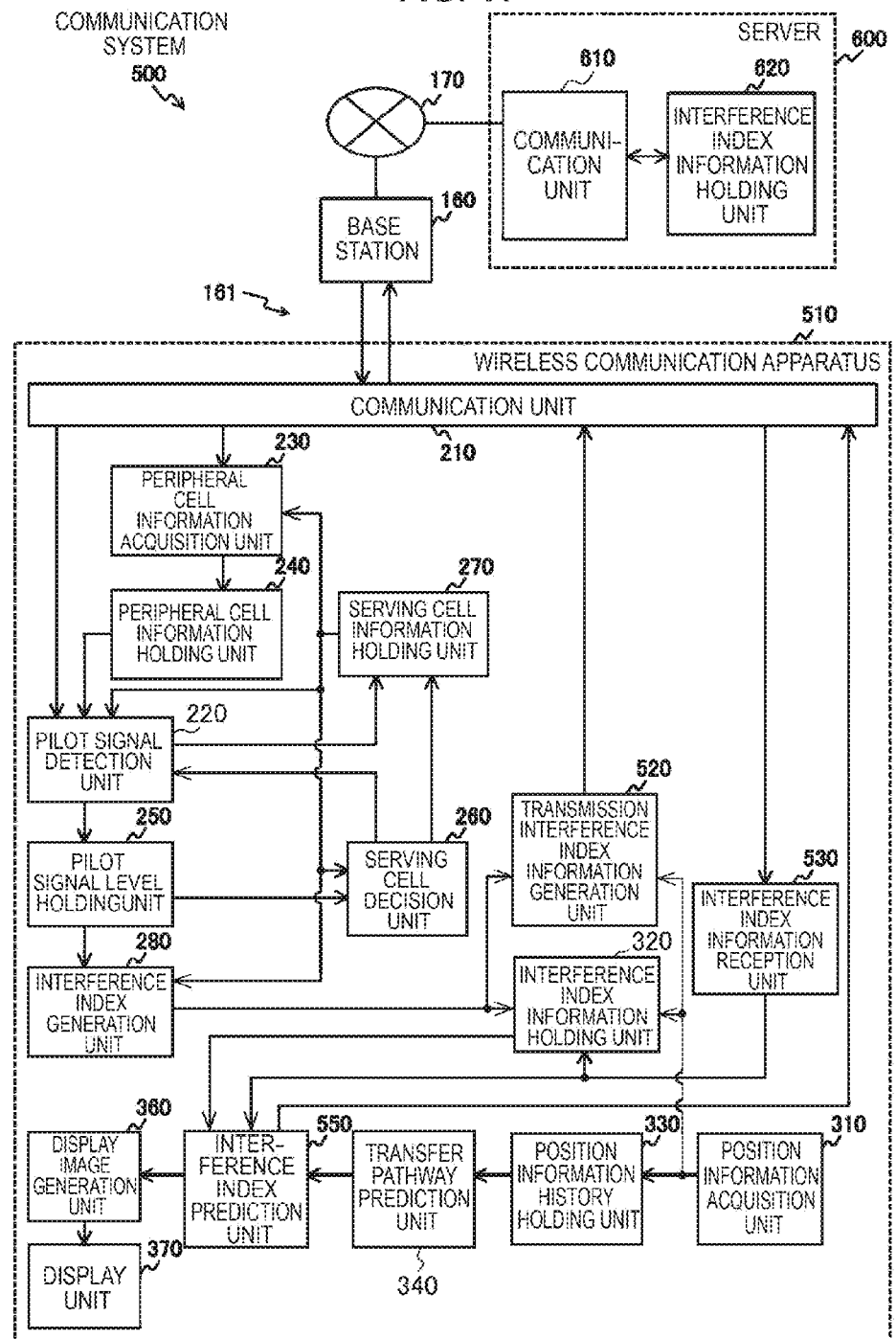
FIG. 11 is a block diagram illustrating a configuration example of a communication system in the second embodiment of the present technology.

Therefore, in the second embodiment of the present technology, with reference to FIG. 11, an explanation is given to an example where interference index information is acquired from a server that holds an interference index when there is no interference index information requested to predict an interference index on a prediction path in the interference index information holding unit 320.

Configuration Example of Wireless Communication System

FIG. 11 is a block diagram illustrating a configuration example of a communication system 500 in the second embodiment of the present technology.

The communication system 500 includes a wireless communication apparatus 510, the base station 160, a public line network 170 and a server 600. Here, the base station 160 is similar to the one illustrated in FIG. 3 and therefore its explanation is omitted herein.

The wireless communication apparatus 510 is an alternation example of the wireless communication apparatus 200 illustrated in FIG. 3, and includes a transmission interference index information generation unit 520 and an interference index information reception unit 530 in addition to each component of the wireless communication apparatus 200. Moreover, the wireless communication apparatus 510 includes an interference index prediction unit (interference index prediction unit 550) in which a function to acquire interference index information held by the server 600 is added to the interference index prediction unit 350 illustrated in FIG. 3. Here, an explanation is given focusing on the transmission interference index information generation unit 520, the interference index information reception unit 530 and the interference index prediction unit 550.

The transmission interference index information generation unit 520 transmits an interference index detected by the wireless communication apparatus 510 to a server (server 600) that holds interference index information. This transmission interference index information generation unit 520 transmits at least information linking an interference index generated by the interference index generation unit 280 and position information generated by the position information acquisition unit 310 (i.e., interference index information) to the server 600. The transmission interference index information generation unit 520 generates the interference index information to be transmitted, and transmits this generated interference index information to the communication unit 210. Subsequently, the communication unit 210 transmits the interference index information to the base station 160 through wireless communication (the wireless link 161). Afterwards, the base station 160 transmits the interference index information to the server 600 via the public line network (the public line network 170), and the interference index information generated by the transmission interference index information generation unit 520 is received by the server 600.

Also, since the server 600 does not use the interference index information in real time, the timing at which the interference index information generated by the transmission interference index information generation unit 520 is transmitted to the server 600 may be a fixed timing or a variable timing. Since it may be a variable timing, it is possible to mitigate the load of wireless communication by, for example, increasing the transmission frequency in an area with good wireless communication quality and decreasing the transmission frequency in an area with poor wireless communication quality. For example, there is a possible method of temporarily storing the interference index information generated by the transmission interference index information generation unit 520 until reaching an area with good wireless communication quality, and collectively transmitting it to the server 600 at the timing of reaching the area with good wireless communication quality.

The interference index prediction unit 550 calculates an interference index on a prediction path supplied from the transfer pathway prediction unit 340, as well as the interference index prediction unit 350 illustrated in FIG. 3. Here, in a case where the interference index information requested to calculate interference index on the prediction path is not held by the interference index information holding unit 320, the interference index prediction unit 550 generates information (acquisition information) to acquire interference index information from the server 600. This acquisition information includes at least position information (longitude and latitude) of the prediction path.

The interference index prediction unit 550 supplies the generated acquisition information to the communication unit 210 to transmit it from the communication unit 210 to the server 600 through the wireless link 161. Subsequently, in a case where the interference index information acquired on the basis of the acquisition information is supplied from the interference index information reception unit 530, an interference index is calculated using the interference index information. That is, the interference index prediction unit 550 generates an interference-indexed prediction path on the basis of the interference index information held by the interference index information holding unit 320, the interference index information supplied from the server 600 and the prediction path generated by the transfer pathway prediction unit 340.

The interference index information reception unit 530 receives the interference index information transmitted from the server 600 on the basis of the acquisition information generated by the interference index prediction unit 550. This interference index information reception unit 530 supplies the received interference index information to the interference index prediction unit 550. Moreover, the interference index information reception unit 530 supplies the received interference index information to the interference index information holding unit 320 and holds it in the interference index information holding unit 320.

The public line network 170 denotes a public line network such as a telephone network and the Internet.

The server 600 is a server to hold the interference index information and supply the held interference index information to the wireless communication apparatus 510 according to an acquisition request (acquisition information) of the interference index information from the wireless communication apparatus 510. Moreover, the server 600 denotes a server to hold the interference index information transmitted from the wireless communication apparatus 510. The server 600 includes a communication unit 610 and an interference index information holding unit 620.

The communication unit 610 performs communication via the public line network 170. This communication unit 210 transmits the interference index information held by the interference index information holding unit 620 to the wireless communication apparatus 510 on the basis of the acquisition information transmitted from the wireless communication apparatus 510. In the case of receiving the acquisition information, the communication unit 610 detects an interference index linked with a position near a position (i.e., position on the prediction path) included in the acquisition information. Subsequently, the communication unit 610 transmits the detected interference index to the wireless communication apparatus 510 together with the linked position (i.e., interference index information).

Moreover, the communication unit 610 holds the interference index information transmitted from the wireless communication apparatus 510 in the interference index information holding unit 620. At the time of holding this, in a case where interference index information of the same position as that of the transmitted interference index information is already held, the interference index information is updated. Although there are various update methods, for example, there are a method of replacing the previous data with new data and a method of storing an average value after weighting. That is, by accumulating interference index information transmitted from a plurality of wireless communication apparatuses 510 in the interference index information holding unit 620, it is possible to construct a database related to interference indices.

The interference index information holding unit 620 holds the interference index information transmitted from the wireless communication apparatus 510. That is, this interference index information holding unit 620 holds the database of interference indices on the basis of the interference index information transmitted from the plurality of wireless communication apparatuses 510.

Operation Example of Wireless Communication Apparatus

Next, the operation of the wireless communication apparatus 510 in the second embodiment of the present technology is described with reference to the drawings.

Figure 12:
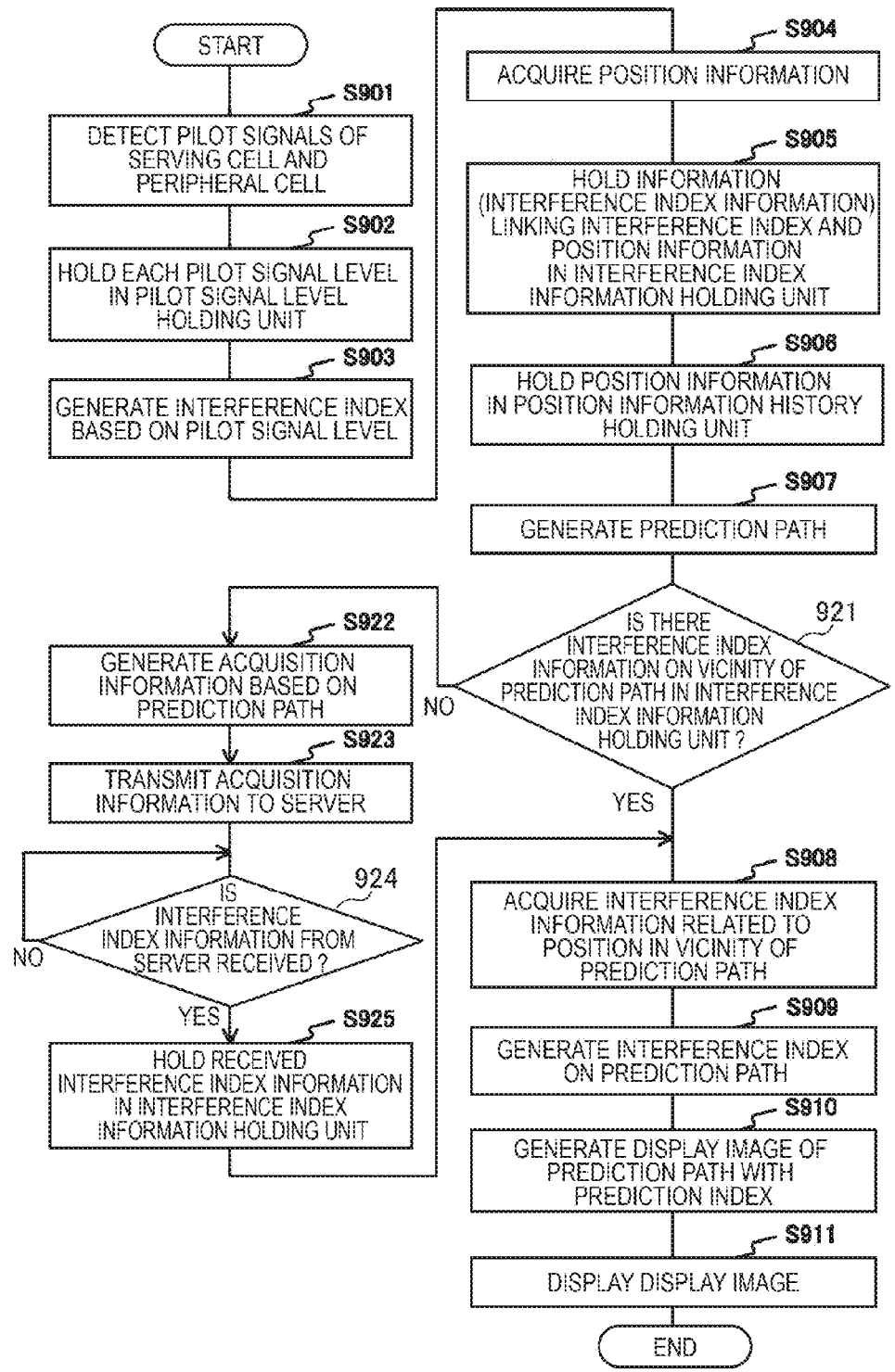
FIG. 12 is a flowchart that shows an interference-indexed prediction path generation processing procedure example when an interference-indexed prediction path is generated by a wireless communication apparatus in the second embodiment of the present technology.

FIG. 12 is a flowchart showing an interference-indexed prediction path generation processing procedure example when an interference-indexed prediction path is generated by the wireless communication apparatus 510 in the second embodiment of the present technology.

Here, the flowchart illustrated in FIG. 12 is an alternation example of the flowchart illustrated in FIG. 10, and differs from it in that interference index information is acquired from the server 600. Therefore, in FIG. 12, the same reference numerals as FIG. 10 are assigned to the common components with FIG. 10 and their explanation is omitted herein.

When a prediction path is generated by the transfer pathway prediction unit 340 in step S907, the interference index prediction unit 550 determines whether an interference index linked with the position of the prediction path or a position in the vicinity of the prediction path is held in the interference index information holding unit 320 (step S921). Subsequently, in a case where it is determined that this interference index is held in the interference index information holding unit 320 (step S921), it proceeds to step S908.

By contrast, in a case where it is determined that the interference index linked with the position of the prediction path or the position in the vicinity of the prediction path is not held in the interference index information holding unit 320 (step S921), information (acquisition information) to acquire interference index information from the server 600 is generated (step S922).

Subsequently, after the generated acquisition information is transmitted to the server 600 (step S923), the interference index information reception unit 530 determines whether the interference index information transmitted by the server 600 on the basis of the transmitted acquisition information is received (step S924). Subsequently, in a case where it is determined that the interference index information transmitted by the server 600 is not received (step S924), it stands by until the interference index information is received.

By contrast, in a case where it is determined that the interference index information transmitted by the server 600 is received (step S924), the received interference index information is held in the interference index information holding unit 320 (step S925). Moreover, the received interference index information is supplied to the interference index prediction unit 550, and the interference index prediction unit 550 acquires the interference index linked with the position of the prediction path or the position in the vicinity of the prediction path (step S908). Also, steps subsequent to step S908 are similar to FIG. 10 and therefore their explanation is omitted herein.

Thus, according to the second embodiment of the present technology, by providing a server that holds interference index information, it is possible to appropriately predict an interference index even in a transfer pathway through which a wireless communication apparatus has not passed (gone).

Moreover, since interference index information is held in a server, regarding a wireless communication apparatus (for example, a mobile phone in the related art) that does not include the interference index generation unit 280, if it is possible to transmit the position of the wireless communication apparatus, it is possible to acquire the interference index information from the server. That is, by installing an application to acquire the interference index information from the server in the wireless communication apparatus that does not include the interference index generation unit 280, it is possible to provide a service using an interference index even for the wireless communication apparatus that cannot detect the interference index.

4. Third Embodiment of the Present Technology

In the second embodiment of the present technology, an example has been given to an example of acquiring interference index information from a server that holds the interference index information when am interference index linked with the position of a prediction path or a position in the vicinity of the prediction path is not held in the interference index information holding unit 320. However, it is not limited to this, and, for example, a case can also be considered where the server is caused to generate a prediction path or predict an interference index in the prediction path.

Figure 13:
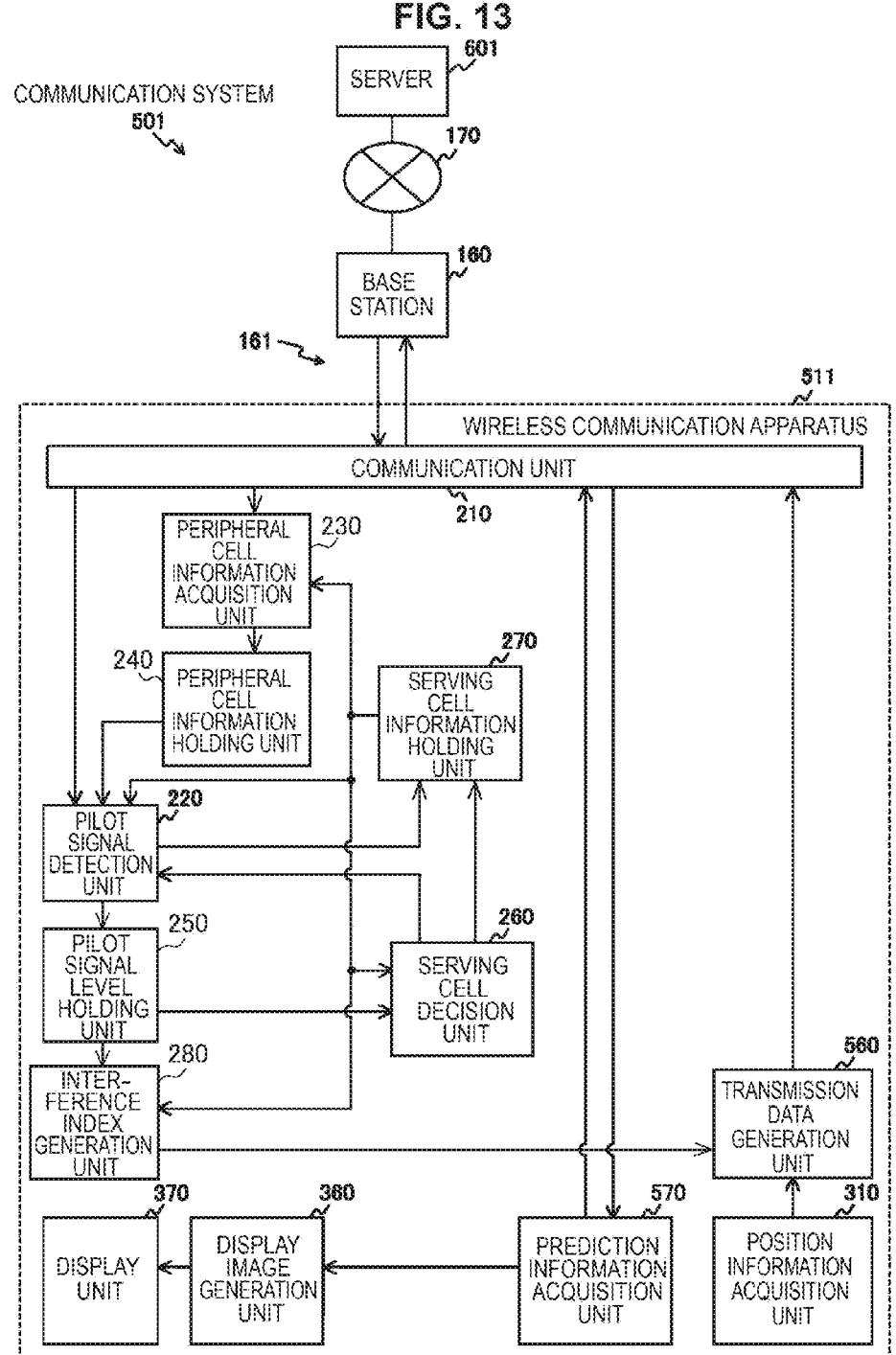
FIG. 13 is a block diagram illustrating a configuration example of a wireless communication apparatus 511 of a communication system in the third embodiment of the present technology.
Figure 14:
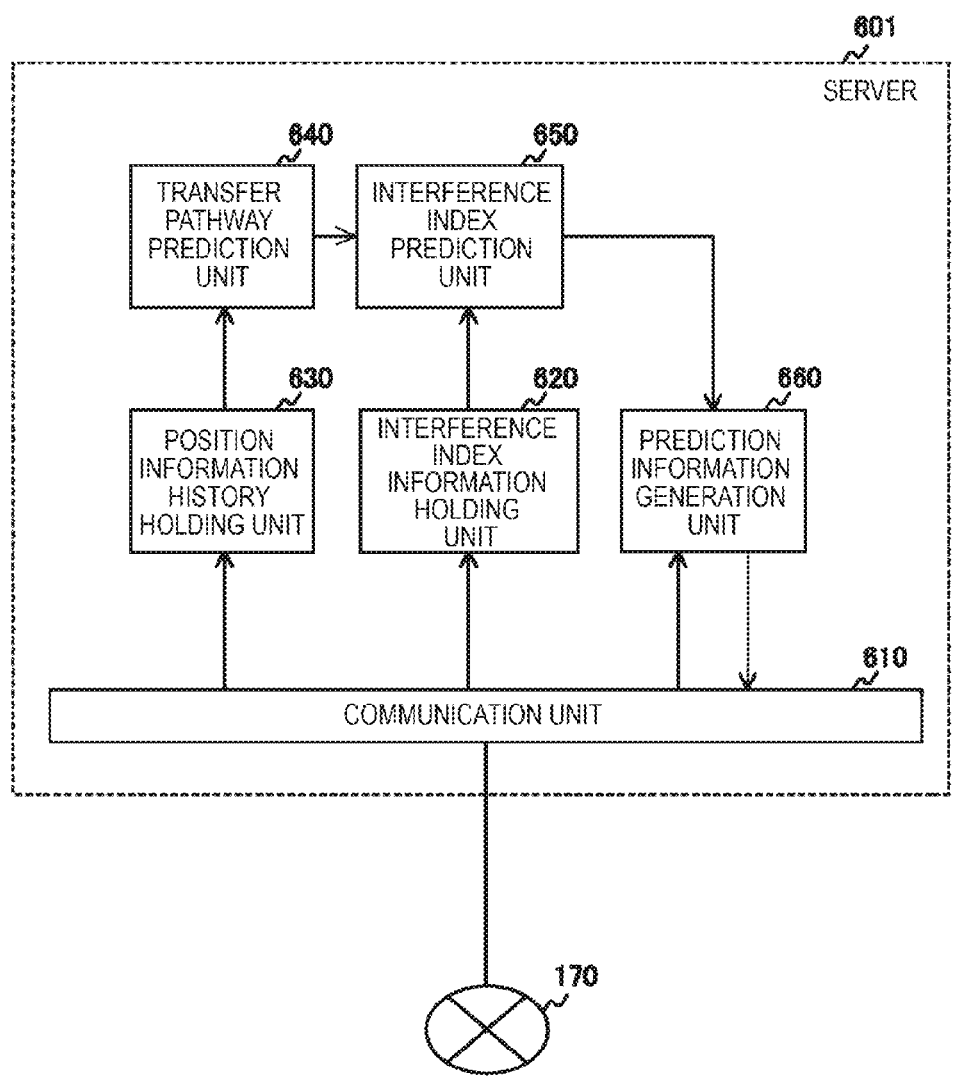
FIG. 14 is a block diagram illustrating a configuration example of a server of a communication system in the third embodiment of the present technology.

Therefore, in the third embodiment of the present technology, with reference to FIGS. 13 and 14, an explanation is given to an example where s server calculates a prediction path and an interference index on the prediction path on the basis of position information transmitted by the wireless communication apparatus 511.

Configuration Example of Wireless Communication System

FIG. 13 is a block diagram illustrating a configuration example of the wireless communication apparatus 511 of a communication system 501 in the third embodiment of the present technology.

The communication system 501 includes the wireless communication apparatus 511, the base station 160, the public line network 170 and a server 601. Here, the base station 160 is similar to the one illustrated in FIG. 3 and therefore its explanation is omitted herein. Also, the server 601 is described in detail in FIG. 14 and therefore its explanation is omitted herein.

The wireless communication apparatus 511 is an alternation example of the wireless communication apparatus 510 illustrated in FIG. 11, and includes a transmission data generation unit 560 instead of the transmission interference index information generation unit 520. Moreover, the wireless communication apparatus 511 includes a prediction information acquisition unit 570 instead of the interference index information reception unit 530 of the wireless communication apparatus 510. Moreover, the wireless communication apparatus 511 does not include the interference index information holding unit 320, the position information history holding unit 330, the transfer pathway prediction unit 340 and the interference index prediction unit 350 of the wireless communication apparatus 510. Here, an explanation is given focusing on the transmission data generation unit 560 and the prediction information acquisition unit 570.

The transmission data generation unit 560 transmits position information acquired by the position information acquisition unit 310 to a server (the server 601) together with the time at which the position information was acquired. The position information to which this acquisition time is linked (i.e., acquisition-time-attached position information) is used in the server 601 to manage the history of the position information of the wireless communication apparatus 511.

Also, in the third embodiment of the present technology, an interference index generated by the interference index generation unit 280 is transmitted to the server 601 together with the acquisition-time-attached position information. That is, the transmission data generation unit 560 transmits data that links at least position information, the time at which the position information was acquired and an interference index generated at the timing of acquiring the position information, to the server 601. Similar to the server 600 illustrated in FIG. 11, an interference index to be transmitted is used to update a database of interference index information (i.e., interference indices to which position information are linked) in the server 601.

Also, regarding the transmission timing of the acquisition-time-attached position information by the transmission data generation unit 560, the movement history of the wireless communication apparatus 511 may be held in the server 601 by the timing at which an interference-indexed prediction path is requested to be supplied. Therefore, the transmission timing of acquisition-time-attached position information may be a fixed timing or a variable timing. Since it may be a variable timing, it is possible to perform processing of mitigating the load of communication by, for example, increasing the transmission frequency in an area with good wireless communication quality and decreasing the transmission frequency in an area with poor wireless communication quality. Moreover, it is also possible to collectively transmit it at the timing at which the interference-indexed prediction path is requested to be supplied.

Moreover, since an interference index is used to update a database, it can be transmitted separately from the acquisition-time-attached position information. That is, position information to which the acquisition time is linked (i.e., acquisition-time-attached position information) and an interference index to which the acquisition position is linked (i.e., interference index information) can be separately transmitted. For example, by transmitting the acquisition-time-attached position information at a fixed timing or variable timing and collectively transmitting the interference index information in an area with good wireless communication quality, it is possible to mitigate the load in communication.

The prediction information acquisition unit 570 receives data of an interference-indexed prediction path generated by the server 601 (i.e., prediction information). In a case where the prediction information is requested, this prediction information acquisition unit 570 transmits a prediction request to the server 601. Subsequently, the prediction information acquisition unit 570 receives the prediction information which the server 601 transmitted in response to the prediction request, generates a display image that shows a prediction path with interference indices on the basis of the received prediction information and displays this display image on the display unit 370.

FIG. 14 is a block diagram illustrating a configuration example of the server 601 of the communication system 501 in the third embodiment of the present technology.

The server 601 includes the communication unit 610, the interference index information holding unit 620, a position information history holding unit 630, a transfer pathway prediction unit 640, an interference index prediction unit 650 and a prediction information generation unit 660.

Similar to the communication unit 610 of the server 600 in FIG. 11, the communication unit 610 performs communication via the public line network 170. When receiving acquisition-time-attached position information to which an interference index is linked, this communication unit 610 supplies the interference index and the position information to the interference index information holding unit 620 and supplies the acquisition time and the position information to the position information history holding unit 630. Moreover, in the case of receiving a prediction request transmitted by the wireless communication apparatus 511, the communication unit 610 causes the transfer pathway prediction unit 640, the interference index prediction unit 650 and the prediction information generation unit 660 to perform each processing to transmit prediction information.

The position information history holding unit 630 holds acquisition-time-attached position information supplied from a wireless communication apparatus every wireless communication apparatus (or every user) and holds the history (movement history) of the position information of each wireless communication apparatus. That is, the position information history holding unit 630 corresponds to the position information history holding unit 330 illustrated in FIG. 3. In a case where the transfer pathway prediction unit 640 predicts a transfer pathway of the wireless communication apparatus 511 that transmitted the prediction request, the position information history holding unit 630 supplies the movement history of the wireless communication apparatus 511 to the transfer pathway prediction unit 640. Here, the position information history holding unit 630 is one example of the position information holding unit described in the claims.

The transfer pathway prediction unit 640 predicts the future transfer pathway on the basis of the movement history of a wireless communication apparatus of the prediction information generation target. In a case where the server 601 receives the prediction request from the wireless communication apparatus 511, the transfer pathway prediction unit 640 acquires the movement history of the wireless communication apparatus 511 that transmitted the prediction request among the movement histories held in the position information history holding unit 630. Subsequently, using the acquired movement history, the transfer pathway prediction unit 640 predicts the future transfer pathway of the wireless communication apparatus 511 that transmitted the prediction request. That is, the transfer pathway prediction unit 640 corresponds to the transfer pathway prediction unit 340 in FIG. 3. This transfer pathway prediction unit 640 supplies the prediction path to the interference index prediction unit 650.

The interference index prediction unit 650 calculates an interference index on the prediction path supplied from the transfer pathway prediction unit 640 on the basis of the interference index acquired from the interference index information holding unit 620. That is, the interference index prediction unit 650 corresponds to the interference index prediction unit 350 in FIG. 3. The interference index prediction unit 650 supplies a generated interference-indexed prediction path to the prediction information generation unit 660. Here, the interference index prediction unit 650 is one example of the acquisition unit and the generation unit described in the claims.

The prediction information generation unit 660 generates data (prediction information) to be transmitted to the wireless communication apparatus 511 that is the transmission target of the interference-indexed prediction path, on the basis of the interference-indexed prediction path supplied from the interference index prediction unit 650. For example, in a case where the wireless communication apparatus 511 holds data (map data) requested to display a map, the prediction information generation unit 660 transmits data linking each position indicating the prediction path and the interference index of the position to the wireless communication apparatus 511 as prediction information. Moreover, in a case where the wireless communication apparatus 511 does not hold the map data, the prediction information generation unit 660 generates image data (for example, image data of the display screens in FIGS. 8 and 9) that describes a prediction path and an interference index in a map to be displayed, as prediction information. Moreover, in the case of notifying the interference index of a prediction path to the user without the map, the prediction information generation unit 660 may generate information to display a text that shows the increase and decrease of interference or an icon that evokes the increase and decrease of interference, as prediction information. Thus, the prediction information generation unit 660 generates prediction information according to a function included in the wireless communication apparatus 511.

Subsequently, the prediction information generation unit 660 supplies the generated prediction information to the communication unit 610. Afterwards, the prediction information is transmitted from the communication unit 610 and received by the wireless communication apparatus 511 via the public line network 170.

Thus, according to the third embodiment of the present technology, by predicting a transfer pathway and an interference index on the transfer pathway in a server that holds interference index information, it is possible to mitigate the load of processing in a wireless communication apparatus. Moreover, since the prediction processing is performed in the server, similar to the second embodiment of the present technology, it is possible to provide a service using an interference index even for a wireless communication apparatus that does not include the interference index generation unit 280. Also, in the third embodiment of the present technology, although an example of calculating a prediction path from the movement history of the wireless communication apparatus 511 has been described, it is not limited to this. Not only its own movement history but also the movement histories of other wireless communication apparatuses 511 held in the position information history holding unit 630 may be used. By this means, it is possible to provide the prediction of interference indices on a prediction path even for an arbitrary wireless communication apparatus 511 that exists in an area without the movement history.

5. Fourth Embodiment of the Present Technology

In the first to third embodiments of the present technology, an explanation has been given to an example where an interference index on a prediction path is displayed to the user and the degree of interference (interference index) on the prediction path is notified to the user. By this means, the user can know the wireless communication quality on the prediction path. Further, although the user can estimate the communication speed from the wireless communication quality, the communication speed is not decided only by the influence of the degree of interference. That is, it is considered to be more convenient if it is possible to display the communication speed on the prediction path.

Therefore, in the fourth embodiment of the present technology, an example of calculating the communication speed on a prediction path is described with reference to FIG. 15.

Configuration Example of Wireless Communication Apparatus

Figure 15:
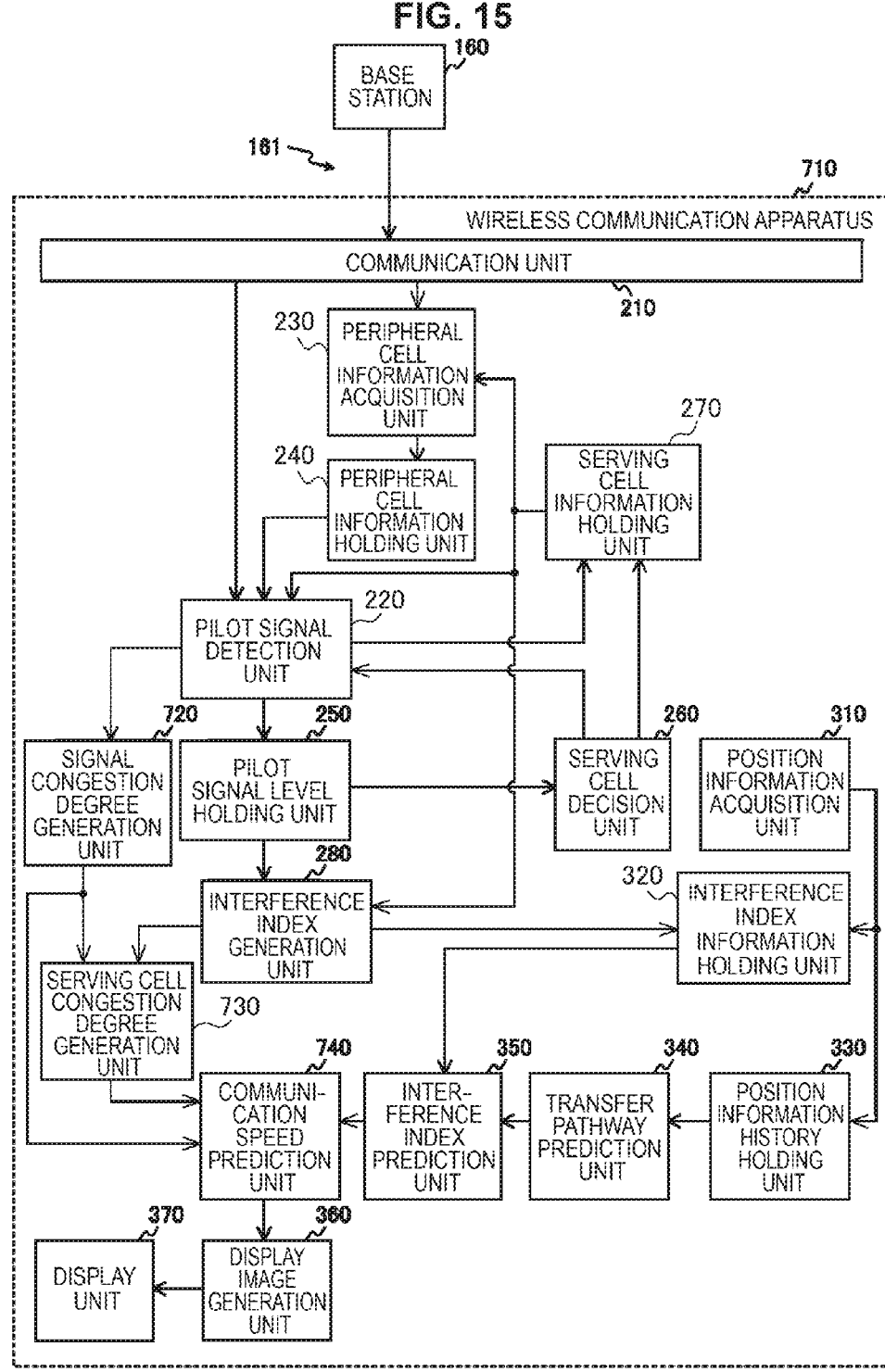
FIG. 15 is a block diagram illustrating a configuration example of a wireless communication apparatus in the first embodiment of the present technology.

FIG. 15 is a block diagram illustrating a configuration example of a wireless communication apparatus 710 in the fourth embodiment of the present technology.

Here, in FIG. 15, it is assumed that the distance of a prediction path is a distance in which a serving cell does not change, for east of explanation. Moreover, it is assumed that all interference index information in the vicinity of the prediction path is held by the interference index information holding unit 320. Here, in a case where the all interference index information is not held by the interference index information holding unit 320, it can be supported by acquiring it from a server, like the second embodiment of the present technology in FIG. 11. Moreover, regarding a wireless communication apparatus that can support a case where the prediction path becomes longer as the serving cell changes, it is described as the fifth embodiment of the present technology.

The wireless communication apparatus 710 includes a signal congestion degree generation unit 720, a serving cell congestion degree generation unit 730 and a communication speed prediction unit 740 in addition to each component of the wireless communication apparatus 200 illustrated in FIG. 3. Here, since other components than the signal congestion degree generation unit 720, the serving cell congestion degree generation unit 730 and the communication speed prediction unit 740 are similar to those illustrated in FIG. 3, the same reference numerals are assigned and their explanation is omitted herein.

Also, in the wireless communication apparatus 710, an interference index generated by the interference index generation unit 280 is also supplied to the serving cell congestion degree generation unit 730. Moreover, an interference-indexed prediction path generated by the interference index prediction unit 350 is supplied to the communication speed prediction unit 740.

The signal congestion degree generation unit 720 generates information showing the degree of signals that influence the communication speed of the wireless communication apparatus 710 among radio signals received by the wireless communication apparatus 710. Elements that influence the communication speed include the degree of interference from peripheral cells, the degree of congestion the peripheral cells and the degree of congestion in a serving cell. Here, it is assumed that this information is referred to as "signal congestion degree." As for this signal congestion degree, the value increases when the number of users connected to a base station of the connection target (i.e., the degree of congestion of the serving cell), the degree of interference from the peripheral cells or the degree of congestion in the peripheral cell increases. The signal congestion degree generation unit 720 acquires the largest correlation output from the pilot signal detection unit 220 among the correlation outputs of scramble codes in which correlation is detected in correlation detection performed at the time of the initial selection (three-step cell search) of the serving cell or reselection of the serving cell. Moreover, the signal congestion degree generation unit 720 also acquires the smallest correlation output from the pilot signal detection unit 220 among the correlation outputs of the scramble codes in which correlation is detected in this correlation detection.

Further, the signal congestion degree generation unit 720 calculates the signal congestion degree on the basis of two acquired correlation outputs and supplies the calculated signal congestion degree to the serving cell congestion degree generation unit 730.

Here, a calculation method of the signal congestion degree is described. Also, in the fourth embodiment of the present technology, an explanation is given with an assumption that a serving cell and peripheral cells are similar to FIG. 6. That is, in the fourth embodiment of the present technology, it is assumed that radio signals from one serving cell and six peripheral cells are received and the radio signal from the sixth cell (#6) of the peripheral cells is the weakest.

The signal congestion degree ($k_{cong(w)}$) is calculated by using following equation 2, for example.

[Math. 2]

$$k_{cong(w)} = \sqrt{\frac{b}{a}}$$ (Equation 2)

where, "a" denotes the largest correlation output among the correlation outputs of scramble codes in which correlation is detected in correlation detection. That is, a correlation output "a" represents the correlation output of a scramble code assigned to the serving cell. Moreover, "b" denotes the smallest correlation output among the correlation outputs of the scramble codes in which correlation is detected in the correlation detection. That is, "b" represents the correlation output of a scramble code assigned to a peripheral cell whose radio signal is the weakest, among peripheral cells from which the wireless communication apparatus 510 can receive radio signals.

As shown in above-mentioned equation 2, the signal congestion degree generation unit 720 generates signal congestion degree $k_{cong(w)}$ on the basis of the ratio of correlation output "a" and correlation output "b." As for signal congestion degree $k_{cong(w)}$ calculated using above-mentioned equation 2, the value increases when the number of users connected to a base station (i.e., the degree of the congestion of the serving cell) or the degree of interference from the peripheral cells increases. Also, the reason why the value increases is described later with reference to equations 4 and 5, and therefore the explanation is omitted herein.

Here, signal congestion degree $k_{cong(w)}$ can be calculated using not only above-mentioned equation 2 but also the ratio between the reception signal strength (RSSI) and correlation output "a" or the ratio between a value dividing the reception signal strength (RSSI) by the pilot signal diffusion rate and correlation output "a." Moreover, in the case of LTE or LTE-Advanced using an orthogonal frequency division multiple access scheme, a reference signal is transmitted to a wireless communication apparatus by the use of the resource block uniquely assigned to each serving cell. The wireless communication apparatus receives the reference signal transmitted using this resource block assigned to each base station, and specifies a serving cell from the level of the reception power. Therefore, in LTE or LTE-Advanced, the congestion degree generation unit 720 can generate signal congestion degree $k_{cong(w)}$ by the use of the ratio between the reception signal strength (RSSI) and the reception power of the reference signal.

The serving cell congestion degree generation unit 730 generates information (i.e., cell congestion degree) that shows the degree of congestion in radio signals transmitted by the serving cell. That is, the serving cell congestion degree generation unit 730 generates information showing the degree of signals that influence the communication speed of the wireless communication apparatus 710 among the radio signals transmitted by the serving cell, as the cell congestion degree. The serving cell congestion degree generation unit 730 calculates the cell congestion degree on the basis of the signal congestion degree supplied from the signal congestion degree generation unit 720 and the interference index supplied from the interference index generation unit 280. The serving cell congestion degree generation unit 730 calculates the cell congestion degree by excluding the element of interference from the peripheral cells and the element of the congestion degree in the peripheral cells from the signal congestion degree. Subsequently, the serving cell congestion degree generation unit 730 supplies the calculated cell congestion degree to the communication speed prediction unit 740. Here, the serving cell congestion degree generation unit 730 is one example of the base station congestion degree generation unit described in the claims.

Here, a calculation method of the cell congestion degree is described. Cell congestion degree ($k_{cong(c)}$) is calculated using following equation 3, for example.

[Math. 3]

$$k_{cong(c)} = \sqrt{\frac{b}{(1+k_{if})\cdot a}} = \frac{k_{cong(w)}}{\sqrt{1+k_{if}}}$$ (Equation 3)

where, each variable number used in equation 3 is similar to the one shown in equations 1 and 2, and therefore the explanation is omitted herein. Moreover, even after equation 3, the explanation is omitted for the same items as those described in the equations that have already been shown.

By using this equation 3, it is possible to calculate the congestion degree of the serving cell on the basis of signal congestion degree $k_{cong(w)}$ and interference index $k_{if}$.

Here, the principle of calculating cell congestion degree $k_{cong(c)}$ by equation 3 is described.

First, cell congestion degree $k_{cong(c)}$ is described. Cell congestion degree $k_{cong(c)}$ has a larger value as the number of users who perform communication by connecting to the serving cell increases. The number of users who is performing communication can be guessed by using the level of a channel that multiplexes data in radio signals (i.e., HS-DSCH: High Speed-Downlink Shared CHannel). Here, when the value converting the signal level of HS-DSCH of the serving cell into the antilogarithm is assumed to be $P_{DSCHserv}$, cell congestion degree $k_{cong(c)}$ can be expressed by following equation 4, for example.

[Math. 4]

$$k_{cong(c)} = \sqrt{\frac{P_{CPICHserv} + P_{DSCHserv}}{P_{CPICHserv}\cdot SF}}$$ (Equation 4)

Here, the wireless communication apparatus 710 does not have a function of separation detection of only the signal level of HS-DSCH. Therefore, the serving cell congestion degree generation unit 730 calculates cell congestion degree $k_{cong(c)}$ by calculation (equation 3) that excludes the influence of interference from signal congestion degree $k_{cong(w)}$ that is the congestion degree further including the influence of interference in the cell congestion degree.

Next, correlation output "a" and correlation output "b" used to calculate signal congestion degree ($k_{cong(w)}$) are described. Since correlation output "a" is the correlation output of a scramble code with the highest pilot signal level, it can be considered that the pilot signal of the serving cell occupies the large part of signals that contribute to generation of correlation output "a" in correlation detection. Therefore, correlation output "a" can be expressed like following equation 5.

[Math. 5]

$$a = P_{CPICHserv}$$ (Equation 5)

Moreover, since correlation output "b" is the correlation output of a scramble code with the weakest pilot signal level, it can be considered that radio signals that contribute to generation of correlation output "b" in correlation detection are not only a pilot signal of the base station to which the scramble code is assigned. Since the pilot signal level is weak, it can be considered that correlation output "b" is generated according to the influence of the HS-DSCH signal level from the base station, the pilot signal level from another base station or the HS-DSCH signal level from another base station. Therefore, correlation output "b" can be expressed like following equation 6.

[Math. 6]

$$b = P_{CPICHneighb\#6} + \frac{P_{total} - P_{CPICHneighb\#6}}{SF} \quad \text{(Equation 6)}$$

$$= P_{CPICHneighb\#6} + \frac{P_{CPICHserv} + \sum_{n=1}^{5} P_{CPICHneighb\#n} + P_{DSCHserv} + \sum_{n=1}^{6} P_{DSCHneighb\#n}}{SF}$$

where, $P_{total}$ represents a value converting the levels of radio signals that are the correlation detection targets at the time of correlation detection into the antilogarithm. That is, $P_{total}$ represents the value of the antilogarithm of the total level of radio signals from the serving cell and the peripheral cells. Moreover, SF represents the pilot signal diffusion rate. Moreover, $P_{DSCHserv}$ represents a value converting the HS-DSCH signal level in the radio signal from the serving cell into the antilogarithm. Moreover, $P_{DSCHneighb\#1}$ to $P_{DSCHneighb\#6}$ represent values converting respective HS-DSCH signal levels of six peripheral cells into the antilogarithms. Also, in the embodiment of the present technology, it is assumed that the signal level of a control channel or the like is included in the HS-DSCH signal level for the convenience of calculation.

As shown in above-mentioned equation 6, correlation output "b" can be expressed by a value adding the influence of other signals (the fraction part in which diffusion rate SF is the denominator) to the lowest pilot signal level ($P_{CPICHneighb\#6}$). Here, as shown in above-mentioned equation 6, correlation output "b" increases when the degree of interference on wireless communication apparatuses increases (i.e., when pilot signal levels $P_{CPICHneighb\#1}$ to $P_{CPICHneighb\#6}$ of the peripheral cells increase). Moreover, correlation output "b" increases when the number of users who perform communication by connecting to a cell increases (i.e., when $P_{DSCHServ}$ and $P_{DSCHneighb\#1}$ to $P_{DSCHneighb\#6}$ increase). That is, even regarding signal congestion degree $k_{cong(w)}$, the value increases when the degree of interference or the number of users increases.

Since correlation output "a" and correlation output "b" can be expressed by equations 5 and 6, equation 3 is derived from above-mentioned equation 4. That is, cell congestion degree $k_{cong(c)}$ can be calculated from signal congestion degree $k_{cong(w)}$ and interference index $k_{if}$.

Here, the process of deriving equation 3 from equation 4 is described. First, above-mentioned equations 5 and 6 are substituted into equation 2. As a result of this substitution, above-mentioned equation 2 is transformed into following equation 7. Here, in this substitution, since it is assumed that value $P_{CPICHneighb\#6}$ of the antilogarithm of the lowest pilot signal level is very small, it is presumed to "0."

[Math. 7]

$$k_{cong(w)} = \sqrt{\frac{P_{CPICHserv} + \sum_{n=1}^{6} P_{CPICHneighb\#n} + P_{DSCHserv} + \sum_{n=1}^{6} P_{DSCHneighb\#n}}{P_{CPICHserv} \cdot SF}} \quad \text{(Equation 7)}$$

Next, in this equation 7, the congestion degree in a cell (base station) is presumed to be substantially equal in any cell. In this case, it is presumed that the HS-DSCH signal level is the identical signal level at the transmission timing in each cell. Since it is considered that the HS-DSCH signal presumed to be the identical signal level attenuates in the same way as a pilot signal, it is possible to presume following equation 8 on the basis of above-mentioned equation 1.

[Math. 8]

$$k_{if} = \frac{\sum_{n=1}^{6} P_{CPICHneighb\#n}}{P_{CPICHserv}} \approx \frac{\sum_{n=1}^{6} P_{DSCHneighb\#n}}{P_{DSCHserv}} \quad \text{(Equation 8)}$$

Subsequently, when above-mentioned equation 7 is transformed using above-mentioned equation 8, following equation 9 is acquired.

[Math. 9]

$$k_{cong(w)} = \sqrt{\frac{P_{CPICHserv} + k_{if} \cdot P_{CPICHserv} + P_{DSCHserv} + k_{if} \cdot P_{DSCHserv}}{P_{CPICHserv} \cdot SF}} \quad \text{(Equation 9)}$$

$$= \sqrt{\frac{(1 + k_{if}) \cdot (P_{CPICHserv} + P_{DSCHserv})}{P_{CPICHserv} \cdot SF}}$$

$$= \sqrt{1 + k_{if}} \cdot k_{cong(c)}$$

Subsequently, when this equation 9 is transformed into an equation to calculate cell congestion degree $k_{cong(c)}$, it becomes above-mentioned equation 3.

Here, the congestion degree in a cell (base station) is presumed to be substantially equal in any cell. This presumption is applicable to the case of calculating the average value of congestion degree in a long time to some extent. However, in the case of using a temporal congestion degree, it is assumed that this presumption is not established. Especially, in a case where the peripheral cells are temporarily congested, the degree of interference increases, the influence from the peripheral cells increases and a difference from the calculation result of equation 3 is caused.

To appropriately calculate cell congestion degree $k_{cong(c)}$ in a case where the peripheral cells are congested, it is requested to perform calculation using the congestion degree of each cell without presuming that the congestion degree is substantially equal in any cell. This calculation can be performed in the fifth embodiment of the present technology. Therefore, an example of performing calculation using the congestion degree of each cell is described with reference to FIG. 20, and the explanation is omitted herein.

The communication speed prediction unit 740 predicts the communication speed. This communication speed prediction unit 740 predicts the communication speed on a prediction path on the basis of the cell congestion degree supplied from the serving cell congestion degree generation unit 730 and interference indices on the prediction path. That is, the communication speed prediction unit 740 assumes each position on the prediction path as the target area for detection of the communication speed and predicts the communication state (communication speed) in this target area. For example, in a case where there are four intervals with different interference indices on the prediction path as illustrated in FIG. 8, the communication speed prediction unit 740 predicts the communication speed in the four intervals respectively. Moreover, in the case of calculating the current prediction communication speed, the communication speed prediction unit 740 predicts the current communication speed on the basis of the signal congestion degree supplied from the signal congestion degree generation unit 720. Subsequently, the communication speed prediction unit 740 supplies the predicted communication speed (prediction communication speed) to the display image generation unit 360 and displays it on the display unit 370. Here, the communication speed prediction unit 740 is one example of the generation part described in the claims.

Here, a calculation method of the prediction communication speed is described. Since the prediction communication speed depends on the wireless communication quality, for example, it can be calculated from the SIR (Signal to Interference Ratio). Here, for example, the SIR is calculated from following equation 10.

[Math. 10]

$$SIR = \frac{1}{k_{cong(w)}^2 - \frac{1}{SF}}$$ (Equation 10)

The SIR can be calculated using signal congestion degree $k_{cong(w)}$ as shown in above-mentioned equation 10. Here, since the influence of interference is included in signal congestion degree $k_{cong(w)}$, the value changes when the interference index value is different (i.e., when the position is different) even if the serving cell is identical. That is, even in a case where the serving cell is not switched in the predicted transfer pathway, it is not possible to calculate the SIR of other positions by the use of signal congestion degree $k_{cong(w)}$ of the current position.

Therefore, the communication speed prediction unit 740 calculates the signal congestion degree on the prediction path (other positions) on the basis of the cell congestion degree supplied from the serving cell congestion degree generation unit 730 and the interference indices on the prediction path supplied from the interference index prediction unit 350. Subsequently, the communication speed prediction unit 740 calculates the SIR on the prediction path by the use of the calculated signal congestion degree on the prediction path.

Here, signal congestion degree $k_{cong(w)}$ on the prediction path is calculated using following equation 11, for example. Also, interference index $k_{if}$ in following equation 11 denotes an interference index on the prediction path predicted by the interference index prediction unit 350.

[Math. 11]

$$k_{cong(w)} = \sqrt{1+k_{if}} \cdot k_{cong(c)}$$ (Equation 11)

As shown in above-mentioned equation 11, if an equation transformed from equation 3 is used, it is possible to calculate signal congestion degree $k_{cong(w)}$ on the basis of cell congestion degree $k_{cong(c)}$ and interference index $k_{if(p)}$. Further, the communication speed prediction unit 740 calculates equation 10 by the use of the signal congestion degree on the prediction path and calculates the SIR on the prediction path.

When the SIR on the prediction path is calculated, the communication speed prediction unit 740 calculates the maximum communication speed corresponding to the value of the SIR by the use of the calculated SIR. As for the calculation of this maximum communication speed, for example, there is a possible method of preparing a table of the maximum communication speed corresponding to each SIR value beforehand and acquiring the maximum communication speed ($R_{MAX}$) from this table by using the SIR as an argument.

Here, this maximum communication speed denotes a communication speed for which the degree of congestion is not taken into account so much. Therefore, by subtracting the speed based on the level of the signal congestion degree from calculated maximum communication speed $R_{MAX}$, the communication speed prediction unit 740 calculates the prediction communication speed (effective communication speed $R_{eff}$) for which the congestion degree is taken into account. Here, effect communication speed $R_{eff}$ is calculated using following equation 12, for example.

$$R_{eff} = (1.225 - 4.5 \times k_{cong(w)}) \times R_{MAX}$$ (Equation 12)

As shown in above-mentioned equation 12, as for effective communication speed $R_{eff}$, the diminution from maximum communication speed $R_{MAX}$ increases as signal congestion degree $k_{cong(w)}$ increases. That is, as signal congestion degree $k_{cong(w)}$ becomes smaller (i.e., as a base station is more available), effective communication speed $R_{eff}$ becomes a value closer to maximum communication speed $R_{MAX}$. Moreover, as signal congestion degree $k_{cong(w)}$ becomes larger (i.e., as the base station is more congested), effective communication speed $R_{eff}$ becomes a lower value that does not come up to maximum communication speed $R_{MAX}$.

Also, in the fourth embodiment of the present technology, although an example of acquiring maximum communication speed $R_{MAX}$ on the basis of the SIR has been described, it is not limited to this. Besides, it is also possible to acquire maximum communication speed $R_{MAX}$ on the basis of CQI (Channel Quality Indicator). In the case of acquiring the maximum communication speed ($R_{MAX}$) according to the CQI value, the value of the transport block size defined for each CQI value is used. By dividing the transport block size of each CQI value by a transmission time interval (TTI), it is possible to calculate maximum communication speed $R_{MAX}$. Here, the transmission time interval of HSDPA is 2 ms. For example, in a case where the CQI value is "30" and the transport block size is 7168 bits, maximum communication speed $R_{MAX}$ is 3.584 Mbps.

Thus, by installing the signal congestion degree generation unit 720 and the serving cell congestion degree generation unit 730, it is possible to calculate the cell congestion degree of a serving cell on the basis of the signal congestion degree of the current position and the interference index of the current position. Further, based on this calculated cell congestion degree and the interference index of another position (another position within a range in which the serving cell is not switched), it is possible to calculate the signal congestion degree of the position related to the interference index. Moreover, it is possible to predict the communication speed by using this calculated signal congestion degree.

Display Example of Prediction Communication Speed

Figure 16:
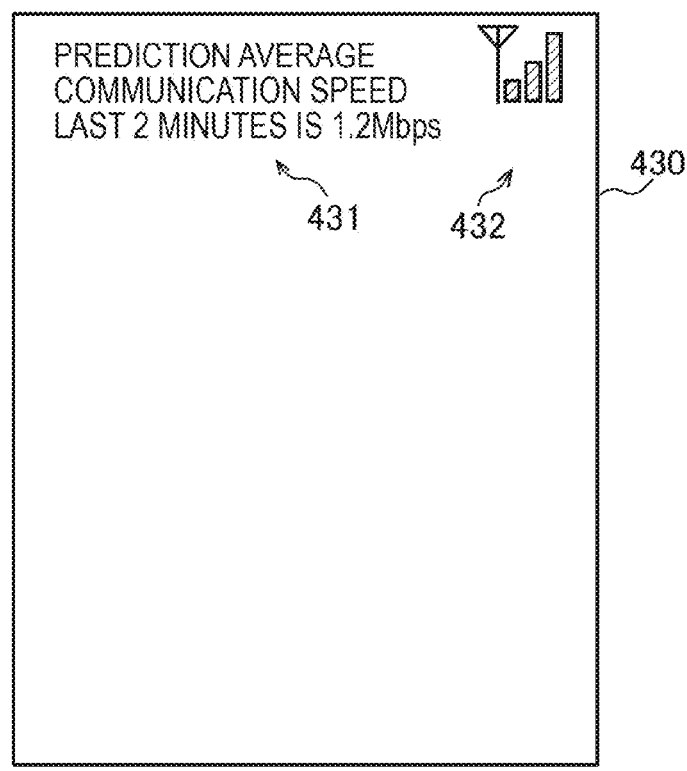
FIG. 16 is a schematic diagram illustrating one example of a display screen that shows the prediction communication speed in the vicinity of the current position displayed on a display unit of the fourth embodiment of the present technology.

FIG. 16 is a schematic diagram illustrating one example of a display screen that shows the communication speed in the vicinity of the current position displayed on the display unit 370 according to the fourth embodiment of the present technology.

On a display screen (screen 430) illustrated in FIG. 16, the notification of the prediction communication speed in the vicinity of the current position of the wireless communication apparatus 710 (communication speed notification 431) and the communication quality display (antenna bar 432) are shown.

Figure 20:
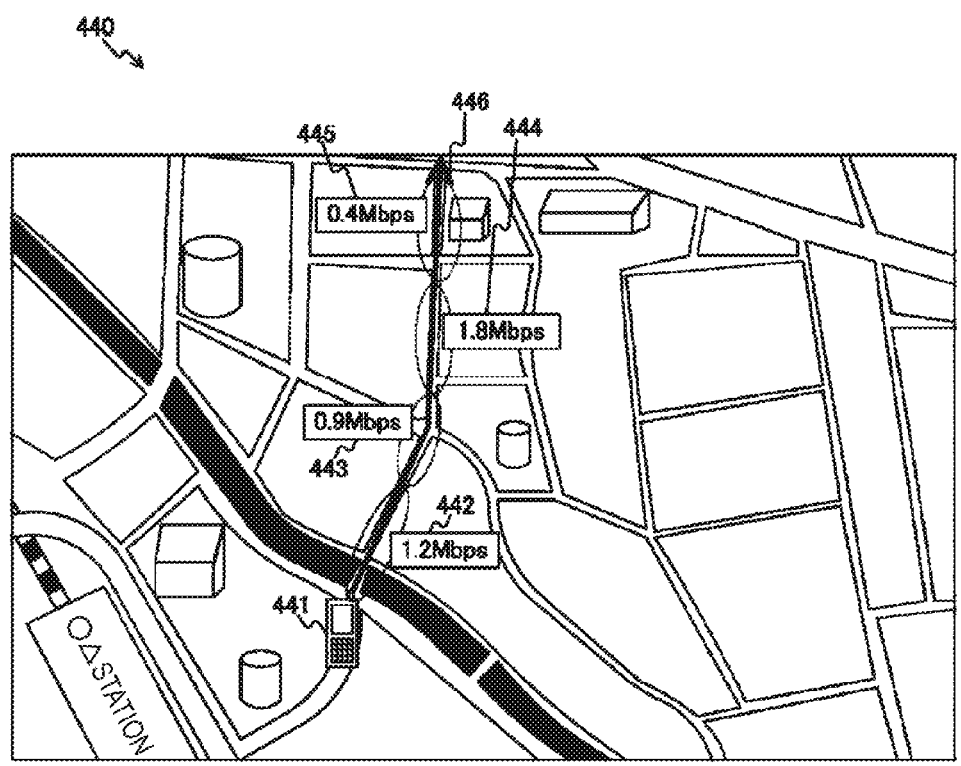
FIG. 20 is a schematic diagram illustrating one example of a map display screen to which a prediction path displayed on a display unit of the fifth embodiment of the present technology and the prediction communication speed on the prediction path are attached.

As shown in the screen 430, by installing the communication speed prediction unit 740, it is possible to display the prediction communication speed in the vicinity of the current position predicted on the basis of the signal congestion degree supplied from the signal congestion degree generation unit 720. Moreover, by installing the communication speed prediction unit 740, if information on an interference index in the vicinity of the prediction path is held by the interference index information holding unit 320 in a range in which it is considered that the serving cell is not switched, the prediction communication speed on the prediction path can be displayed on the map. Here, the display of the prediction communication speed using this map is similar to FIG. 20 shown later in the fifth embodiment of the present technology, and therefore the explanation is omitted herein.

Operation Example of Wireless Communication Apparatus

Next, the operation of the wireless communication apparatus 710 in the fourth embodiment of the present technology is described with reference to the drawings.

Figure 17:
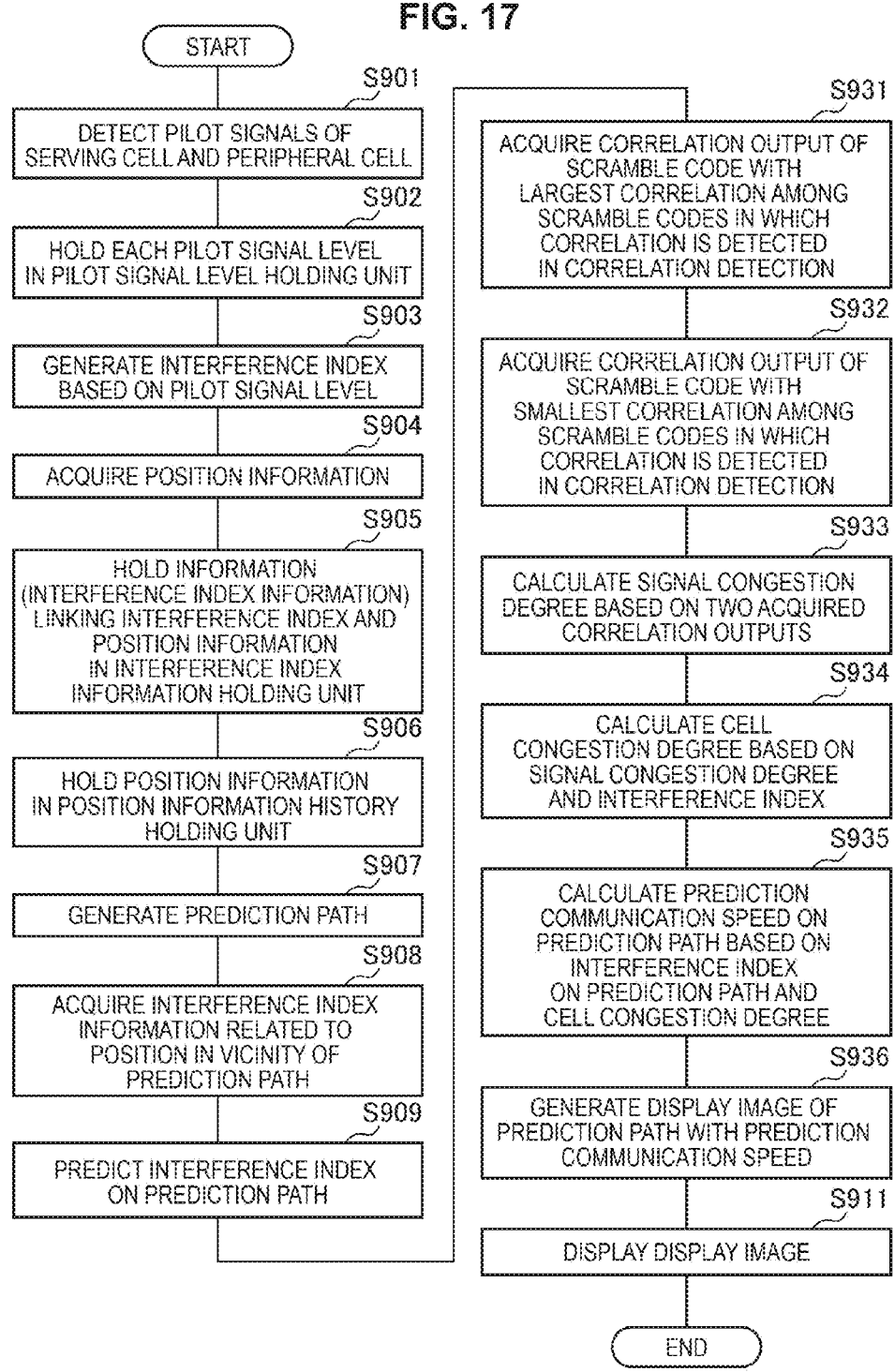
FIG. 17 is a flowchart showing a prediction communication speed generation processing procedure example when the prediction communication speed is generated by a wireless communication apparatus in the fourth embodiment of the present technology.

FIG. 17 is a flowchart showing a prediction communication speed generation processing procedure example when the prediction communication speed is generated by the wireless communication apparatus 710 in the fourth embodiment of the present technology.

Here, the flowchart illustrated in FIG. 17 is an alternation example of the flowchart illustrated in FIG. 10, and they are different in that the calculation of two congestion degrees (the signal congestion degree and the cell congestion degree) and the calculation of the prediction communication speed on a prediction path are added. Therefore, in FIG. 17, the same reference numerals as in FIG. 10 are assigned to the components in common with those in FIG. 10 and the explanation is omitted herein. Here, although the calculation of prediction indices on the prediction path and the calculation of two congestion degrees are processing that can be performed in parallel, for the purpose of illustration, FIG. 17 illustrates the calculation of the congestion degree after the calculation step (step S909) of the interference indices on the prediction path.

When the interference indices on the prediction path are generated in step S909, the largest correlation output is supplied to the signal congestion degree generation unit 720 among the correlation outputs of scramble codes in which correlation is detected in correlation detection (step S931). Moreover, the smallest correlation output is supplied to the signal congestion degree generation unit 720 among the correlation outputs of the scramble codes in which correlation is detected in the correlation detection (step S932).

Subsequently, the signal congestion degree of the current position is calculated by the signal congestion degree generation unit 720 on the basis of two acquired correlation outputs (step S933). This signal congestion degree calculation is performed using, for example, above-mentioned equation 2. Afterwards, the cell congestion degree of the current position (i.e., the cell congestion degree of the current serving cell) is calculated by the serving cell congestion degree generation unit 730 on the basis of the calculated current signal congestion degree and the current position interference index supplied from the interference index generation unit 280 (step S934). Here, this cell congestion degree calculation is performed using, for example, above-mentioned equation 3.

Further, the prediction communication speed on the prediction path is predicted by the communication speed prediction unit 740 on the basis of the calculated cell congestion degree and the interference index on the prediction path (step S935). Here, the calculation of the prediction communication speed on this prediction path is performed using, for example, above-mentioned equations 10 to 12 and the table of the maximum communication speed corresponding to each SIR value.

Afterwards, a display image that displays the prediction communication speed and the prediction path is generated by the display image generation unit 360 (step S936), this generated display image is displayed on the display unit 370 (step S911), and the prediction communication speed generation processing procedure ends.

Thus, according to the fourth embodiment of the present technology, it is possible to predict the communication speed on the current position and a prediction transfer pathway.

6. Fifth Embodiment of the Present Technology

In the fourth embodiment of the present technology, an explanation has been given to an example of predicting the communication speed only by the cell congestion degree of the current serving cell calculated by a wireless communication apparatus. Since the cell congestion degree is the value of each cell (base station), in a case where the serving cell is switched, it is not possible to appropriately predict the communication speed. Moreover, since the cell congestion degree is a value that varies according to the cell use status, even if the wireless communication apparatus holds the cell congestion degree calculated in the past, it is not so useful and it is not possible to appropriately predict the communication speed.

That is, to appropriately predict the communication speed in a long distance in which the serving cell is switched, it is requested to acquire the current cell congestion degree of the switching cell. As for this acquisition, for example, like the case of installing a server that holds interference indices in the second and third embodiments of the present technology, there is a possible method of installing a server that accumulates and manages the cell congestion degree detected by many wireless communication apparatuses and acquiring the current cell congestion degree of another cell from this server.

Therefore, in the fifth embodiment of the present technology, an example of installing a server that holds the current cell congestion degree of another cell is described with reference to FIGS. 18 and 19.

Also, regarding an example of installing a server that holds the current cell congestion degree of another cell, similar to the second and third embodiments of the present technology, an example of calculating a prediction path by a wireless communication apparatus and an example of calculating the prediction path by the server are also possible. In the fifth embodiment of the present technology, similar to the third embodiment of the present technology, an example of calculating a prediction path by a server is described.

Configuration Example of Wireless Communication System

Figure 18:
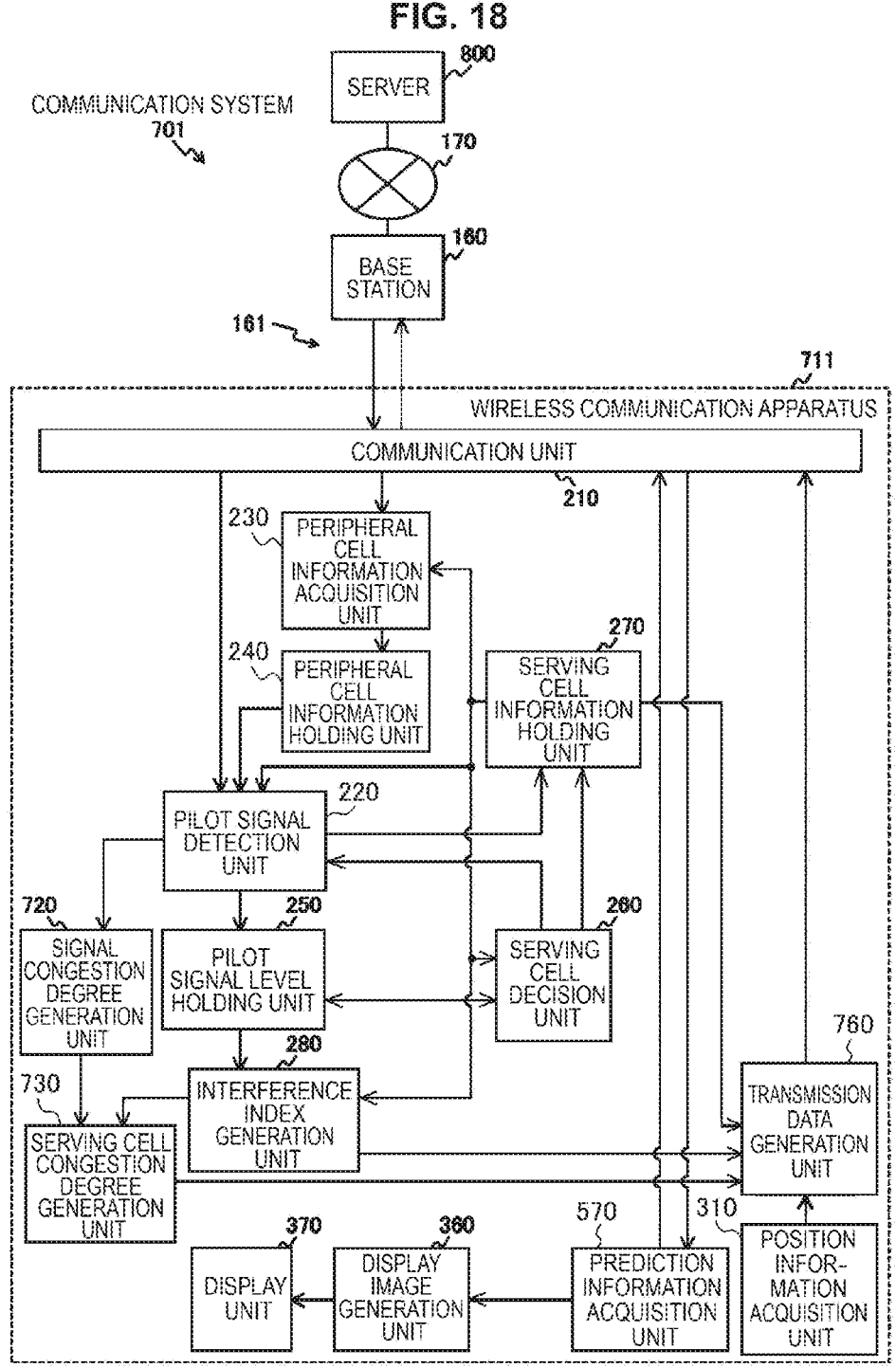
FIG. 18 is a block diagram illustrating a configuration example of a wireless communication apparatus of a communication system in the fifth embodiment of the present technology.

FIG. 18 is a block diagram illustrating a configuration example of a wireless communication apparatus 711 of a communication system 701 in the fifth embodiment of the present technology.

The communication system 701 includes the wireless communication apparatus 711, the base station 160, the public line network 170 and a server 800. Here, the base station 160 and the public line network 170 are similar to those illustrated in FIG. 3 and therefore the explanation is omitted herein. Moreover, the server 800 is described in detail in FIG. 19 and therefore the explanation is omitted herein.

The wireless communication apparatus 711 is an alternation example of the wireless communication apparatus 511 illustrated in FIG. 13, and further includes the signal congestion degree generation unit 720 and the serving cell congestion degree generation unit 730 illustrated in FIG. 15. Moreover, the wireless communication apparatus 711 includes a transmission data generation unit 760 that transmits the cell congestion degree to a server, instead of the transmission data generation unit 560 in FIG. 13. Here, an explanation is given focusing on the transmission data generation unit 760.

Similar to the transmission data generation unit 560 illustrated in FIG. 13, the transmission data generation unit 760 transmits position information acquired by the position information acquisition unit 310 to a server (server 800) together with the time at which the position information was acquired. Moreover, the transmission data generation unit 760 transmits the cell congestion degree generated by the serving cell congestion degree generation unit 730 to the server 800 together with information (serving cell information) that shows a serving cell in the position in which the congestion degree is detected. Here, the serving cell information denotes, for example, scramble codes and position information supplied from the serving cell information holding unit 270. The server 800 specifies a cell (base station) that can receive the scramble code in the position from the scramble codes and position information linked with the congestion degrees, and specifies a cell related to the supplied congestion degree. Here, in a case where the wireless communication apparatus 711 can acquire the cell ID (identification information of each cell) (for example, in a case where it is acquired from a server that manages the cell ID or it is acquired from report information reported from the base station), it is also possible to set the cell ID as serving cell information. Also, the serving cell information may further include an LAC (Location Area Code).

Moreover, in the case of transmitting an interference index to the server 800, the transmission data generation unit 760 links it to information on a position in which the interference index is acquired and a serving cell in the position (i.e., serving cell information) and performs transmission. That is, as compared with the transmission data generation unit 560 illustrated in FIG. 13, the serving cell information is further linked to perform transmission.

Here, as for the congestion degree transmission timing in the transmission data generation unit 760, it is used to update a database and is therefore similar to the interference index transmission performed by the transmission data generation unit 560 in FIG. 13. That is, it is possible to perform transmission at a fixed timing or variable timing, and it is possible to collectively transmit interference index information in an area with good wireless communication quality. Moreover, the transmission timing of position information and interference indices in the transmission data generation unit 760 is similar to the transmission data generation unit 560 in FIG. 13, and therefore the explanation is omitted herein.

Thus, the cell congestion degree generated by the serving cell congestion degree generation unit 730 is transmitted to the server 800 together with information (serving cell information) to specify a cell (base station).

Figure 19:
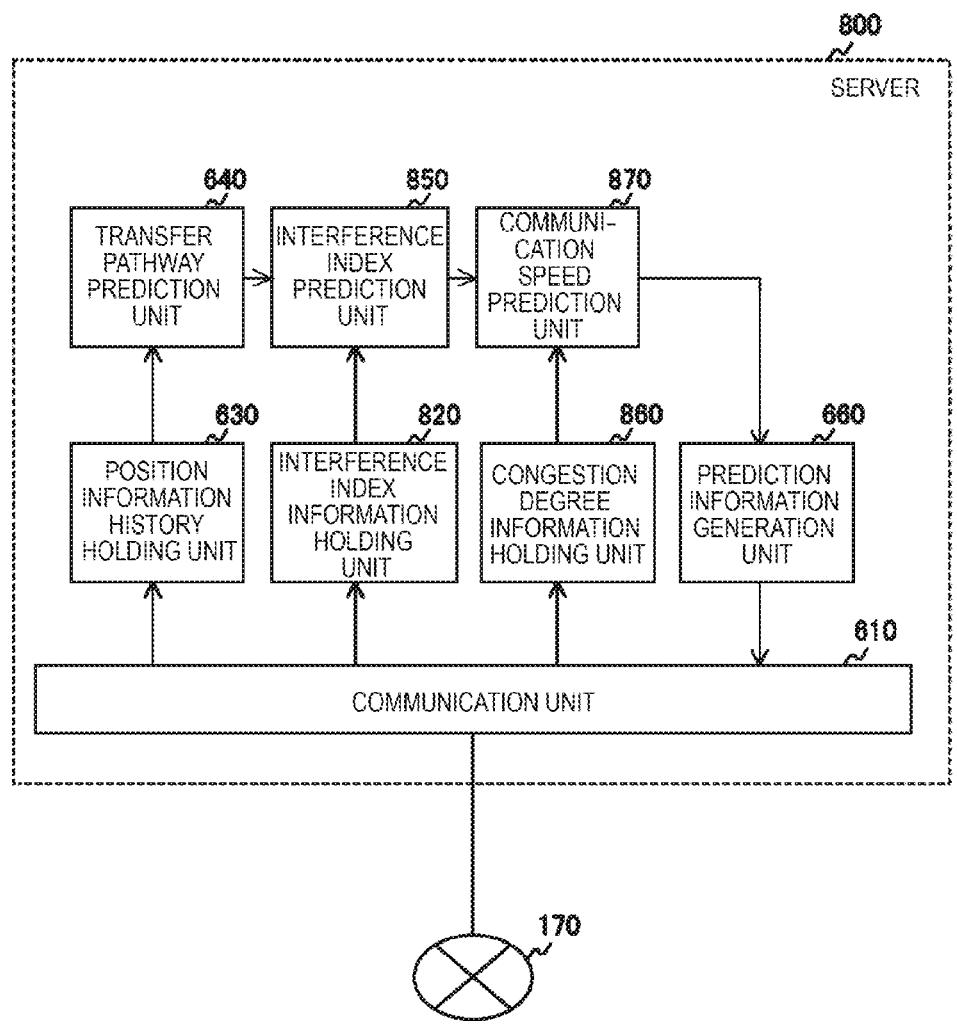
FIG. 19 is a block diagram illustrating a configuration example of a server of a communication system in the fourth embodiment of the present technology.

FIG. 19 is a block diagram illustrating a configuration example of the server 800 of the communication system 701 in the fifth embodiment of the present technology.

The server 800 is an alternation example of the server 601 illustrated in FIG. 14, and includes a congestion degree information holding unit 860 and a communication speed prediction unit 870 in addition to each component of the server 601. Moreover, the server 800 includes an interference index information holding unit 820 that holds interference index information to which the cell ID of the serving cell in the position is further linked, instead of the interference index information holding unit 620 in FIG. 14. Moreover, the server 800 includes an interference index prediction unit 850 instead of the interference index prediction unit 650 in FIG. 14.

Similar to the interference index information holding unit 620 illustrated in FIG. 14, the interference index information holding unit 820 holds interference index information. Further, the interference index information holding unit 820 links and holds the cell ID of a serving cell specified from serving cell information linked to interference index information transmitted from the wireless communication apparatus 711. That is, an interference index held by the interference index information holding unit 820 is linked to a position in which the interference index is detected (i.e., position information) and information (for example, cell ID) to specify the serving cell in the position in which the interference index is detected.

The congestion degree information holding unit 860 holds the cell congestion degree of each cell (base station). That is, this congestion degree information holding unit 860 holds a cell congestion degree database based on the cell congestion degrees transmitted from a plurality of wireless communication apparatuses 711. The congestion degree information holding unit 860 holds the cell congestion degree together with the cell ID of a cell in which the cell congestion degree shows the congestion degree.

Moreover, the congestion degree information holding unit 860 self-analyzes the congestion degree of a control apparatus of a cell (base station), and, in a case where this congestion degree can be transmitted to the server 800, the congestion degree detected by this cell may be linked to the cell ID and held.

Similar to the interference index prediction unit 650 illustrated in FIG. 14, the interference index prediction unit

850 calculates an interference index on a prediction path. Further, when acquiring interference indices from the interference index information holding unit 620, the interference index prediction unit 850 acquires the cell IDs linked to the interference indices, predicts a serving cell on the prediction path and links each position on the prediction path and the cell ID.

Similar to the communication speed prediction unit 740 illustrated in FIG. 15, the communication speed prediction unit 870 predicts the communication speed on a prediction path predicted by the transfer pathway prediction unit 640. The communication speed prediction unit 870 assumes the cell ID of the serving in each position on the prediction path predicted by the interference index prediction unit 850 as an argument, and acquires the cell congestion degree held in the congestion degree information holding unit 860. Further, the communication speed prediction unit 870 predicts the communication speed on the prediction path on the basis of the acquired cell congestion degree and the interference indices on the prediction path. Here, the prediction method of the communication speed is similar to the one in the communication speed prediction unit 740 and therefore the explanation is omitted herein.

Further, the communication speed prediction unit 870 supplies the prediction path with the prediction communication speed to the prediction information generation unit 660 and transmits information on the prediction path with the prediction communication speed (i.e., prediction information) to the wireless communication apparatus 711.

Here, since the congestion degree changes according to the user's use status, it is desirable that the cell congestion degree held in the congestion degree information holding unit 860 is the cell congestion degree at the time close to the current time. However, it is difficult to always maintain the cell congestion degrees of all cells to information at the time close to the current time. Therefore, further, the congestion degree information holding unit 860 may separately hold the cell congestion degree of each cell every time zone, and, in a case where there is no information at the time close to the current time, the communication speed prediction unit 870 may acquire the congestion degree of the same time zone of the previous day.

Here, in a case where the cell congestion degree of each time zone is held, the change in the time series of the cell congestion degree is understood. Therefore, even in a case where a prediction path is a long distance and it takes time (for example, in three hours) for arrival, it is possible to predict the cell congestion degree at the future time and improved the prediction accuracy of the communication speed.

Here, an explanation has been given with an assumption that the communication speed prediction unit 870 predicted the communication speed in the same method as the communication speed prediction unit 740 illustrated in FIG. 15. That is, as shown in above-mentioned equation 8, the current cell congestion degree is calculated on the presumption that the signal congestion degree of each position is identical in any cell, and the cell congestion degree is used to calculate the signal congestion degree of each position on the prediction path. However, in a case where the congestion degree is held in a server like the fifth embodiment of the present technology, it is possible to acquire the cell congestion degree of each peripheral cell from the server. That is, in the fifth embodiment of the present technology, it is possible to calculate the signal congestion degree and the cell congestion degree in consideration of the cell congestion degree of each peripheral cell.

Therefore, an example of calculating the signal congestion degree and the cell congestion degree in consideration of the cell congestion degree of each peripheral cell is described below. Here, similar to the above, an explanation is given with an assumption that a wireless communication apparatus receives radio signals from one serving cell and six peripheral cells (#1 to #6).

First, in the same method as the method illustrated in FIG. 15, the wireless communication apparatus calculates the congestion degree of the serving cell with the presumption that the cell congestion degree is identical in any cell. Here, it is assumed that the cell congestion degree on this presumption is referred to as "approximation cell congestion degree." This approximation cell congestion degree is transmitted to the server and held every cell in the server.

First, in the case of causing the server to calculate the prediction communication speed, the wireless communication apparatus transmits information requested to calculate two congestion degrees (i.e., the signal congestion degree and the cell congestion degree) for which the cell congestion degree of each peripheral cell is taken into account, to the server. The wireless communication apparatus transmits at least position information of the current position, information (peripheral cell information) to specify a peripheral cell that was able to receive a radio signal, the pilot signal levels of the serving cell and the peripheral cells, and the signal congestion degree to the server.

Further, in the receiving server, the peripheral cells of the wireless communication apparatus are specified on the basis of the peripheral cell information and the approximation cell congestion degree of each peripheral cell is acquired from a holding unit. Further, in the server, the ratio of the approximation cell congestion degree of the serving cell and the approximation cell congestion degree of a peripheral cell (i.e., approximation cell congestion degree ratio) is calculated every peripheral cell.

Here, the approximation cell congestion degree ratio ($k_n$) of each peripheral cell (#1 to #6) is calculated using following equation 12, for example.

[Math. 12]

$$k_n = \frac{k_{cong(ac-neighb\#n)}}{k_{cong(ac-serv)}} \quad \text{(Equation 12)}$$

where, $k_{cong(ac-serv)}$ represents the approximation cell congestion degree of the serving cell. Moreover, $k_{cong(ac-neighb\#n)}$ represents the approximation cell congestion degree of a peripheral cell.

When the approximation cell congestion degree ratio ($k_{\#1}$ to $k_{\#6}$) of each peripheral cell (#1 to #6) is calculated using above-mentioned equation 12, the server calculates the second interference index ($k_{sif}$) using following equation 13.

[Math. 13]

$$k_{sif} = \frac{\sum_{n=1}^{6} k_n^2 \cdot P_{CPICHneighb\#n}}{P_{CPICHserv}} \quad \text{(Equation 13)}$$

Here, second interference index $k_{sif}$ calculated by above-mentioned equation 13 is held in the interference index information holding unit 820 together with interference index $k_{if}$ calculated by above-mentioned equation 1.

Subsequently, cell congestion degree $k_{cong(c)}$ of the serving cell is calculated on the basis of this calculated second interference index $k_{sif}$ and signal congestion degree $k_{cong(w)}$ of the current position. Here, the calculation of this cell congestion degree $k_{cong(c)}$ is performed using, for example, following equation 14.

[Math. 14]

$$k_{cong(c)} = \frac{k_{cong(w)}}{\sqrt{1 + k_{sif}}} \quad \text{(Equation 14)}$$

The cell congestion degree ($k_{cong(c)}$) calculated by above-mentioned equation 14 is held in the congestion degree information holding unit 860 together with approximation cell congestion degree $k_{cong(ac)}$.

Further, in the server, signal congestion degree $k_{cong(w)}$ of each position is calculated on the basis of this calculated cell congestion degree $k_{cong(c)}$ and second interference index $k_{sif}$ of each position on the prediction path. Here, the calculation of this signal congestion degree kcong(w) is performed using, for example, following equation 15 transformed from above-mentioned equation 14.

[Math. 15]

$$k_{cong(w)} = \sqrt{1+k_{sif}} \cdot k_{cong(c)} \quad \text{(Equation 15)}$$

By calculating the signal congestion degree of each position on the transfer pathway in consideration of the congestion degree of each peripheral cell by the use of above-mentioned equation 12 to 15, it is possible to improve the prediction accuracy of the communication speed.

Here, when the cell congestion degree is presumed to be identical in any cell in above-mentioned equations 12 to 15, approximation cell congestion degree ratio ($k_n$) at the time of calculating second interference index $k_{sif}$ becomes "1" for all peripheral cells (#1 to #6). When the approximation cell congestion degree ratio (kn) becomes "1," above-mentioned equations 14 and 15 become equal to above-mentioned equations 3 and 11.

Here, an explanation is given to the reason for using equations 12 to 15 to calculate the signal congestion degree of each position on the transfer pathway in consideration of the congestion degree of each peripheral cell.

First, the cell congestion degree of a peripheral cell is described. The cell congestion degree ($k_{cong\#n(c)}$) of the peripheral cell can be expressed as shown in following equation 16, from the approximation cell congestion degree ratio (kn) and above-mentioned equation 4.

[Math. 16]

$$k_{cong\#n(c)} = \sqrt{\frac{P_{CPICHneighb\#n} + P_{DSCHneighb\#n}}{P_{CPICHneighb\#n} \cdot SF}} \quad \text{(Equation 16)}$$

$$= k_n \cdot \sqrt{\frac{P_{CPICHserv} + P_{DSCHserv}}{P_{CPICHserv} \cdot SF}}$$

When this equation 16 is transformed, following equation 18 is found through following equation 17.

[Math. 17]

$$1 + \frac{P_{DSCHneighb\#n}}{P_{CPICHneighb\#n}} = k_n^2 \cdot \left(1 + \frac{P_{DSCHserv}}{P_{CPICHserv}}\right) \quad \text{(Equation 17)}$$

$$P_{DSCHneighb\#n} = \quad \text{(Equation 18)}$$
$$(k_n^2 - 1) \cdot P_{CPICHneighb\#n} + k_n^2 \cdot \frac{P_{CPICHneighb\#n}}{P_{CPICHserv}} \cdot P_{DSCHserv}$$

Subsequently, when equation 18 is substituted in above-mentioned equation 7, following equation 19 is found.

[Math. 18]

$$k_{cong(w)}^2 = \frac{P_{CIPCHserv} + \sum_{n=1}^{6} P_{CPICHneighb\#n} + P_{DSCHserv} + \frac{\sum_{n=1}^{6}(k_n^2 - 1) \cdot P_{CPICHneighb\#n} + \frac{\sum_{n=1}^{6} k_n^2 \cdot P_{CPICHneighb\#n}}{P_{CPICHserv}} \cdot P_{DSCHserv}}{P_{CPICHserv} \cdot SF}}{\frac{P_{CIPCHserv} + P_{DSCHserv}}{P_{CPICHserv} \cdot SF} + \frac{\sum_{n=1}^{6} k_n^2 \cdot P_{CPICHneighb\#n}}{P_{CPICHserv} \cdot SF} +}$$

$$= \frac{\sum_{n=1}^{6} k_n^2 \cdot P_{CPICHneighb\#n} \cdot P_{DSCHserv}}{P_{CPICHserv}^2 \cdot SF}$$

(Equation 19)

Here, when above-mentioned equation 4 is transformed, following equation 21 is found through following equation 20.

[Math. 19]

$$k_{cong(c)}^2 = \frac{P_{CPICHserv} + P_{SDCHserv}}{P_{CPICHserv} \cdot SF} \quad \text{(Equation 20)}$$

$$\frac{P_{DSCHserv}}{P_{CPICHserv}} = SF \cdot k_{cong(c)}^2 - 1 \quad \text{(Equation 21)}$$

Subsequently, when equation 21 is substituted in equation 19, following equation 22 is found.

[Math. 20]

$$k_{cong(w)}^2 = k_{cong(c)}^2 + \frac{\sum_{n=1}^{6} k_n^2 \cdot P_{CPICHneighb\#n}}{P_{CPICHserv} \cdot SF} + \frac{\sum_{n=1}^{6} k_n^2 \cdot P_{CPICHneighb\#n}}{P_{CPICHserv} \cdot SF} \cdot (SF \cdot k_{cong(c)}^2 - 1)$$

$$= k_{cong(c)}^2 + \frac{\sum_{n=1}^{6} k_n^2 \cdot P_{CPICHneighb\#n}}{P_{CPICHserv}} \cdot k_{cong(c)}^2$$

(Equation 22)

Here, when equation 13 is substituted in equation 22, following equation 23 is found.

[Math. 21]

$$k_{cong(w)}^2 = k_{cong(c)}^2 \cdot (1 + k_{sif})$$ (Equation 23)

When this equation 23 is transformed, above-mentioned equations 14 and 15 are found.

Thus, by holding the approximation cell congestion degree of a peripheral cell in a server, it is possible to calculate the cell congestion degree of a serving cell in consideration of the congestion degree of each peripheral cell. That is, by installing the server that holds the congestion degree, it is possible to improve the calculation accuracy of the cell congestion degree.

Display Example of Prediction Communication Speed

FIG. 20 is a schematic diagram illustrating one example of a display screen of a map to which a prediction path displayed on the display unit 370 in the fifth embodiment of the present technology and the prediction communication speed on the prediction path are attached.

Here, in FIG. 20, an example of showing the prediction communication speed on the prediction path by a numerical value is described. That is, FIG. 20 illustrates a display example corresponding to FIG. 8. Regarding a display example corresponding to FIG. 9, since they are not different except for that the prediction communication speed is displayed instead of interference indices, the explanation is omitted.

A sign (mobile phone 441) that shows the current position of the wireless communication apparatus 711 and a thick-line arrow (arrow 446) that shows the prediction path are displayed on a display screen (screen 440) of the prediction path with the communication speed illustrated in FIG. 20. Moreover, numerical values (prediction communication speed values 442 to 445) showing the prediction communication speed on the prediction path are displayed on the screen 440. As shown in the screen 440, it is possible to display the map to which the prediction communication speed on the prediction path is attached. Here, the display of the prediction communication speed to the user is not limited to a method of displaying it together with map information. Besides, by using a text that shows the increase and decrease of the prediction communication speed or an icon that evokes the increase and decrease of the prediction communication speed, whether the future prediction communication speed becomes fast according to the movement on the prediction path or the future prediction communication speed becomes slow according to the movement on the prediction path may be displayed to the user.

Operation Example of Wireless Communication Apparatus

Next, the operation of the server 800 in the fifth embodiment of the present technology is described with reference to the drawings.

Figure 21:
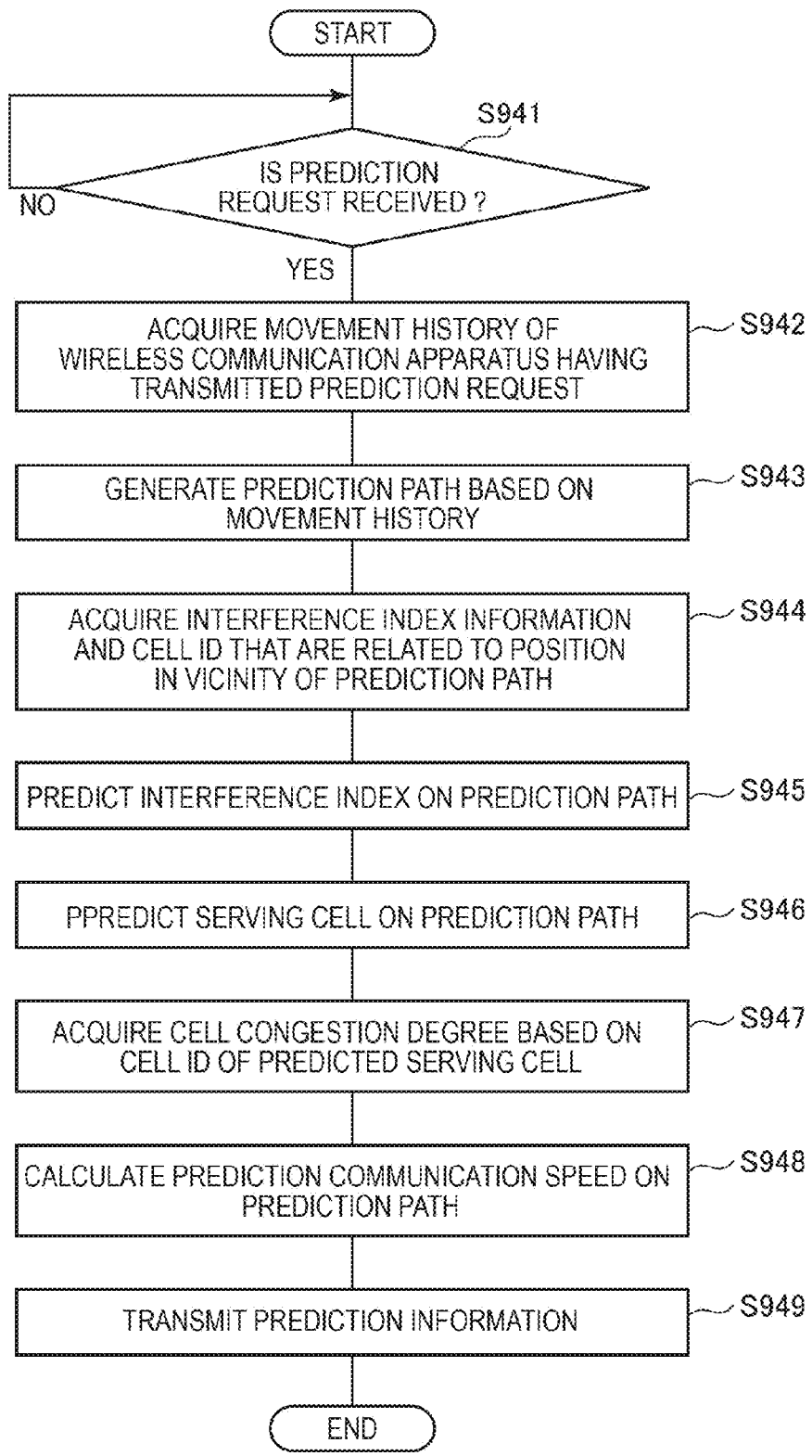
FIG. 21 is a flowchart showing a prediction information generation processing procedure example when prediction information is generated by a server in the fifth embodiment of the present technology.

FIG. 21 is a flowchart showing a prediction information generation processing procedure example when prediction information is generated by the server 800 in the fifth embodiment of the present technology.

First, whether a prediction request transmitted by the wireless communication apparatus 711 is received is determined by the communication unit 610 (step S941). Subsequently, in a case where it is determined that the prediction request is not received (step S941), it stands by until the prediction request is received.

By contrast, in a case where it is determined that the prediction request is received (step S941), the movement history of the wireless communication apparatus 711 that transmitted the prediction request is acquired from the position information history holding unit 630 by the transfer pathway prediction unit 640 (step S942). Afterwards, a prediction path of the wireless communication apparatus 711 that transmitted the prediction request is generated by the transfer pathway prediction unit 640 on the basis of the acquired movement history (step S943). Subsequently, an interference index in the vicinity of the prediction path and the cell ID linked to the and the interference index (i.e., the cell ID of the serving cell in the position) are acquired from the interference index information holding unit 820 by the interference index prediction unit 850 on the basis of the generated prediction path (step S944).

Further, the interference index of each position on the prediction path is predicted by the interference index prediction unit 850 on the basis of the acquired interference index (step S945). Subsequently, the serving cell in each position on the prediction path is predicted by the interference index prediction unit 850 on the basis of the acquired cell ID (step S946).

Next, based on the cell ID of the predicted serving cell in each position on the prediction path, the cell congestion degree of a cell (base station) specified by the cell ID is supplied from the congestion degree information holding unit 860 to the communication speed prediction unit 870 (step S947). Further, the communication speed at each position on the prediction path is predicted by the communication speed prediction unit 870 on the basis of the supplied cell congestion degree and the predicted interference index on the prediction path (step S948). Further, information including the communication path and the communication speed at each position on the prediction path is transmitted as prediction information to the wireless communication apparatus 711 by the prediction information generation unit 660 (step S949), and the prediction information generation processing procedure ends. Here, when predicting the serving cell in step S946, it may be possible to predict the serving cell by the use of the above-mentioned LAC in addition to the cell ID.

Thus, according to the fifth embodiment of the present technology, even in a case where the distance of a prediction path becomes longer as a serving cell is switched on a pathway, it is possible to appropriately predict the communication speed on the prediction path. In the fifth embodiment of the present technology, since a server that holds the cell congestion degree of peripheral cells is installed, by using the present cell congestion degree of the peripheral cells, it is possible to appropriately predict the communication speed in a wide area including the peripheral cells. Meanwhile, according to the wireless terminal apparatus of the fourth embodiment of the present technology, although it is difficult to predict the communication speed in a large range in which a serving cell is switched because it is not possible to detect the cell congestion degree of peripheral cells, it is not requested to perform communication with a server and therefore it is possible to perform calculation quickly. Therefore, there is a possible method of calculating the prediction communication speed by applying the fourth method of the present technology in a case where the prediction communication speed is calculated in a short time (for example, about two minutes), and the fifth embodiment of the present technology in the case of a long time (i.e., in a case where the movement distance is long) in a switched manner.

7. Sixth Embodiment of the Present Technology

In the fourth and fifth embodiments of the present technology, an example of displaying the prediction communication speed on a prediction path has been described. As described in these examples, it is possible to calculate the prediction communication speed at other positions than the current position by the use of interference indices, the signal congestion degree and the cell congestion degree. However, the usage of the prediction communication speed is not limited to the display of the prediction communication speed on a prediction path, and other various usages are possible. For example, it is considered that the user in a position with poor communication quality (for example, the user for which the data communication speed is slow or a call is frequently cut off) is navigated to a nearby position with good communication quality. Moreover, in a case where it is possible to calculate the prediction communication speed of a plurality of communication networks, it is considered that a communication network with the highest prediction communication speed in the current position is notified to the user.

Figure 22:
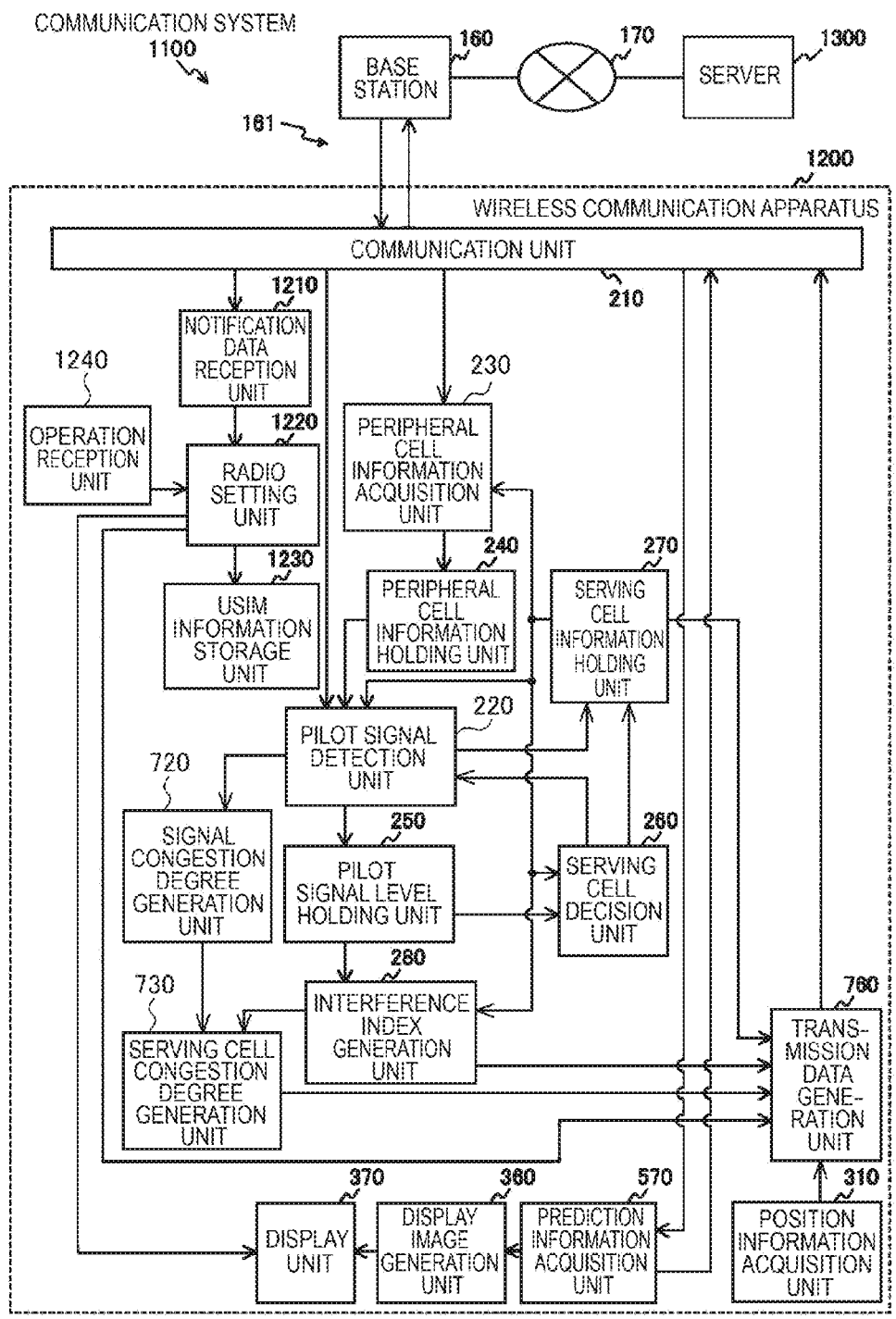
FIG. 22 is a block diagram illustrating a configuration example of a wireless communication apparatus of a communication system in the sixth embodiment of the present technology.
Figure 23:
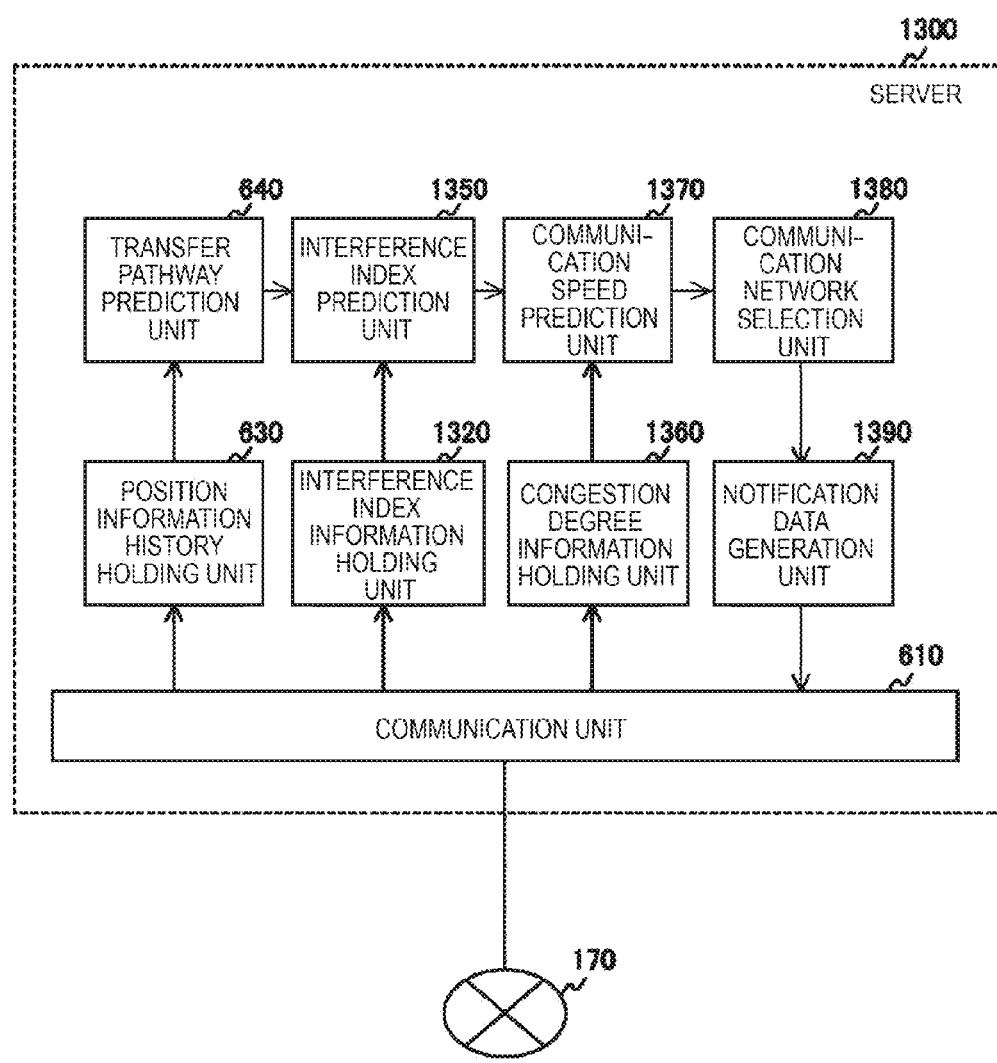
FIG. 23 is a block diagram illustrating a configuration example of a server of a communication system in the sixth embodiment of the present technology.

Therefore, in the sixth embodiment of the present technology, with reference to FIGS. 22 to 24, an explanation is given to an example where a server detects a telecommunications carrier with the fastest communication speed on a prediction path and a wireless communication apparatus is caused to perform communication on the basis of the detection result.

Configuration Example of Wireless Communication System

FIG. 22 is a block diagram illustrating a configuration example of a wireless communication apparatus 1200 of a communication system 1100 in the sixth embodiment of the present technology.

Here, in the sixth embodiment of the present technology, it is assumed that the user of the wireless communication apparatus 1200 has a contract with a plurality (four) of telecommunications carriers. Moreover, in the sixth embodiment of the present technology, it is assumed that the number of telecommunications carriers who provide wireless communication services on a prediction path is four.

The communication system 1100 includes a wireless communication apparatus 1200, the base station 160, the public line network 170 and a server 1300.

The wireless communication apparatus 1200 is an alternation example of the wireless communication apparatus 711 illustrated in FIG. 18, and further includes a notification data reception unit 1210, a radio setting unit 1220, a USIM (Universal Subscriber Identity Module) information storage unit 1230 and an operation reception unit 1240 in addition to each component of the wireless communication apparatus 711.

The notification data reception unit 1210 receives information on notification related to telecommunications carriers (i.e., notification data). Here, the notification data denotes information to notify an appropriate telecommunications carrier to the wireless communication apparatus 1200 on a prediction path of the wireless communication apparatus 1200, and it is transmitted from the server 1300 to the wireless communication apparatus 1200. For example the notification data includes information to specify a telecommunications carrier with the fastest prediction communication speed on the prediction path. Here, although an example of notifying the telecommunications carrier with the fastest communication speed is described in the sixth embodiment of the present technology, besides, a case is also considered where the cheapest telecommunications carrier is notified. The notification data reception unit 1210 transmits the received information (notification data) to the radio setting unit 1220.

The radio setting unit 1220 performs setting related to wireless communication performed by the wireless communication apparatus 1200, on the basis of the notification data supplied from the notification data reception unit 1210. The radio setting unit 1220 compares a communication network indicated by the notification data and a communication network that is available in the current setting, and determines whether the setting related to the wireless communication has to be changed. Subsequently, in the case of determining that the setting has to be changed, the radio setting unit 1220 performs control to change the setting such that the radio setting unit 1220 can use the communication network indicated by the notification data. For example, in a case where the communication network specified by the notification data is a different radio scheme of a telecommunications carrier of a communication network that is currently used, the radio setting unit 1220 performs various settings such that it is possible to perform communication using this radio scheme. Moreover, in a case where a telecommunications carriers who provides the communication network specified by the notification data is different from the telecommunications carrier of the communication network that is currently used, the radio setting unit 1220 rewrites valid USIM information stored in the USIM information storage unit 1230 to enable the use of the communication network of the telecommunications carrier. Here, the radio setting unit 1220 is one example of the acquisition unit and the control unit described in the claims.

Moreover, the radio setting unit 1220 displays information on the change in the radio scheme or the rewriting of the USIM information, on the display unit 370, and notifies the user of the information. Here, a display example is described with reference to FIG. 24 and therefore the explanation is omitted herein.

Moreover, when the server 1300 transmits the cell congestion degree and interference indices to the server 1300 so as to hold the cell congestion degree and the interference indices every communication network, information (communication network specification information) to specify a communication network that is currently set is further linked and transmitted.

The USIM information storage unit 1230 stores (holds) USIM information requested for the wireless communication apparatus 1200 to use a service (communication network) of a specific telecommunications carrier. Here, the USIM information is one example of contract certification information, and the contract certification information denotes information including telephone subscriber (or subscriber) information and authentication key (or authentication) information. That is, the USIM information denotes information issued by a specific telecommunications carrier on the basis of the contract of a wireless connection service between the user of the wireless communication apparatus 1200 and the specific telecommunications carrier.

The USIM information storage unit 1230 holds the USIM information such that the rewriting of the USIM information and validation processing and invalidation processing of the USIM information are possible. For example, in a case where the radio setting unit 1220 determines that the rewriting of the USIM information is performed on the basis of the notification data, the USIM information recorded in the USIM information storage unit 1230 is rewritten by new USIM information acquired from a server of the telecommunications carrier indicated by the notification data. Further, the wireless communication setting is performed on the basis of the new USIM information and communication in the communication network indicated by the notification data becomes possible.

The operation reception unit 1240 denotes an operation reception unit that receives an operation input operated by the user. For example, the operation reception unit 1240 outputs a signal in response to the received operation input to the radio setting unit 1220.

FIG. 23 is a block diagram illustrating a configuration example of the server 1300 of the communication system 1100 in the sixth embodiment of the present technology.

The server 1300 is an alternation example of the server 800 illustrated in FIG. 19, and can detect a communication network suitable for the purpose of the user of the wireless communication apparatus 1200 and transmit notification data to notify the user of the detected communication network. For example, in the case of notifying a communication network with fast communication speed on a prediction path to the use of the wireless communication apparatus 1200, the server 1300 detects a communication network with the fastest communication speed on the prediction path and transmits notification data indicating the detected communication network to the wireless communication apparatus 1200. Moreover, for example, in the case of a charging scheme in which the communication fee changes according to the congestion in a base station, when a communication network with the cheapest communication fee on the prediction path is notified, the server 1300 detects the communication network with the cheapest communication fee on the prediction path and transmits notification data indicating the communication network.

The server 1300 includes the communication unit 610, the position information history holding unit 630, the transfer pathway prediction unit 640, an interference index information holding unit 1320 and an interference index prediction unit 1350. Moreover, the server 1300 includes a congestion degree information holding unit 1360, a communication speed prediction unit 1370, a communication network selection unit 1380 and a notification data generation unit 1390. Here, the communication unit 610, the position information history holding unit 630 and the transfer pathway prediction unit 640 are similar to those shown above and therefore the explanation is omitted herein.

The interference index information holding unit 1320 classifies and holds interference index information for each of a plurality of communication networks. Moreover, similar to the interference index information holding unit 820 in FIG. 19, the interference index information holding unit 1320 holds an interference index, a position in which the interference index is detected (i.e., position information) and information to specify a serving cell in the position in which the interference index is detected (i.e., cell ID) in association with each other. For example, in a case where a communication network detection service by the server 1300 targets four communication networks, interference indices of the four communication networks (which are here referred to as "first communication network to fourth communication network") are held respectively. In this case, the interference index information holding unit 1320 manages the interference indices of the first communication network to the fourth communication network as respective interference index databases of the first communication network to the fourth communication network. In a case where interference index information with communication network specification information indicating the first communication network is supplied from the wireless communication apparatus 1200 in which USIM information on the first communication network is set, the interference index information holding unit 1320 updates the interference index database of the first communication network.

The congestion degree information holding unit 1360 classifies and holds congestion degree information for each of the plurality of communication networks. Here, since it is similar to the congestion degree information holding unit 860 in FIG. 19 except for that congestion degree information is held by each of the plurality of communication networks, the explanation is omitted herein.

Similar to the interference index prediction unit 850 in FIG. 19, the interference index prediction unit 1350 predicts interference indices and serving cells on a prediction path. Further, the interference index prediction unit 1350 predicts the interference index and the serving cell in each position on the prediction path for each of the plurality of communication networks. The interference index prediction unit 1350 acquires interference index information from the interference index information holding unit 1320 for each of the plurality of communication networks and calculates the interference index of each position on the prediction path for each of the plurality of communication networks. For example, the interference index prediction unit 1350 acquires interference indices of the first communication network linked to the prediction path or positions in the vicinity of the prediction path from the interference index information holding unit 1320, and calculates the interference indices of the first communication network on the prediction path.

Similar to the communication speed prediction unit 870 in FIG. 19, the communication speed prediction unit 1370 predicts the communication speed on the prediction path. Further, the communication speed prediction unit 1370 predicts the communication speed for each of the plurality of communication networks. For example, the communication speed prediction unit 1370 predicts the communication speed of the first communication network in each position on the prediction path on the basis of the interference index of the first communication network in each position on the prediction path and the cell congestion degree of the first communication network cell which is the serving cell in each position. In the same way, the communication speed prediction unit 1370 predicts the communication speed of the second to fourth communication networks.

In the case of notifying the user of a communication network with fast communication speed, the communication speed prediction unit 1370 supplies the prediction path and the prediction communication speed of each communication network to the communication network selection unit 1380. Moreover, for example, in the case of a charging scheme in which the communication fee changes according to the congestion in a base station, when a communication network with the cheapest communication fee on the prediction path is notified to the user, the communication speed prediction unit 1370 supplies the prediction path and the cell congestion degree of each communication network to the communication network selection unit 1380.

The communication network selection unit 1380 selects a communication network to be notified to the wireless communication apparatus 1200. For example, in the case of notifying the user of a communication network with fast communication speed, the communication network selection unit 1380 detects a communication network with the fastest average prediction communication speed on the prediction path among the communication networks of the telecommunications carriers with which the user has a contract, on the basis of the prediction communication speed of each communication network supplied from the communication speed prediction unit 1370. That is, the communication network selection unit 1380 compares the communication states of the communication networks on the prediction path and detects a communication network that satisfies a specific condition. The communication network selection unit 1380 supplies the detected communication network to the notification data generation unit 1390. Here, the communication network selection unit 1380 is one example of the generation unit described in the claims.

The notification data generation unit 1390 generates notification data to notify the communication network selected in the communication network selection unit 1380. The notification data generation unit 1390 transmits the generated notification data to the wireless communication apparatus 1200. Here, this transmitted notification data is transmitted to the wireless communication apparatus 1200 via a communication network that becomes available by USIM information set in the wireless communication apparatus 1200 at that time.

Display Example of Radio Setting Change Screen

FIG. 24 is a view illustrating a display example of a display screen displayed on the display unit 370 when the setting related to the communication network switching based on notification data in the sixth embodiment of the present technology.

Figure 24A:
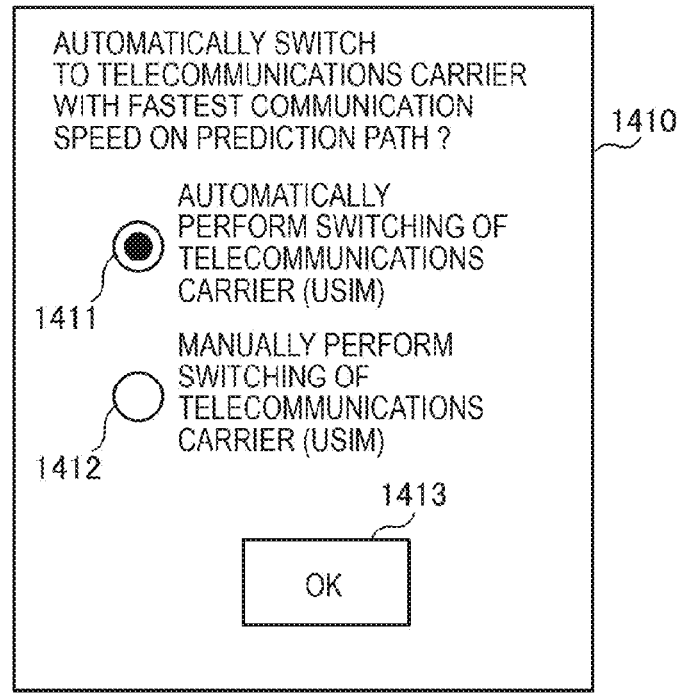
FIG. 24A is a view illustrating a display example of a display screen displayed on a display unit 370 when setting related to the communication network switching based on notification data is performed in the sixth embodiment of the present technology.
Figure 24B:
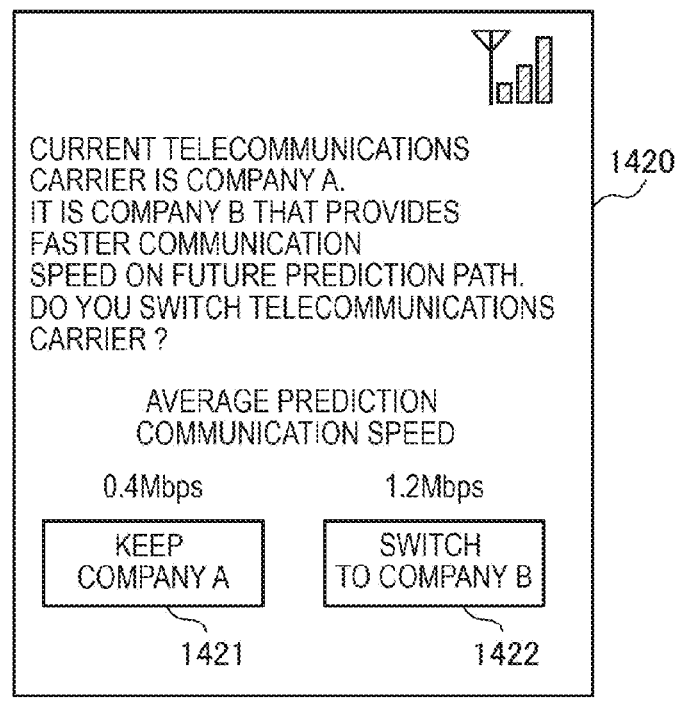
FIG. 24B is a view illustrating a display example of a display screen displayed on a display unit when setting related to the communication network switching based on notification data is performed in the sixth embodiment of the present technology.

FIG. 24A illustrates a display screen (setting screen 1410) to select whether to automatically switch a communication network based on notification data. Moreover, FIG. 24B illustrates a display screen (setting screen 1420) to select whether to switch a communication network when notification data is received in a state where the manual operation is selected in the setting screen 1410. Here, an explanation is given with an assumption that the switching of the communication network involves the switching of a telecommunications carrier (i.e., the switching of USIM).

Radio buttons (radio buttons 1411 and 1412) to select whether to switch a telecommunications carrier automatically or switch the telecommunications carrier manually, and an OK button (OK button 1413) to decide the selection are displayed on the setting screen 1410 in FIG. 24A.

When the radio button 1411 is selected and the OK button 1413 is pressed, the telecommunications carrier (USIM) is automatically switched. That is, it is automatically switched to a communication network notified by notification data.

Meanwhile, when the radio button 1412 is selected and the OK button 1413 is pressed, the switching of the telecommunications carrier (USIM) is set to manual operation. That is, the user selects whether to switch a communication network every time an optimal communication network is notified by notification data. Here, one example of a display screen when the user selects whether to switch this communication network, is the setting screen 1420 illustrated in FIG. 24B.

On the setting screen 1420 in FIG. 24B, a button (company A selection button 1421) to keep company A that is a telecommunications carrier of the current communication network (i.e., the communication network is not switched) and a button (company B selection button 1422) to switch the telecommunications carrier from company A to company B are displayed. As shown in this setting screen 1420, in the case of manually switching the communication network, the user can select whether to switch the communication network every time an optimal communication network is notified by notification data.

Thus, according to the sixth embodiment of the present technology, by installing a server that holds interference indices and the cell congestion degree for each of a plurality of communication networks, it is possible to notify the user of an optimal communication network. Here, in the sixth embodiment of the present technology, although an example of notifying a telecommunications carrier with the fastest communication speed on a prediction path has been described, it is not limited to this, and a case can also be considered where a telecommunications carrier with a cheap communication fee or a telecommunications carrier whose communication is not interrupted up to destination is notified.

8. Seventh Embodiment of the Present Technology

In the sixth embodiment of the present technology, an example of switching a communication network on the basis of notification data has been described. Although it is not especially referred to in the sixth embodiment, the switching processing of the communication network (i.e., setting change processing in the identical telecommunications carrier or USIM switching processing in other telecommunications carriers) takes some time. In a case where the switching of the communication network is set to automatic operation, if the communication network is switched though the time to perform communication is very short, it is assumed that the total time can increase by mistake. For example, in a case where the communication speed becomes fast from 1.0 Mbps to 1.3 Mbps by the switching of the communication network, if it takes about three minutes for the switching of USIM though only the communication time is one minute, the total time is shorter in a case where the switching is not performed. That is, in a case where the switching of the communication network is set to automatic operation, it is convenient that the switching of USIM is performed according to the state of communication performed by the wireless communication apparatus.

Therefore, in the seventh embodiment of the present technology, with reference to FIG. 25, an explanation is given to an example where the switching of a communication network is determined according to the state of communication to be performed in a case where the switching of the communication network is set to automatic operation.

Configuration Example of Wireless Communication System

FIG. 25 is a block diagram illustrating a configuration example of a communication system 1101 in the seventh embodiment of the present technology.

The communication system 1101 includes a wireless communication apparatus 1201, the base station 160, the public line network 170, and the server 1300. Here, the base station 160 and the public line network 170 are similar those illustrated in FIG. 3, and therefore the explanation is omitted herein. Moreover, the server 1300 is similar to the one illustrated in FIG. 23, and therefore the explanation is omitted herein.

The wireless communication apparatus 1201 is an alternation example of the wireless communication apparatus 1200 illustrated in FIG. 22, and further includes an application determination unit 1250. Here, other components than the application determination unit 1250 are similar to those of the wireless communication apparatus 1200, and therefore an explanation is given here focusing on the application determination unit 1250.

The application determination unit 1250 determines what communication an application that performs the communication performs among applications executed in the wireless communication apparatus 1200. This application determination unit 1250 analyzes the time, interval (frequency) and download amount (communication volume) per time of the communication performed by the application. For example, the application determination unit 1250 determines whether it is an application that intermittently performs communication with a relatively small communication volume in a short communication period like web browsing or it is an application that continuously performs communication with a large communication volume in a long communication period like the streaming of moving images.

Further, in the case of determining that an application with a short communication period or an application that intermittently performs communication with a small communication volume is executed, the application determination unit 1250 supplies an instruction to perform wireless communication in the current radio setting to the radio setting unit 1220. Here, while communication is performed by an application of the determination target, even if information on a communication network is supplied by notification data, the radio setting unit 1220 having received this instruction continues wireless communication without changing the radio setting and rewriting USIM. That is, by performing the wireless communication without changing the setting in the case of the application with a short communication period or the application that intermittently performs communication, it is possible to suppress that the total communication time including the time of the setting change becomes long.

Moreover, in the case of determining that an application with a relatively long communication period or an application requesting a large communication volume is executed, the application determination unit 1250 supplies an instruction to acquire notification data and request the switching to a high-speed communication network, to the radio setting unit 1220. Here, the radio setting unit 1220 having received this instruction transmits a notification data request to the server 1300.

Subsequently, when the notification data is transmitted from the server 1300, in a case where a communication network that is currently set is the fastest, the radio setting unit 1220 performs wireless communication in the current radio setting. Moreover, in a case where a communication network indicated by notification data is a communication network of a different radio scheme in a telecommunications carrier who is currently set, the radio setting unit 1220 changes the radio setting such that it is possible to perform wireless communication in the communication network. Moreover, in a case where the communication network indicated by the notification data is a communication network of a telecommunications carrier different from the communication carrier who is currently set, the radio setting unit 1220 rewrites USIM information stored in the USIM information storage unit 1230 and changes the radio setting such that it is possible to perform wireless communication in the communication network indicated by the notification data. Thus, in the case of the application with a relatively long communication period or the application requesting a large communication volume, it is possible to shorten a communication time by using a wireless network with good communication quality in consideration of the total time including the setting change time. Moreover, by performing a setting change in the case of the application with a relatively long communication period or the application requesting a large communication volume, it is possible to perform wireless communication without putting a load on a base station and it is expected to improve the capacity of the base station.

Thus, according to the seventh embodiment of the present technology, it is possible to determine the switching of a communication network according to an executed application.

9. Eighth Embodiment of the Present Technology

In the first to eighth embodiments of the present technology, an explanation has been given to an example where a wireless communication scheme is assumed to be the HSDPA scheme and an interference index is generated on the basis of the pilot signal level. However, it is not limited to this, and it is possible to generate the interference index in other wireless communication schemes. In the case of other wireless communication schemes, it is possible to calculate the interference index by using a signal that attenuates according to the distance between a base station and a wireless communication apparatus like a pilot signal. For example, in the case of a wireless communication scheme of an orthogonal frequency division multi access (OFDMA) scheme such as LTE (Long Term Evolution), it is possible to calculate an interference index by using a reference signal.

Here, as the eighth embodiment of the present technology, an explanation is given to an example where a wireless communication system is the OFDMA scheme, with reference to FIG. 26.

Configuration Example of Wireless Communication System

FIG. 26 is a block diagram illustrating a configuration example of a wireless communication apparatus 1510 of a communication system 1500 in the eighth embodiment of the present technology.

The communication system 1500 includes the wireless communication apparatus 1510, the base station 160, the public line network 170 and the server 800. Here, other components than the wireless communication apparatus 1510 are similar to those described above, and therefore the explanation is omitted herein.

The wireless communication apparatus 1510 is an alternation example of the wireless communication apparatus 711 illustrated in FIG. 18, and includes a reference signal detection unit 1520 and a reference signal level holding unit 1530 instead of the pilot signal detection unit 220 and the pilot signal level holding unit 250. Moreover, the wireless communication apparatus 1510 includes a serving cell congestion degree generation unit 1540 instead of the signal congestion degree generation unit 720 and the serving cell congestion degree generation unit 730. Also, in FIG. 18, it is premised that the communication unit 210 transmits and receives signals of the OFDMA scheme.

The reference signal detection unit 1520 detects a reference signal from the radio signals including the reference signal mapped in the frequency direction and the time direction. Moreover, the reference signal detection unit 1520 calculates the reference signal received power (RSRP) on the basis of the detected reference signal. By detecting the reference signal included in the received radio signals, the reference signal detection unit 1520 calculates at least the RSRP of a serving cell and the RSRP of a peripheral cell every cell. Here, regarding the RSRP, by using an average value acquired by averaging the RSRP of a plurality of reference signals among the plurality of reference signals mapped in the frequency direction and the time direction, it is possible to decrease the detection error of the RSRP value. Further, the reference signal detection unit 1520 holds the calculated RSRP in the reference signal level holding unit 1530. Thus, the reference signal detection unit 1520 detects the RSRP indicating the reference signal level (strength) instead of the pilot signal level detection in the pilot signal detection unit 220, and holds it in the reference signal level holding unit 1530.

The reference signal level holding unit 1530 holds the RSRP of the serving cell and the peripheral cell. That is, the reference signal level holding unit 1530 holds the reference signal levels of the serving cell and the peripheral cell respectively. The RSRP of each cell held by the reference signal level holding unit 1530 is used when the serving cell is decided in the serving cell decision unit 260. Moreover, the RSRP of each cell held by the reference signal level holding unit 1530 is supplied to the interference index generation unit 280, and an interference index is calculated on the basis of the RSRP of each cell. That is, in the wireless communication apparatus 1510, the RSRP is used instead of the pilot signal level in a wireless communication apparatus that transmits and receives signals of the CDMA scheme.

Similar to the serving cell congestion degree generation unit 730 illustrated in FIG. 18, the serving cell congestion degree generation unit 1540 generates information (cell congestion degree) that shows the congestion degree in a radio signal transmitted by the serving cell. The serving cell congestion degree generation unit 1540 calculates the total subcarrier number per one frame of a signal of the OFDMA scheme and the subcarrier number assigned to each user in that one frame. Further, the serving cell congestion degree generation unit 1540 calculates the congestion degree (cell congestion degree) in the serving cell on the basis of the ratio between the total subcarrier number and the assigned subcarrier number.

Here, a calculation method of the cell congestion degree is not limited to the one using the subcarrier number. For example, it can be calculated on the basis of the sum of the power of all subcarriers per one frame and the sum of the power of subcarriers assigned to each user. Moreover, regarding the subcarrier detection by the serving cell congestion degree generation unit 1540, it is possible to not only detect subcarriers per one frame directly but also detect them from a signal that notifies a frame structure in a control signal included in the signal of the OFDMA scheme. Moreover, the serving cell congestion degree generation unit 1540 can calculate the cell congestion degree on the basis of the ratio between the total number of resource blocks and the number of resource blocks assigned to each user.

Thus, according to the eighth embodiment of the present technology, even in a case where a wireless communication scheme is the OFDMA scheme, it is possible to appropriately predict the communication speed on a prediction path. That is, even in a case where the wireless communication scheme is the OFDMA scheme, it is possible to understand an appropriate communication state in wireless communication.

10. Ninth Embodiment of the Present Technology

In the embodiments of the present technology described above, an example of using an interference index and congestion degree calculated by a wireless communication apparatus to detect communication quality on a prediction path has been chiefly described. Naturally, the interference index and the congestion degree can be used to detect the communication quality in the current position. For example, when they are used to calculate the number of antenna bars representing a sign to display the communication quality in a mobile phone or the like, it is possible to appropriately notify the communication quality in the current position to the user.

Therefore, in the ninth embodiment of the present technology, an example of calculating the number of antenna bars in consideration of the interference index and the congestion degree is described with reference to FIG. 27.

Configuration Example of Wireless Communication Apparatus

FIG. 27 is a block diagram illustrating a configuration example of a wireless communication apparatus 1610 in the ninth embodiment of the present technology.

The wireless communication apparatus 1610 includes the communication unit 210, the pilot signal detection unit 220, the peripheral cell information acquisition unit 230, the peripheral cell information holding unit 240, the pilot signal level holding unit 250, the serving cell decision unit 260 and the serving cell information holding unit 270. Moreover, the wireless communication apparatus 1610 includes the interference index generation unit 280, the display unit 370, the signal congestion degree generation unit 720, the serving cell congestion degree generation unit 730, an RSSI level detection unit 1620 and a communication quality display generation unit 1630.

Here, other components than the RSSI level detection unit 1620 and the communication quality display generation unit 1630 are similar to those described in the above embodiments, and therefore the explanation is omitted herein.

The RSSI level detection unit 1620 detects the level of RSSI (strength) in a radio signal received by the wireless communication apparatus 1610. That is, the RSSI level detection unit 1620 detects the level of RSSI that is an indication signal of communication quality for a wireless communication apparatus in the related art. The RSSI level detection unit 1620 supplies the detected RSSI level to the communication quality display generation unit 1630.

The communication quality display generation unit 1630 generates a display image to notify the user of the communication quality. In the case of notifying the user of the communication quality by the increase and decrease of the number of antenna bars (specific sign), this communication quality display generation unit 1630 decides the number of antenna bars. The communication quality display generation unit 1630 decides the number of antenna bars on the basis of the RSSI level supplied from the RSSI level detection unit 1620, the interference index supplied from the interference index generation unit 280 and the cell congestion degree supplied from the serving cell congestion degree generation unit 730. Further, the communication quality display generation unit 1630 displays the decided number of antenna bars on the display unit 370. Here, the communication quality display generation unit 1630 is one example of the detection unit and the display image generation unit described in the claims.

Here, a decision method of the number of antenna bars is described. To decide the number of antenna bars, the communication quality display generation unit 1630 calculates a value adding the interference index and the congestion degree to the RSSI level. This calculation is performed using following equation 24, for example. Here, following equation 24 shows not only a case where it is calculated from cell congestion degree $k_{cong(c)}$ but also a case where it is calculated from signal congestion degree $k_{cong(w)}$.

[Math. 22]

$$RSSI_{modify} = \frac{RSSI}{1 + k_{if}} \cdot \frac{1}{SF \cdot k_{cong(c)}^2} = \frac{RSSI}{SF \cdot k_{cong(w)}^2} \quad \text{(Equation 24)}$$

where, the RSSI is a value converting the RSSI level detected by the RSSI level detection unit 1620 into the antilogarithm. Moreover, $RSSI_{modify}$ represents the RSSI level to which the interference index and the congestion degree are added.

By using above-mentioned equation 24, it is possible to add the interference index and the congestion degree to the RSSI level. RSSI level $RSSI_{modify}$ calculated by above-mentioned equation 24 is substantially equivalent to the level of a pilot signal included in a radio signal from the serving cell, in the all received power (RSSI level). That is, in a state where the serving cell is congested (i.e., a state where the value of the cell congestion degree is large), although the RSSI level becomes high by multiplexing of the radio signal of data to each user, the level by this multiplexing decreases by adding the congestion degree.

Also, in a state with strong interference, although the RSSI level becomes high by multiplexing of a radio signal from a peripheral cell, the level by this multiplexing decreases by adding the interference index.

That is, by displaying the antenna bar on the basis of RSSI level $RSSI_{modify}$ calculated by equation 24, the number of antenna bars decreases in a case where the serving cell is congested or the interference is high. By this means, it is possible to decrease the chance that the user misunderstands that the communication quality is good.

Here, although an example taking into account the interference index and the congestion degree has been described, in the case of taking into account only the interference index (corresponding to the first to third embodiments of the present technology), RSSI level $RSSI_{modify}$ is calculated using following equation 25. By this means, it is possible to decrease the chance that the user misunderstands that the communication quality is good.

[Math. 23]

$$RSSI_{modify} = \frac{RSSI}{(1 + k_{if})} \quad \text{(Equation 25)}$$

Thus, according to the ninth embodiment of the present technology, it is possible to appropriately display the communication quality by calculating the number of antenna bars in consideration of the interference index and the congestion degree.

11. Tenth Embodiment of the Present Technology

In the first embodiment of the present technology, it is assumed that the interference value of each position has a constant value and does not change greatly. However, in a case where a base station that changes the antenna direction according to the user distribution (i.e., a base station in which the directivity changes) is installed, the interference index changes according to the change in the directivity too.

Therefore, as the tenth embodiment of the present technology, with reference to FIG. 28, an explanation is given to an example of holding the interference index in the interference index information holding unit 320 so as to cope with the base station in which the directivity changes.

Example of Interference Index of Each Position Held in Interference Index Information Holding Unit FIG. 28 is a view simply illustrating one example of the interference index of each position held in the interference index information holding unit 320 in the tenth embodiment of the present technology.

FIG. 28 illustrates a table (table 326) that simply shows the interference index of each position held in the interference index information holding unit 320. Here, the table 326 is an alternation example of the table 321 illustrated in FIG. 7 and therefore the difference is described herein.

As shown in the table 326, the interference index (column 327) is held every time zone in the tenth embodiment of the present technology.

Here, the reason to hold the interference index every time zone is described. The user distribution can be presumed to be identical at the rough times every day, for example, it is large in the commuting time and small in the night time. Moreover, regarding a base station that changes the directivity according to the user distribution that is identical in the rough times every day, it can be presumed that the directivity is identical in the rough times every day. That is, by holding the interference index every time zone, it is possible to cope with the change in the directivity of the base station. Here, it is needless to say that it can be further classified every day of the week, weekday, vacation or holiday.

Thus, according to the tenth embodiment of the present technology, it is possible to appropriately acquire a communication state in wireless communication even in a case where a base station in which the directivity changes is installed.

Thus, according to the embodiment of the present technology, it is possible to understand an appropriate communication state in wireless communication. Especially, since it is possible to understand the communication states in other positions than the current position, it is possible to appropriately notify the user of the future communication state.

Here, in the embodiment of the present technology, although an example of calculating an interference index using above-mentioned equation 1 has been described, it is not limited to this. For example, it can be calculated using following equation 26.

[Math. 24]

$$k_{if} = \frac{P_{CPICHserv}}{P_{CPICHserv} + \sum_{n=1}^{6} P_{CPICHneighb\#n}} \quad \text{(Equation 26)}$$

Also, in this case, cell congestion degree $k_{cong(c)}$ is calculated by following equation 27. Here, following equation 27 corresponds to equation 3 in a case where the interference index is calculated by equation 1.

[Math. 25]

$$k_{cong(c)} = \sqrt{\frac{k_{if} \cdot b}{a}} = \sqrt{k_{if}} \cdot k_{cong(w)} \quad \text{(Equation 27)}$$

That is, as shown in above-mentioned equation 26, interference index $k_{if}$ can be calculated on the basis of the ratio between the sum of the pilot signal levels of the serving cell and peripheral cells and the pilot signal level of the serving cell. When interference index $k_{if}$ is calculated using above-mentioned equation 26, the value becomes "1" in an environment in which interference does not exist at all. The value becomes "0.5" when the interference increases and the degree (level) of the interference and the pilot signal level of the serving cell are equal, and the value approaches "0" when the degree of the interference further increases.

Moreover, when the sum of the pilot signal levels of the peripheral cells and the pilot signal level of the serving cell are equal, the cell congestion degree calculated from equation 27 and the cell congestion degree calculated from equation 3 become the same value.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

The processing sequences that are described in the embodiments described above may be handled as a method having a series of sequences or may be handled as a program for causing a computer to execute the series of sequences and recording medium storing the program. As the recording medium, a hard disk, a CD (Compact Disc), an MD (Mini-Disc), and a DVD (Digital Versatile Disk), a memory card, and a Blu-ray disc (registered trademark) can be used.

Additionally, the present technology may also be configured as below.

(1)

An information processing apparatus including:
an acquisition unit configured to acquire an interference index indicating a degree of interference in wireless communication between a wireless communication apparatus and a base station that is a connection target of the wireless communication apparatus, and position information related to a position concerning the interference index; and
a generation unit configured to specify an interference index concerning a target area to detect a communication state of the wireless communication apparatus, based on the acquired position information, and generate communication state information to notify the communication state based on the specified interference index.

(2)

The information processing apparatus according to (1), wherein the acquisition unit acquires an interference index associated with position information concerning a position of the target area or a position close to the target area, and
wherein the generation unit specifies the interference index concerning the target area based on the acquired interference index.

(3)

The information processing apparatus according to (2), wherein the information processing apparatus is a wireless communication apparatus,
wherein the information processing apparatus further includes
an interference index generation unit configured to generate the interference index based on a ratio between a level of a pilot signal sent by the base station of the connection target and a sum of levels of pilot signals sent by other base stations whose signal can be received by the wireless communication apparatus, and
a holding unit configured to hold the generated interference index in association with position information that shows a detection position of the pilot signal used to generate the interference index, and
wherein the acquisition unit acquires, from the holding unit, an interference index associated with position information concerning the position of the target area or the position close to the target area.

(4)

The information processing apparatus according to any one of (1) to (2), wherein the acquisition unit acquires, from a server that holds the interference index, an interference index associated with position information concerning a position of the target area or a position close to the target area.

(5)

The information processing apparatus according to any one of (1) to (4), further including
a transfer pathway prediction unit configured to predict a transfer pathway of the wireless communication apparatus based on a history of a position in which the wireless communication apparatus exists,
wherein the generation unit generates the communication state information using the predicted transfer pathway as the target area.

(6)

The information processing apparatus according to (5), wherein the information processing apparatus is the wireless communication apparatus, wherein the information processing apparatus further comprises
    a display image generation unit configured to generate a display image to notify a user of the communication state information.

(7)

The information processing apparatus according to any one of (1) to (6), further including:
    a signal congestion degree generation unit configured to generate a signal congestion degree indicating a degree of signals related to an increase and decrease of a communication speed of the wireless communication apparatus among reception signals received by the wireless communication apparatus; and
    a base station congestion degree generation unit configured to generate a base station congestion degree indicating a congestion degree of the base station of the connection target based on the generated signal congestion degree and an interference index in a position in which the signal congestion degree is generated,
    wherein the generation unit generates a signal congestion degree in the target area based on the generated base station congestion degree and the interference index concerning the specified target area, predicts the communication speed in the target area from the generated signal congestion degree in the target area and generates the predicted communication speed as the communication state information.

(8)

The information processing apparatus according to (7),
    wherein the signal congestion degree generation unit generates the signal congestion degree based on a ratio of a correlation output between the reception signal and a code assigned to the base station of the connection target, to a correlation output concerning a base station with a smallest correlation among correlation outputs between the reception signal and codes assigned to other base stations whose signal can be received by the wireless communication apparatus, and
    wherein the base station congestion degree generation unit generates the base station congestion degree based on a relationship between the generated signal congestion degree and an interference index in a position in which the signal congestion degree is generated.

(9)

The information processing apparatus according to (7),
    wherein the signal congestion degree generation unit generates the signal congestion degree based on a correlation output between the received signal and a code assigned to the base station of the connection target or a ratio between received power of the reception signal and a resource block assigned to the base station of the connection target and power of the reception signal, and
    wherein the base station congestion degree generation unit generates the base station congestion degree based on a relationship between the generated signal congestion degree and an interference index in a position in which the signal congestion degree is generated.

(10)

The information processing apparatus according to (1) or (2),
    wherein the information processing apparatus is a server that holds the interference index,
    wherein the acquisition unit acquires the interference index associated with position information concerning a position of the target area detected based on a position supplied from the wireless communication apparatus or a position close to the target area, and
    wherein the generation unit specifies the interference index of the target area based on the acquired interference index.

(11)

The information processing apparatus according to (10), further including:
    a position information holding unit configured to hold the position supplied from the wireless communication apparatus in chronological order; and
    a transfer pathway prediction unit configured to predict a transfer pathway of the wireless communication apparatus based on the held position,
    wherein the generation unit generates the communication state information using the predicted transfer pathway as the target area.

(12)

The information processing apparatus according to (11), further including
    a base station congestion degree holding unit configured to hold a base station congestion degree indicating a congestion degree of a base station,
    wherein the generation unit acquires a base station congestion degree of the base station of the connection target in the predicted transfer pathway from the base station congestion degree holding unit, predicts a communication speed based on the acquired base station congestion degree and the interference index of the target area, and generates the predicted communication speed as the communication state information.

(13)

The information processing apparatus according to (10),
    wherein the acquisition unit acquires the interference index associated with the position information concerning the position of the detected target area or the position close to the target area, for each of a plurality of communication networks, and
    wherein the generation unit detects a communication state of each of the plurality of communication networks in the target area based on the acquired interference index, and generates, as the communication state information, information showing a communication network that satisfies a specific condition among the plurality of communication networks.

(14)

The information processing apparatus according to (13),
    wherein the generation unit generates the communication state information using a communication network whose predicted communication speed is fastest among the plurality of communication networks, as the communication network that satisfies the specific condition.

(15)

A wireless communication apparatus including:
    a detection unit configured to detect communication quality based on an interference index indicting a degree of interference in wireless communication with a base station of a connection target and a reception signal strength indicating a strength of a signal received by the wireless communication apparatus; and
    a display image generation unit configured to generate a display image to notify a user of the detected communication quality.

(16)

The wireless communication apparatus according to (15),
    wherein the display image generation unit generates the display image that shows the communication quality according to an increase and decrease of a specific sign.

(17)

The wireless communication apparatus according to (15), further including: a signal congestion degree generation unit configured to generate a signal congestion degree indicating a degree of signals related to an increase and decrease of a communication speed of the wireless communication apparatus among received signals; and a base station congestion degree generation unit configured to generate a base station congestion degree indicating a congestion degree of the base station of the connection target based on the generated signal congestion degree and the interference index in a position in which the signal congestion degree is generated, wherein the detection unit detects the communication quality based on the generated base station congestion degree, the interference index and the reception signal strength.

(18)

A wireless communication apparatus including:

an acquisition unit configured to acquire communication state information transmitted from an information processing apparatus that acquires an interference index indicating a degree of interference in wireless communication with a base station of a connection target of the wireless communication apparatus and position information related to a position concerning the interference index for each of a plurality of communication networks, detects a communication state of each of the plurality of communication networks in a target area to detect a communication state of the wireless communication apparatus, based on the acquired interference index and the acquired position information, and generates, as the communication state information, information indicating a communication network that satisfies a specific condition among the plurality of communication networks; and a control unit configured to perform control to connect to the communication network that satisfies the specific condition based on the acquired communication state information.

(19)

A communication system including:

an information processing apparatus including a supply unit configured to supply an interference index indicating a degree of interference in wireless communication between a wireless communication apparatus and a base station that is a connection target of the wireless communication apparatus, and position information related to a position concerning the interference index; and a wireless communication apparatus including a generation unit configured to specify an interference index concerning a target area to detect a communication state of the wireless communication apparatus, based on the supplied position information, and generate communication state information to notify the communication state based on the specified interference index.

(20)

A communication state detection method including:

an acquisition step of acquiring an interference index indicating a degree of interference in wireless communication between a wireless communication apparatus and a base station that is a connection target of the wireless communication apparatus, and position information related to a position concerning the interference index; and a generation step of specifying an interference index concerning a target area to detect a communication state of the wireless communication apparatus, based on the acquired position information, and generating communication state information to notify the communication state based on the specified interference index.

REFERENCE SIGNS LIST 111, 141 serving cell
112, 113, 142 peripheral cell
120, 150, 200, 510, 511, 710, 711 wireless communication apparatus
160 base station
170 public line network
210, 610 communication unit
220 pilot signal detection unit
230 peripheral cell information acquisition unit
240 peripheral cell information holding unit
250 pilot signal level holding unit
260 serving cell decision unit
270 serving cell information holding unit
280 interference index generation unit
310 position information acquisition unit
320, 620 interference index information holding unit
330, 630 position information history holding unit
340, 640 transfer pathway prediction unit
350, 550, 650 interference index prediction unit
360 display image generation unit
370 display unit
500, 501, 701 communication system
520 transmission interference index information generation unit
530 interference index information reception unit
560 transmission data generation unit
570 prediction information acquisition unit
600, 601, 800 server
660 prediction information generation unit
720 signal congestion degree generation unit
730 serving cell congestion degree generation unit
740, 870 communication speed prediction unit
760 transmission data generation unit
820 interference index information holding unit
850 interference index prediction unit
860 congestion degree information holding unit

The invention claimed is:

1. An information processing apparatus comprising:
an acquisition unit configured to acquire an interference index indicating a degree of interference in wireless communication between a wireless communication apparatus and a base station that is a connection target of the wireless commination apparatus, and position information related to a position concerning the interference index;
a generation unit configured to specify an interference index concerning a target area to detect a communication state of the wireless communication apparatus, based on the acquired position information, and generate communication state information to notify the communication state based on the specified interference index; and
a transfer pathway prediction unit configured to predict a transfer pathway of the wireless communication apparatus based on a history of a position in which the wireless communication apparatus exists,
wherein the generation unit generates the communication state information using the predicted transfer pathway as the target area.

2. The information processing apparatus according to claim 1, wherein the acquisition unit acquires an interference index associated with position information concerning a position of the target area or a position close to the target area, and wherein the generation unit specifies the interference index concerning the target area based on the acquired interference index.

3. The information processing apparatus according to claim 2, wherein the information processing apparatus is a wireless communication apparatus, wherein the information processing apparatus further comprises an interference index generation unit configured to generate the interference index based on a ratio between a level of a pilot signal sent by the base station of the connection target and a sum of levels of pilot signals sent by other base stations whose signal can be received by the wireless communication apparatus, and a holding unit configured to hold the generated interference index in association with position information that shows a detection position of the pilot signal used to generate the interference index, and wherein the acquisition unit acquires, from the holding unit, an interference index associated with position information concerning the position of the target area or the position close to the target area.

4. The information processing apparatus according to claim 1, wherein the acquisition unit acquires, from a server that holds the interference index, an interference index associated with position information concerning a position of the target area or a position close to the target area.

5. The information processing apparatus according to claim 1, wherein the information processing apparatus is the wireless communication apparatus, wherein the information processing apparatus further comprises a display image generation unit configured to generate a display image to notify a user of the communication state information.

6. The information processing apparatus according to claim 1, further comprising:

a signal congestion degree generation unit configured to generate a signal congestion degree indicating a degree of signals related to an increase and decrease of a communication speed of the wireless communication apparatus among reception signals received by the wireless communication apparatus; and a base station congestion degree generation unit configured to generate a base station congestion degree indicating a congestion degree of the base station of the connection target based on the generated signal congestion degree and an interference index in a position in which the signal congestion degree is generated, wherein the generation unit generates a signal congestion degree in the target area based on the generated base station congestion and the interference index concerning the specified target area, predicts the communication speed the target area from the generated signal congestion degree in the target area and generates the predicted communication speed as the communication state information.

7. The information processing apparatus according to claim 6, wherein the signal congestion degree generation unit generates the signal congestion degree based on a ratio of a correlation output between the reception signal and a code assigned to the base station of the connection target, to a correlation output concerning a base station with a smallest correlation among correlation outputs between the reception signal and codes assigned to other base stations whose signal can be received by the wireless communication apparatus, and wherein the base station congestion degree generation unit generates the base station congestion degree based on a relationship between the generated signal congestion degree and an interference index in a position in which the signal congestion degree is generated.

8. The information processing apparatus according to claim 6, wherein the signal congestion degree generation unit generates the signal congestion degree based on a correlation output between the received signal and a code assigned to the base station of the connection target or a ratio between received power of the reception signal and a resource block assigned to the base station of the connection target and power of the reception signal, and wherein the base station congestion degree generation unit generates the base station congestion degree based on a relationship between the generated signal congestion degree and an interference index in a position in which the signal congestion degree is generated.

9. The information processing apparatus according to claim 1, wherein the information processing apparatus is a server that holds the interference index, wherein the acquisition unit acquires the interference index associated with position information concerning a position of the target area detected based on a position supplied from the wireless communication apparatus or a position close to the target area, and wherein the generation unit specifies the interference index of the target area based on the acquired interference index.

10. The information processing apparatus according to claim 9, further comprising:

a position information holding unit configured to hold the position supplied from the wireless communication apparatus in chronological order; and a transfer pathway prediction unit configured to predict a transfer pathway of the wireless communication apparatus based on the held position, wherein the generation unit generates the communication state information using the predicted transfer pathway as the target area.

11. The information processing apparatus according to claim 10, further comprising a base station congestion degree holding unit configured to hold a base station congestion degree indicating a congestion degree of a base station, wherein the generation unit acquires a base station congestion degree of the base station of the connection target in the predicted transfer pathway from the base station congestion degree holding unit, predicts a communication speed based on the acquired base station congestion degree and the interference index of the target area, and generates the predicted communication speed as the communication state information.

12. The information processing apparatus according to claim 9, wherein the acquisition unit acquires the interference index associated with the position information concerning the position of the detected target area or the position close to the target area, for each of a plurality of communication networks, and wherein the generation unit detects a communication state of each of the plurality of communication networks in the target area based on the acquired interference index, and generates, as the communication state information, information showing a communication network that satisfies a specific condition among the plurality of communication networks.

13. The information processing apparatus according to claim 12, wherein the generation unit generates the communication state information using a communication network whose predicted communication speed is fastest among the plurality of communication networks, as the communication network that satisfies the specific condition.

14. A wireless communication apparatus comprising:
a detection unit configured to detect communication quality based on an interference index indicting a degree of interference in wireless communication with a base station of a connection target and a reception signal strength indicating a strength of a signal received by the wireless communication apparatus;
a display image generation unit configured to generate a display image to notify a user of the detected communication quality; and
a transfer pathway prediction unit configured to predict a transfer pathway of the wireless communication apparatus based on a history of a position in which the wireless communication apparatus exists,
wherein the display image generation unit generates the display image using the predicted transfer pathway as the target area.

15. The wireless communication apparatus according to claim 14, wherein the display image generation unit generates the display image that shows the communication quality according to an increase and decrease of a specific sign.

16. The wireless communication apparatus according to claim 14, further comprising:
a signal congestion degree generation unit configured to generate a signal congestion degree indicating a degree of signals related to an increase and decrease of a communication speed of the wireless communication apparatus among received signals; and
a base station congestion degree generation unit configured to generate a base station congestion degree indicating a congestion degree of the base station of the connection target based on the generated signal congestion degree and the interference index in a position in which the signal congestion degree is generated,
wherein the detection unit detects the communication quality based on the generated base station congestion degree, the interference index and the reception signal strength.

17. A wireless communication apparatus comprising:
an acquisition unit configured to acquire communication state information transmitted from an information processing apparatus that is configured to:
acquire an interference index indicating a degree of interference in wireless communication with a base station of a connection target of the wireless communication apparatus and position information related to a position concerning the interference index for each of a plurality of communication networks,
detect a communication state of each of the plurality of communication networks in a target area to detect a communication state of the wireless communication apparatus, based on the acquired interference index and the acquired position information,
generate, as the communication state information, information indicating a communication network that satisfies a specific condition among the plurality of communication networks; and
predict a transfer pathway of the wireless communication apparatus based on a history of a position in which the wireless communication apparatus exists,
wherein the communication state information is generated using the predicted transfer pathway as the target area; and
a control unit configured to perform control to connect to the communication network that satisfies the specific condition based on the acquired communication state information.

18. A communication system comprising:
an information processing apparatus including a supply unit configured to supply an interference index indicating a degree on interference in wireless communication between a wireless communication apparatus and a base station that is a connection target of the wireless communication apparatus, and position information related to a position concerning the interference index; and
a wireless communication apparatus including:
a generation unit configured to specify an interference index concerning a target area to detect a communication state of the wireless communication apparatus, based on the supplied position information, and generate communication state information to notify the communication state based on the specified interference index; and
a transfer pathway prediction unit configured to predict a transfer pathway of the wireless communication apparatus based on a history of a position in which the wireless communication apparatus exists,
wherein the generation unit generates the communication state information using the predicted transfer pathway as the target area.

19. A communication state detection method comprising:
acquiring an interference index indicating a degree of interference in wireless communication between a wireless communication apparatus and a base station that is a connection target of the wireless communication apparatus, and position information related to a position concerning the interference index;
specifying an interference index concerning a target area to detect a communication state of the wireless communication apparatus, based on the acquired position information, and generating communication state information to notify the communication state based on the specified interference index; and
predicting a transfer pathway of the wireless communication apparatus based on a history of a position in which the wireless communication apparatus exists,
wherein the communication state information is generated using the predicted transfer pathway as the target area.

* * * * *